United States Patent
Izgu et al.

(10) Patent No.: US 12,454,550 B2
(45) Date of Patent: Oct. 28, 2025

(54) COMPOSITIONS AND METHODS FOR BIOORTHOGONAL SURFACE COATING

(71) Applicant: Rutgers, The State University of New Jersey, New Brunswick, NJ (US)

(72) Inventors: Enver Cagri Izgu, Piscataway, NJ (US); Kern Hast, Jersey City, NJ (US); Zhaojun Jia, Piscataway, NJ (US); Melih Baci, Piscataway, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 243 days.

(21) Appl. No.: 17/937,041

(22) Filed: Sep. 30, 2022

(65) Prior Publication Data
US 2023/0105381 A1  Apr. 6, 2023

Related U.S. Application Data

(60) Provisional application No. 63/250,552, filed on Sep. 30, 2021.

(51) Int. Cl.
*C07K 5/12* (2006.01)
*A61K 38/14* (2006.01)

(52) U.S. Cl.
CPC .............. *C07K 5/12* (2013.01); *A61K 38/14* (2013.01)

(58) Field of Classification Search
None
See application file for complete search history.

(56) References Cited

U.S. PATENT DOCUMENTS

| | | | |
|---|---|---|---|
| 5,459,054 | A | 10/1995 | Skjak-Braek et al. |
| 8,673,286 | B2 | 3/2014 | Messersmith et al. |
| D747,467 | S | 1/2016 | Green |
| 2008/0247984 | A1 | 10/2008 | Messersmith et al. |
| 2010/0330025 | A1 | 12/2010 | Messersmith et al. |
| 2014/0088192 | A1 | 3/2014 | Heller et al. |
| 2014/0113347 | A1 | 4/2014 | Lisboa et al. |
| 2023/0174690 | A1* | 6/2023 | Izgu ............... C08F 138/00 526/285 |

FOREIGN PATENT DOCUMENTS

| | | |
|---|---|---|
| EP | 2078062 A1 | 7/2009 |
| WO | 2011047870 A1 | 4/2011 |
| WO | 2014138691 A1 | 9/2014 |
| WO | 2018227151 A1 | 12/2018 |
| WO | 2021133579 A1 | 7/2021 |

OTHER PUBLICATIONS

Jia et al. Catecholamine-Copper Redox as a Basis for Site-Specific Single-Step Functionalization of Material Surfaces ACS Applied Materials & Interfaces 2021 13 (3), 4711-4722. DOI: 10.1021/acsami.0c19396.*
"PubChem CID 61149235", (2S)-2-Amino-3-(3,4-dihydroxyphenyl)-N-prop-2-ynylpropanamide, created Oct. 19, 2012 and modified Oct. 26, 2019, 2012.
Brand , et al., "Specific Binding of Liposomal Nanoparticles through Inverse Electron-Demand Diels-Alder Click Chemistry", ChemistryOpen, 6, 2017, pp. 615-619.
Budisa , et al., "Expanding the DOPA Universe with Genetically Encoded, Mussel-Inspired Bioadhesives for Material Sciences and Medicine", ChemBioChem, 29(17), 2019, pp. 2163-2190.
Davis , et al., "Coatings on mammalian cells: interfacing cells with their environment", J Biol Eng, 13(5), 2019, 28 pages.
Hasturk , et al., "Cell Armor for Protection Against Environmental Stress: Advances, Challenges and Applications in Micro- and Nanoencapsulation of Mammalian Cells", Acta Biomater, 95, 2019, pp. 3-31.
Horsch , et al., "Polymerizing Like Mussels Do: Toward Synthetic Mussel Foot Proteins and Resistant Glues", Angew Chem Int Ed, 57, 2018, pp. 15728-15732.
Jiang , et al., "Surface Characteristics of a Self-Polymerized Dopamine Coating Deposited on Hydrophobic Polymer Films", Langmuir, 27(23), 2011, pp. 14180-14187.
Kim , et al., "Strategic Advances in Formation of Cell-in-Shell Structures: From Syntheses to Applications", Adv Mater, 30(14), Abstract, 2018, pp. 1706063.
La , et al., "3,4-Dihydroxy-L-Phenylalanine as a Cell Adhesion Molecule in Serum-Free Cell Culture", Biotechnol Prog, 28(4), 2012, pp. 1055-1060.
Lee , et al., "Material-Independent Surface Chemistry beyond Polydopamine Coating", Acc Chem Res, 52(3), 2019, pp. 704-713.
Lee , et al., "Mussel-Inspired Surface Chemistry for Multifunctional Coatings", Science, 318(5849), 2007, pp. 426-430.
Maza, et al., "Utilization of alkyne bioconjugations to modulate protein function", Bioorg Med Chem Lett, 27(1), 2017, pp. 30-33.
Petran , et al., "Melanin-like polydopa amides—synthesis and application in functionalization of magnetic nanoparticles", Polym Chem, vol. 6, Jan. 14, 2015, pp. 2139-2149.
Saiz-Poseu , et al., "The Chemistry behind Catechol-Based Adhesion", Angew Chem Int Ed, 58(3), 2019, pp. 696-714.
Wei , et al., "Oxidant-Induced Dopamine Polymerization for Multifunctional Coatings", Polym Chem, vol. 1, 2010, pp. 1430-1433.
Yang , et al., "Mussel-Inspired Encapsulation and Functionalization of Individual Yeast Cells", J Am Chem Soc, 133(9), 2011, pp. 2795-2797.

* cited by examiner

*Primary Examiner* — Maury A Audet
(74) *Attorney, Agent, or Firm* — Saul Ewing LLP; Kathryn Doyle; Domingos J. Silva

(57) ABSTRACT

The present disclosure relates to compositions and methods useful for the functionalization of surfaces in the absence of a metal catalyst. The compositions include compounds of formula (I), which react with strained alkene-containing compounds, before or after molecular assembly catalyzed by tyrosinase, to afford cycloadducts. The strained alkene-containing compound may further comprise any molecule of interest, including small molecules and macromolecules, thereby enabling surface functionalization. In certain embodiments, the strained alkene-containing molecule comprises a moiety selected from the group consisting of a trans-cyclooctene (TCO), cyclopropene, cyclobutene, and norbornene.

20 Claims, 26 Drawing Sheets

Specification includes a Sequence Listing.

COMPOSITIONS AND METHODS FOR BIOORTHOGONAL SURFACE COATING

CROSS-REFERENCE TO RELATED APPLICATIONS

The present application claims priority under 35 U.S.C. § 119(e) to U.S. Provisional Patent Application No. 63/250,552, filed Sep. 30, 2021, which is incorporated herein by reference in its entirety.

STATEMENT REGARDING FEDERALLY SPONSORED RESEARCH OR DEVELOPMENT

This invention was made with government support under grant numbers EB029548 and HL150852 awarded by the National Institutes of Health. The government has certain rights in the invention.

SEQUENCE LISTING

The XML file named "370602-7053US1_Sequence_Listing.xml" created on Sep. 28, 2022, comprising 6.4 Kbytes, is hereby incorporated by reference in its entirety.

BACKGROUND

The ability to control and modify the chemistry of surfaces is pivotal to the success of many medical devices, whose diverse requirements include physiologically compatible integration with host tissues and the immobilization of biomacromolecules onto surfaces without loss of bioactivity. Modification of surface chemistry is appealing to tailor device interactions, and material-independent surface modifications can be achieved via coating methods.

Inspired by the adhesive mussel foot protein Mefp-5, which uses catechol-substituted residues to tether mussels to surfaces, catechols have been studied extensively as building blocks of device coatings. Catechols undergo oxidative polymerization, forming supramolecular structures that strongly bind surfaces through bidentate coordination, hydrogen bonding, and π-π stacking. Catecholamines, particularly the amino acid 3,4-dihydroxy-L-phenylalanine (L-DOPA) and its decarboxylated derivative, dopamine, have been used to produce coatings that were subsequently modified through Michael addition or Schiff's base reaction. However, despite major efforts in catechol-based surface chemistry, an approach that has all the desirable traits of bioorthogonality and biocompatibility remains a challenge.

Impeding this goal is the common use of transition metals to initiate catechol polymerization and the lack of chemoselectivity in subsequent surface grafting processes. The ready coordination catechols with metals makes complete removal of metal catalysts from surfaces challenging. These metals, copper being the most common, are often carcinogenic or cytotoxic and can disrupt the activity of enzymes being grafted onto the surface.

Thus, there is a need in the art for biocompatible compositions for the functionalization of biological surfaces and bioorthogonal methods of making the same. The present disclosure addresses this need.

BRIEF SUMMARY

In one aspect, the present disclosure provides a compound of Formula (I), or a salt, solvate, tautomer, isotopologue, stereoisomer, or any mixtures thereof:

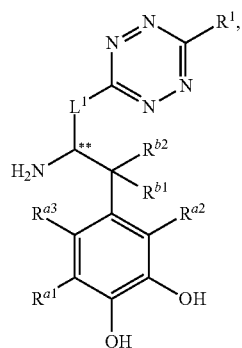

wherein $R^{a1}$, $R^{a2}$, $R^{a3}$, $R^{b1}$, $R^{b2}$, $R^1$, and $L^1$ are defined within the scope of the present disclosure.

In another aspect, the present disclosure provides a composition comprising at least one compound of Formula (I) and tyrosinase, or a biologically active fragment thereof.

In another aspect, the present disclosure provides a composition comprising at least one compound of Formula (I), tyrosinase or a biologically active fragment thereof, and a strained alkene-containing compound. In certain embodiments, the strained alkene comprises a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid.

In another aspect, the present disclosure provides a composition comprising a reaction product of at least one compound of Formula (I) with a strained alkene-containing compound. In certain embodiments, the strained alkene-containing compound comprises a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid.

In another aspect, the present disclosure provides a method of coating a surface. In certain embodiments, the method comprises contacting at least a portion of the surface with a composition comprising at least one compound of Formula (I) and tyrosinase or a biologically active fragment thereof to provide a first layer. In certain embodiments, the method comprises contacting the first layer with a strained alkene-containing compound, to provide a coating composition. In certain embodiments, the strained alkene-containing compound comprises a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid. In certain embodiments, at least a portion of the surface is coated with the coating composition.

In another aspect, the present disclosure provides a method of coating a surface. In certain embodiments, the method comprises contacting at least one compound of Formula (I) and a strained alkene-containing compound, to provide a first reaction product. In certain embodiments, the strained alkene-containing compound comprises a chromophore, fluorogenic molecule, oligonucleotide, polynucleotide, nucleic acid, polyethylene glycol, peptide, polypeptide, enzyme, protein, therapeutic agent, nanoparticle, heterocatalyst, organic catalyst, or lipid. In certain embodiments, the method comprises contacting at least a portion of the surface with a composition comprising the first reaction product and tyrosinase or a biologically active fragment thereof to provide a coating composition. In certain embodiments, at least a portion of the surface is coated with the coating composition.

BRIEF DESCRIPTION OF THE FIGURES

The drawings illustrate generally, by way of example, but not by way of limitation, various embodiments of the present application.

FIG. 1A: Chemical synthesis of tetrazine-functionalized DOPA (DOPA-Tet)-$((CH_2)_2O)_4$—$C_6H_4$—. FIG. 1B: Schematic of surface functionalization process with examples of MOIs used in this study. FIG. 1C: Provides non-limiting examples of molecules of interest (MOIs).

FIG. 10A: CLSM images of cell adhesion and cytoskeleton organization on uncoated and cyclo [Arg-Gly-Asp-d-Phe-Lys] (c(RGDfK))-grafted NanoECM. The nuclei, vinculin, and F-actin are stained blue, green, and red, respectively. FIG. 10B: SEM studies of cell morphology on uncoated and c(RGDfK)-grafted NanoECM.

FIG. 12A provides the minimum inhibitory concentration (MIC) of vancomycin and vancomycin-TCO against *S. aureus*. FIG. 12B provides the mean absorbance at 570 nm of *S. aureus* stained with Presto-Blue™, a resazurin-based cell viability indicator. Error bars denote 1 standard deviation.

FIGS. 13A-13E provide confocal images of *S. aureus* cultures incubated on glass microscopy dishes that are incubated with PBS (FIG. 13A), vancomycin (FIG. 13B), vancomycin-TCO (FIG. 13C), or coated with DOPA-Tet and then incubated vancomycin (FIG. 13D) or vancomycin TCO (FIG. 13E). FIG. 13F provides a graph showing absorbance of uncoated, coated, or coated vancomycin-grafted culture plates incubated for 72 hours with *S. aureus* and assayed with crystal violet; shown as median values corrected for background absorbance with non-bacteria-containing samples. FIGS. 13G-13I provide confocal images of *S. aureus* biofilms grown on glass microscopy dishes that are uncoated (FIG. 13G), coated (FIG. 13H), and coated/grafted with vancomycin-TCO (FIG. 13I); scale bar is 20 μm. Cultures were stained with a combination of PI and SYTO™ 9, which selectively label dead and live cells, respectively, and overlay images of the channels are shown.

DETAILED DESCRIPTION

Figure 1A:
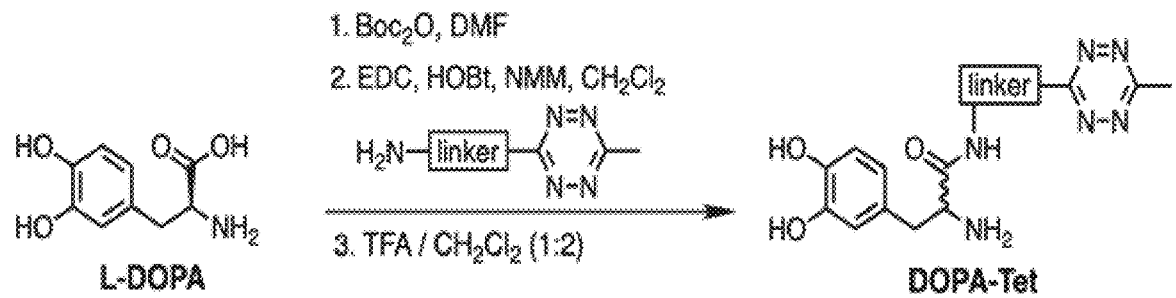
FIGS. 1A-1C provide an overview of the surface functionalization chemistry.
Figure 1B:
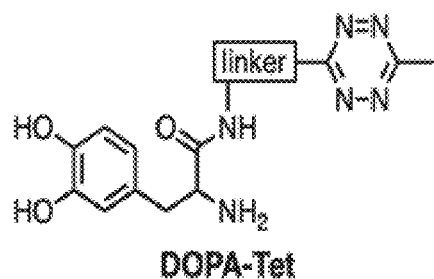
Figure 1B:
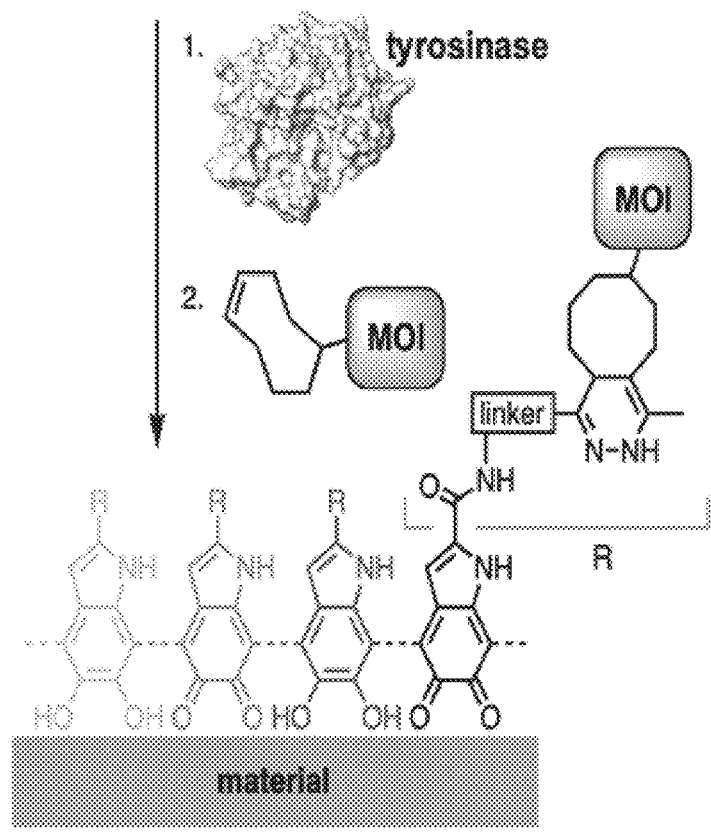
Figure 1C:
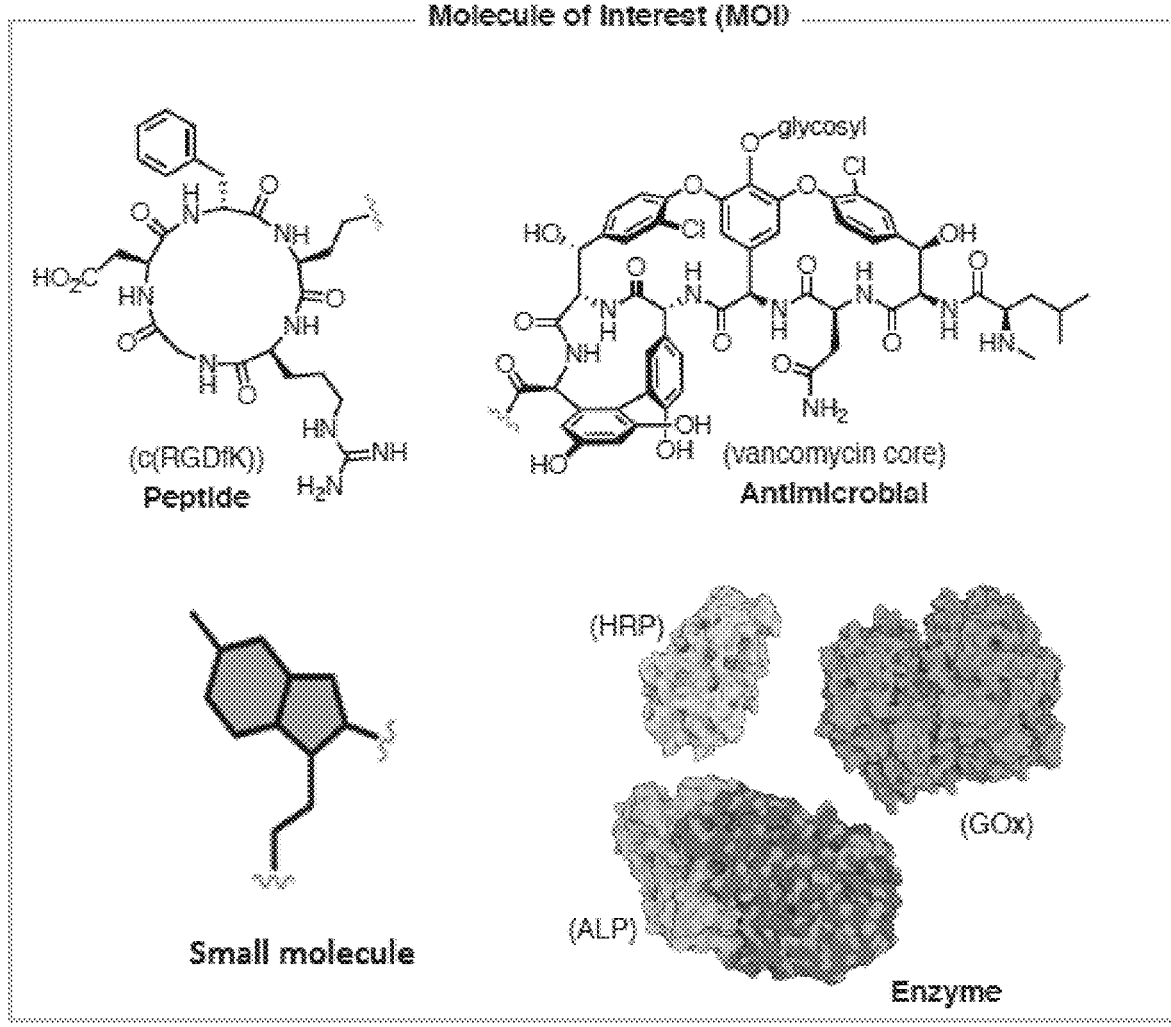
Figure 2:
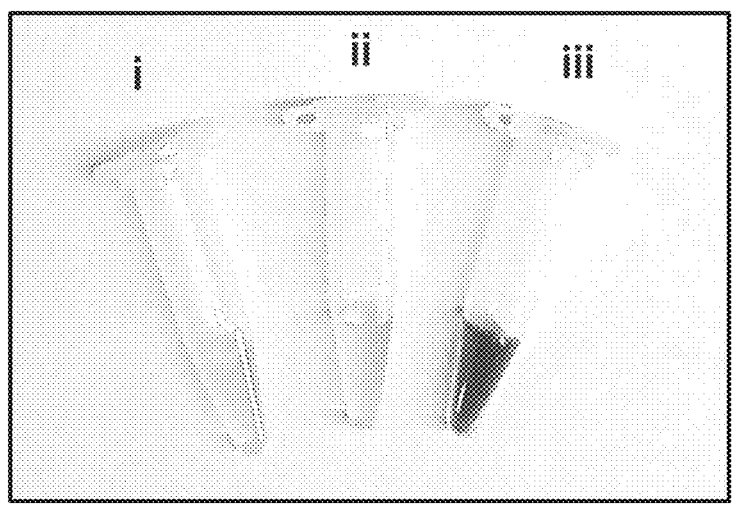
FIG. 2 illustrates the activity of tyrosinase on Boc-protected DOPA-Tet and DOPA-Tet after 16 hours (i) 10 mM compound 2; (ii) 10 mM compound 2 with tyrosinase added; (iii) 10 mM DOPA-Tet with tyrosinase added.

In one aspect, a novel method of surface functionalization that is chemoselective and metal catalyst-free is described herein. In certain embodiments, this method employs tyrosinase (or a biologically active fragment thereof) to catalyze the molecular assembly of a 1,2,4,5-tetrazine (Tet)-containing catecholamine (DOPA-Tet) and coat a surface, and then grafts the coated material with one or more reactive alkene-containing molecules of interest (MOIs) via cycloadduct conjugation. The process can be performed under biochemically inert conditions and may be useful for biological applications. In non-limiting embodiments, the molecules grafted onto the surfaces retain their biological activity, and grafted surfaces display high cytocompatibility with mammalian cells.

This method leverages two key innovations in its approach. First, the immobilization of MOIs to the coated surface is achieved by the highly chemoselective [4+2] cycloaddition reaction of tetrazine-containing compound and a strained alkene-containing compound, non-limiting examples including trans-cyclooctene (TCO). It has been established that the cycloaddition adduct eliminates $N_2$ and tautomerizes to generate a stable 1,4-dihydropyridazine. This conjugation mechanism is well-suited to biological applications, as it proceeds in aqueous conditions without metal catalysis or heating. Because neither tetrazine (Tet) nor any of a number of strained alkene-containing compounds (i.e., TCO) are known to be endogenous functionalities in biological systems, this conjugation is highly bioorthogonal with virtually no side reactions. Tet and strained alkene-containing compounds are widely commercially available and can be easily incorporated into MOIs through standard amide bond coupling reactions, such as the use of carbodiimides or N-hydroxysuccinimide. With these features, such conjugation reactions see significant use in chemical biology, in particular for the labeling of target biomolecules in living cells, and its value has been underscored by its use in technologies that have made it to clinical trials.

Secondly, in certain aspects of the present disclosure, a method of metal-free catechol molecular assembly via enzymatic catalysis is utilized. Catechol polymerization is most well-known in biology in the production of melanins from L-DOPA, a process called melanogenesis that is outlined in the Raper-Mason pathway. In this biosynthetic route, a copper-containing enzyme, tyrosinase, catalyzes the oxidation of L-DOPA and initiates its polymerization.

Tyrosinase has been used as a catalyst for the oxidation of aromatic alcohols and dopamine polymerization but is largely unexplored in its performance with more complex, synthetic L-DOPA derivatives and in concert with subsequent click reactions for biomolecule grafting. Tyrosinase has been shown to oxidize a wide variety of phenolic and catecholic substrates. Tyrosinase was further able to promote the polymerization and/or molecular assembly of functionalized DOPA-Tet. The resultant coating is durable to sonication and washing with various solvents and persists when incubated in human serum.

To highlight the performance of this method, surfaces were grafted with a variety of bioactive molecules under conditions that would be challenging with the standard catechol-based methods, including but not limited to enzymes (including but not limited to ALP, GOx, and HRP), bioactive peptides (including but not limited to c(RGDfK)), and bioactive small molecules (including but not limited to vancomycin).

ALP is a glycoprotein that catalyzes the hydrolysis of orthophosphate monoesters at alkaline pHs. The activity of ALP is typically measured via the hydrolysis of para-nitrophenyl phosphate (p-NPP), which results in a yellow color and an increase in absorbance at 405 nm. GOx is a homodimeric glycoprotein linked via disulfide bonds. Each subunit contains an identical active site that relies on a tightly noncovalently-bound FAD cofactor and oxidizes glucose to gluconolactone, producing hydrogen peroxide ($H_2O_2$) as a byproduct. HRP is a family of isoenzymes that are composed of a single polypeptide with an iron(III) protoporphyrin IX (commonly referred to as a "heme group") cofactor. HRP uses $H_2O_2$ to oxidize a variety of organic substrates, including several small-molecule chromophores that undergo a color change when oxidized.

As described herein, 2,2'-azino-bis(3-ethylbenzthiazoline-6-sulfonic acid) (ABTS) was utilized, wherein oxidation by HRP produces a blue-green color and an increase in absorbance at 405 nm. When GOx and HRP were colocalized, the $H_2O_2$ produced by GOx was utilized by HRP to produce a colorimetric signal, demonstrating that both enzymes were grafted to the surface and retained activity. c(RGDfK) is a convenient form of the common Arg-Gly-Asp motif that binds adhesive proteins on cell surfaces, most notably integrins, and has been shown to improve cell adhesion to surfaces.

Fibroblasts (NIH3T3) were cultured on c(RGDfK)-grafted discs of NanoECM™, which is a randomly oriented, electrospun polycaprolactone product designed to imitate decellularized tissue for cell adhesion. Adhesion of fibroblasts was enhanced and organization of their cytoskeletal proteins was superior when cultured on the c(RGDfK)-grafted discs compared to the uncoated samples. These results, together with MTT assays conducted on coated substrate extracts, demonstrate not only the cytocompatibility of the method but also improvements in adhesion and viability on surfaces functionalized with c(RGDfK).

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

In another aspect, a novel method of surface functionalization that is chemoselective and metal catalyst-free is described herein. In certain embodiments, this method employs tyrosinase or a biologically active fragment thereof to catalyze the molecular assembly of a trans-cyclooctene (TCO)-containing catecholamine and coat a surface, and then grafts the coated material with one or more tetrazine-containing molecules of interest (MOIs) via cycloadduct conjugation. The process can be performed under biochemically inert conditions and may be useful for biological applications. In non-limiting embodiments, the molecules grafted onto the surfaces retain their biological activity, and grafted surfaces display high cytocompatibility with mammalian cells.

In another aspect, a novel method of surface functionalization that is chemoselective and metal catalyst-free is described herein. In certain embodiments, this method employs tyrosinase or a biologically active fragment thereof to catalyze the molecular assembly of a strained alkyne-containing or cyclic alkyne-containing catecholamine and coat a surface, and then grafts the coated material with one or more azide-containing molecules of interest (MOIs) via cycloadduct conjugation. The process can be performed under biochemically inert conditions and may be useful for biological applications. In non-limiting embodiments, the molecules grafted onto the surfaces retain their biological activity, and grafted surfaces display high cytocompatibility with mammalian cells.

In another aspect, a novel method of surface functionalization that is chemoselective and metal catalyst-free is described herein. In certain embodiments, this method employs tyrosinase or a biologically active fragment thereof to catalyze the molecular assembly of an azide-containing catecholamine and coat a surface, and then grafts the coated material with one or more strained alkyne-containing or cyclic alkyne-containing molecules of interest (MOIs) via cycloadduct conjugation. The process can be performed under biochemically inert conditions and may be useful for biological applications. In non-limiting embodiments, the molecules grafted onto the surfaces retain their biological activity, and grafted surfaces display high cytocompatibility with mammalian cells.

Definitions

The term "about" as used herein can allow for a degree of variability in a value or range, for example, within 10%, within 5%, or within 1% of a stated value or of a stated limit of a range, and includes the exact stated value or range.

As used herein, the term "alkenylene", employed alone or in combination with other terms, means, unless otherwise stated, a stable mono-unsaturated or di-unsaturated straight chain or branched chain hydrocarbon group having the stated number of carbon atoms wherein the group has two open valencies.

As used herein, the term "arylene," employed alone or in combination with other terms, means, unless otherwise stated, a stable aromatic group having the stated number of carbon atoms wherein the group has two open valencies.

As used herein, the term "heteroarylene," employed alone or in combination with other terms, means, unless otherwise stated, a stable heteroaromatic group having the stated number of carbon atoms wherein the group has two open valencies.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition in which the material is included, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a nitrogen-containing group including an amine, amide, imine, imide, and a nitrile; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$) hydrocarbyl, wherein R can be hydrogen (in examples that include other carbon atoms) or a carbon-based moiety, and wherein the carbon-based moiety can be substituted or unsubstituted.

The term "strained alkene" as used herein refers to an organic compound comprising at least one alkene moiety which is destabilized as a consequence of bond angles within the molecule which are abnormal (i.e., greater than or less than the ideal angle of 120° for sp$^2$ hybridized carbon) due ring strain, angle strain, conformation strain, torsional eclipsing interactions, and/or transannular strain. Non-limiting examples of moieties comprising strained alkenes include trans-cyclooctenes, cyclopropenes, cyclobutenes, and norbornenes. In certain embodiments, the alkene moiety within a compound comprising a strained alkene demonstrates enhanced reactivity in any of a number of reactions, including but not limited to [4+2] cycloadditions.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=C=CCH$_2$, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "cyanine" as used herein refers to a synthetic dye having an iminium in direct π-conjugation with an enamine, wherein the direct π-conjugation comprises at least one carbon-carbon π-bond (C=C). The N atom of the iminium and/or enamine may comprise a heteroaryl or optionally unsaturated heterocycloalkyl species, or may be optionally substituted with hydrocarbyl substituents. Non-limiting examples of cyanine dye compounds include Cy3, Cy5, Cy3.5, Cy5.5, and Cy7.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise, a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups. For example, a dioxolanyl ring and a benzdioxolanyl ring system (methylenedioxyphenyl ring system) are both heterocyclyl groups within the meaning herein. The phrase also includes polycyclic ring systems containing a heteroatom such as, but not limited to, quinuclidyl. Heterocyclyl groups can be unsubstituted, or can be substituted as discussed herein. Heterocyclyl groups include, but are not limited to, pyrrolidinyl, piperidinyl, piperazinyl, morpholinyl, pyrrolyl, pyrazolyl, triazolyl, tetrazolyl, oxazolyl, isoxazolyl, thiazolyl, pyridinyl, thiophenyl, benzothiophenyl, benzofuranyl, dihydrobenzofuranyl, indolyl, dihydroindolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Representative substituted heterocyclyl groups can be mono-substituted or substituted more than once, such as, but not limited to, piperidinyl or quinolinyl groups, which are 2-, 3-, 4-, 5-, or 6-substituted, or disubstituted with groups such as those listed herein.

The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure. A heteroaryl group designated as a $C_2$-heteroaryl can be a 5-membered ring with two carbon atoms and three heteroatoms, a 6-membered ring with two carbon atoms and four heteroatoms and so forth. Likewise a $C_4$-heteroaryl can be a 5-membered ring with one heteroatom, a 6-membered ring with two heteroatoms, and so forth. The number of carbon atoms plus the number of heteroatoms sums up to equal the total number of ring atoms. Heteroaryl groups include, but are not limited to, groups such as pyrrolyl, pyrazolyl, triazolyl, tetrazolyl, oxazolyl, isoxazolyl, thiazolyl, pyridinyl, thiophenyl, benzothiophenyl, benzofuranyl, indolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Heteroaryl groups can be unsubstituted, or can be substituted with groups as is discussed herein. Representative substituted heteroaryl groups can be substituted one or more times with groups such as those listed herein.

Additional examples of aryl and heteroaryl groups include but are not limited to phenyl, biphenyl, indenyl, naphthyl (1-naphthyl, 2-naphthyl), N-hydroxytetrazolyl, N-hydroxytriazolyl, N-hydroxyimidazolyl, anthracenyl (1-anthracenyl, 2-anthracenyl, 3-anthracenyl), thiophenyl (2-thienyl, 3-thienyl), furyl (2-furyl, 3-furyl), indolyl, oxadiazolyl, isoxazolyl, quinazolinyl, fluorenyl, xanthenyl, isoindanyl, benzhydryl, acridinyl, thiazolyl, pyrrolyl (2-pyrrolyl), pyrazolyl (3-pyrazolyl), imidazolyl (1-imidazolyl, 2-imidazolyl, 4-imidazolyl, 5-imidazolyl), triazolyl (1,2,3-triazol-1-yl, 1,2,3-triazol-2-yl 1,2,3-triazol-4-yl, 1,2,4-triazol-3-yl), oxazolyl (2-oxazolyl, 4-oxazolyl, 5-oxazolyl), thiazolyl (2-thiazolyl, 4-thiazolyl, 5-thiazolyl), pyridyl (2-pyridyl, 3-pyridyl, 4-pyridyl), pyrimidinyl (2-pyrimidinyl, 4-pyrimidinyl, 5-pyrimidinyl, 6-pyrimidinyl), pyrazinyl, pyridazinyl (3-pyridazinyl, 4-pyridazinyl, 5-pyridazinyl), quinolyl (2-quinolyl, 3-quinolyl, 4-quinolyl, 5-quinolyl, 6-quinolyl, 7-quinolyl, 8-quinolyl), isoquinolyl (1-isoquinolyl, 3-isoquinolyl, 4-isoquinolyl, 5-isoquinolyl, 6-isoquinolyl, 7-isoquinolyl, 8-isoquinolyl), benzo[b]furanyl (2-benzo[b]furanyl, 3-benzo[b]furanyl, 4-benzo[b]furanyl, 5-benzo[b]furanyl, 6-benzo[b]furanyl, 7-benzo[b]furanyl), 2,3-dihydro-benzo[b]furanyl (2-(2,3-dihydro-benzo[b]furanyl), 3-(2,3-dihydro-benzo[b]furanyl), 4-(2,3-dihydro-benzo[b]furanyl), 5-(2,3-dihydro-benzo[b]furanyl), 6-(2,3-dihydro-benzo[b]furanyl), 7-(2,3-dihydro-benzo[b]furanyl), benzo[b]thiophenyl (2-benzo[b]thiophenyl, 3-benzo[b]thiophenyl, 4-benzo[b]thiophenyl, 5-benzo[b]thiophenyl, 6-benzo[b]thiophenyl, 7-benzo[b]thiophenyl), 2,3-dihydro-benzo[b]thiophenyl, (2-(2,3-dihydro-benzo[b]thiophenyl), 3-(2,3-dihydro-benzo[b]thiophenyl), 4-(2,3-dihydro-benzo[b]thiophenyl), 5-(2,3-dihydro-benzo[b]thiophenyl), 6-(2,3-dihydro-benzo[b]thiophenyl), 7-(2,3-dihydro-benzo[b]thiophenyl), indolyl (1-indolyl, 2-indolyl, 3-indolyl, 4-indolyl, 5-indolyl, 6-indolyl, 7-indolyl), indazole (1-indazolyl, 3-indazolyl, 4-indazolyl, 5-indazolyl, 6-indazolyl, 7-indazolyl), benzimidazolyl (1-benzimidazolyl, 2-benzimidazolyl, 4-benzimidazolyl, 5-benzimidazolyl, 6-benzimidazolyl, 7-benzimidazolyl, 8-benzimidazolyl), benzoxazolyl (1-benzoxazolyl, 2-benzoxazolyl), benzothiazolyl (1-benzothiazolyl, 2-b enzothiazolyl, 4-benzothiazolyl, 5-benzothiazolyl, 6-benzothiazolyl, 7-benzothiazolyl), carbazolyl (1-carbazolyl, 2-carbazolyl, 3-carbazolyl, 4-carbazolyl), 5H-dibenz[b,f]azepine (5H-dibenz[b,f]azepin-1-yl, 5H-dibenz[b,f]azepine-2-yl, 5H-dibenz[b,f]azepine-3-yl, 5H-dibenz[b,f]azepine-4-yl, 5H-dibenz[b,f]azepine-5-yl), 10,11-dihydro-5H-dibenz[b,f]azepine (10,11-dihydro-5H-dibenz[b,f]azepine-1-yl, 10,11-dihydro-5H-dibenz[b,f]azepine-2-yl, 10,11-dihydro-5H-dibenz[b,f]azepine-3-yl, 10,11-dihydro-5H-dibenz[b,f]azepine-4-yl, 10,11-dihydro-5H-dibenz[b,f]azepine-5-yl), and the like.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The terms "epoxy-functional" or "epoxy-substituted" as used herein refers to a functional group in which an oxygen atom, the epoxy substituent, is directly attached to two adjacent carbon atoms of a carbon chain or ring system. Examples of epoxy-substituted functional groups include, but are not limited to, 2,3-epoxypropyl, 3,4-epoxybutyl, 4,5-epoxypentyl, 2,3-epoxypropoxy, epoxypropoxypropyl, 2-glycidoxyethyl, 3-glycidoxypropyl, 4-glycidoxybutyl, 2-(glycidoxycarbonyl)propyl, 3-(3,4-epoxycylohexyl)propyl, 2-(3,4-epoxycyclohexyl)ethyl, 2-(2,3-epoxycylopentyl)ethyl, 2-(4-methyl-3,4-epoxycyclohexyl)propyl, 2-(3,4-epoxy-3-methylcylohexyl)-2-methylethyl, and 5,6-epoxyhexyl.

The term "monovalent" as used herein refers to a substituent connecting via a single bond to a substituted molecule. When a substituent is monovalent, such as, for example, F or Cl, it is bonded to the atom it is substituting by a single bond.

The term "hydrocarbon" or "hydrocarbyl" as used herein refers to a molecule or functional group that includes carbon and hydrogen atoms. The term can also refer to a molecule or functional group that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a$-$C_b)$hydrocarbyl, wherein a and b are integers and mean having any of a to b number of carbon atoms. For example, $(C_1$-$C_4)$hydrocarbyl means the hydrocarbyl group can be methyl $(C_1)$, ethyl $(C_2)$, propyl $(C_3)$, or butyl $(C_4)$, and $(C_0$-$C_b)$hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "independently selected from" as used herein refers to referenced groups being the same, different, or a mixture thereof, unless the context clearly indicates otherwise. Thus, under this definition, the phrase "$X^1$, $X^2$, and $X^3$ are independently selected from noble gases" would include the scenario where, for example, $X^1$, $X^2$, and $X^3$ are all the same, where $X^1$, $X^2$, and $X^3$ are all different, where $X^1$ and $X^2$ are the same but $X^3$ is different, and other analogous permutations.

The term "room temperature" as used herein refers to a temperature of about 15° C. to 28° C.

The term "dip coating," as used herein, refers to the action of immersing at least a portion of the surface of a material into a liquid coating composition, thereby coating the exposed surface of said material. In certain embodiments, a porous material, such as a 3-dimensional mesh can be coated in this matter, thereby coating not only the outer surface, but also the inner surface of the pores. In certain embodiments, the inner surface of a container, non-limiting examples including a reaction vessel, can be coated by filling the container with a grafting solution.

The term "drop coating," as used herein, refers to the action of dropping a liquid onto a surface for selective coating.

Compositions for Surface Functionalization

Provided herein are compositions suitable for functionalizing surfaces, including but not limited to biological surfaces.

In one aspect, the present disclosure provides a compound of formula (I), or a salt, solvate, tautomer, isotopologue, stereoisomer, or any mixtures thereof:

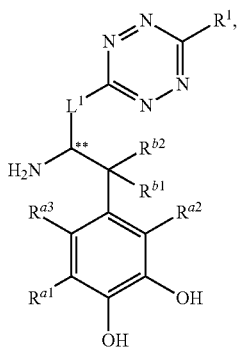

(I)

wherein:
L¹ is a linker of formula *—X—(Y)$_m$—Z—, wherein * is the bond between X and the carbon marked as **, wherein:
X is a bond (null), —C(=O)—, —C(=O)NH—, —C(=O)N($C_6$-$C_{10}$ arylene)-, —C(=O)N($C_2$-$C_{10}$ alkenylene)-, or —C(=O)N($C_1$-$C_{10}$ alkylene)-, wherein the $C_6$-$C_{10}$ arylene is optionally substituted by at least one substituent independently selected from the group consisting of halogen, —R', —OR', and —C(=O)OR';
each occurrence of Y is independently selected from the group consisting of —CH₂CH₂O—, —OCH₂CH₂—, and —CH₂CH₂—, wherein each CH₂ is independently optionally substituted with 1 or 2 CH₃ groups, with the proviso that O—O bonds are not present;
Z is selected from the group consisting of optionally substituted $C_1$-$C_6$ alkylene, optionally substituted $C_6$-$C_{10}$ arylene, and optionally substituted $C_2$-$C_8$ heteroarylene;
each occurrence of R' is independently selected from the group consisting of H, optionally substituted $C_1$-$C_6$ alkyl, optionally substituted $C_2$-$C_6$ alkenyl, optionally substituted $C_6$-$C_{10}$ aryl, and optionally substituted $C_2$-$C_8$ heteroaryl;
m is selected from the group consisting of 0, 1, 2, 3, 4, 5, 6, 7, 8, 9, or 10;
R¹ is selected from the group consisting of H and $C_1$-$C_6$ alkyl;
each of $R^{a1}$, $R^{a2}$, and $R^{a3}$ is H; and
$R^{b1}$ and $R^{b2}$ are each independently selected from the group consisting of H and optionally substituted $C_1$-$C_6$ alkyl, wherein at least one of $R^{b1}$ and $R^{b2}$ is H.

In certain embodiments, R¹ is Me. In certain embodiments, R¹ is H.
In certain embodiments, $R^{b1}$ is H. In certain embodiments $R^{b2}$ is H.
In certain embodiments, X is —C(=O)NH—.

In certain embodiments, Y is —CH₂CH₂O—. In certain embodiments, Y is —OCH₂CH₂—. In certain embodiments, Y is —CH₂CH₂—.
In certain embodiments, m is 4.
In certain embodiments, Z is optionally substituted phenylene. In certain embodiments, Z is

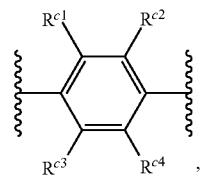

wherein each of $R^{c1}$, $R^{c2}$, $R^{c3}$, and $R^{c4}$ are independently selected from the group consisting of H, $C_1$-$C_6$ alkyl, $C_2$-$C_6$ alkenyl, phenyl, $C_2$-$C_8$ heteroaryl, halogen, NO₂, CN, OR', N(R')(R'), and —C(=O)OR'.
In certain embodiments, at least one of $R^{c1}$, $R^{c2}$, $R^{c3}$, and $R^{c4}$ is H. In certain embodiments, at least two of $R^{c1}$, $R^{c2}$, $R^{c3}$, and $R^{c4}$ are H. In certain embodiments, at least three of $R^{c1}$, $R^{c2}$, $R^{c3}$, and $R^{c4}$ are H. In certain embodiments, each of $R^{c1}$, $R^{c2}$, $R^{c3}$, and $R^{c4}$ are H. In certain embodiments, the compound is

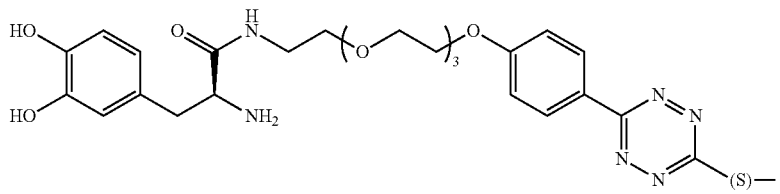

2-amino-3-(3,4-dihydroxyphenyl)-N-(2-(2-(2-(2-(4-(6-methyl-1,2,4,5-tetrazin-3-yl)phenoxy)ethoxy)ethoxy)ethoxy)ethyl)propenamide, or a salt, solvate, tautomer, isotopologue, stereoisomer, or any mixtures thereof. In certain embodiments, the compound is

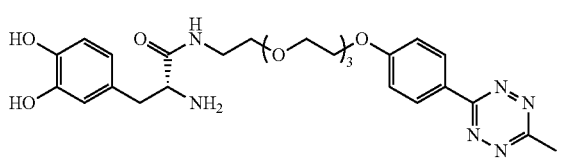

(R)-2-amino-3-(3,4-dihydroxyphenyl)-N-(2-(2-(2-(2-(4-(6-methyl-1,2,4,5-tetrazin-3-yl)phenoxy)ethoxy)ethoxy)ethoxy)ethyl)propenamide, or a salt, solvate, tautomer, isotopologue, stereoisomer, or any mixtures thereof. In certain embodiments, the compound is

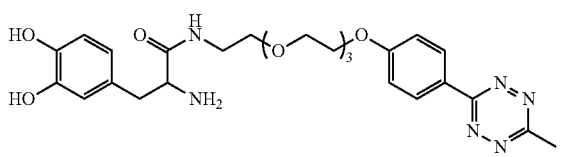

2-amino-3-(3,4-dihydroxyphenyl)-N-(2-(2-(2-(2-(4-(6-methyl-1,2,4,5-tetrazin-3-yl)phenoxy)ethoxy)ethoxy)ethoxy)ethyl)propenamide, or a salt, solvate, tautomer, isotopologue, stereoisomer, or any mixtures thereof.

Compounds of formula (I) or otherwise described herein can be prepared as described herein, using synthetic methods known by those skilled in the art. The following examples illustrate non-limiting embodiments of the compound(s) described herein and their preparation.

The compounds described herein can possess one or more stereocenters, and each stereocenter can exist independently in either the (R) or (S) configuration. In certain embodiments, compounds described herein are present in optically active or racemic forms. It is to be understood that the compounds described herein encompass racemic, optically active, regioisomeric and stereoisomeric forms, or combinations thereof that possess the useful properties described herein. Preparation of optically active forms is achieved in any suitable manner, including by way of non-limiting example, by resolution of the racemic form with recrystallization techniques, synthesis from optically-active starting materials, chiral synthesis, or chromatographic separation using a chiral stationary phase. In certain embodiments, a mixture of one or more isomer is utilized as the compound described herein. In other embodiments, compounds described herein contain one or more chiral centers. These compounds are prepared by any means, including stereoselective synthesis, enantioselective synthesis and/or separation of a mixture of enantiomers and/or diastereomers. Resolution of compounds and isomers thereof is achieved by any means including, by way of non-limiting example, chemical processes, enzymatic processes, fractional crystallization, distillation, and chromatography.

The compounds described herein, and other related compounds having different substituents are synthesized using techniques and materials described herein and as described, for example, in Fieser & Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991), Larock's Comprehensive Organic Transformations (VCH Publishers Inc., 1989), March, Advanced Organic Chemistry 4$^{th}$ Ed., (Wiley 1992); Carey & Sundberg, Advanced Organic Chemistry 4th Ed., Vols. A and B (Plenum 2000, 2001), and Green & Wuts, Protective Groups in Organic Synthesis 3rd Ed., (Wiley 1999) (all of which are incorporated by reference for such disclosure). General methods for the preparation of compound as described herein are modified by the use of appropriate reagents and conditions, for the introduction of the various moieties found in the formula as provided herein.

Compounds described herein are synthesized using any suitable procedures starting from compounds that are available from commercial sources, or are prepared using procedures described herein.

In certain embodiments, reactive functional groups, such as hydroxyl, amino, imino, thio or carboxy groups, are protected in order to avoid their unwanted participation in reactions. Protective groups are used to block some or all of the reactive moieties and prevent such groups from participating in chemical reactions until the protective group is removed. In other embodiments, each protective group is removable by a different means. Protective groups that are cleaved under totally disparate reaction conditions fulfill the requirement of differential removal.

In certain embodiments, protective groups are removed by acid, base, reducing conditions (such as, for example, hydrogenolysis), and/or oxidative conditions. Groups such as trityl, dimethoxytrityl, acetal and t-butyldimethylsilyl are acid labile and are used to protect carboxy and hydroxy reactive moieties in the presence of amino groups protected with Cbz groups, which are removable by hydrogenolysis, and Fmoc groups, which are base labile. Carboxylic acid and hydroxy reactive moieties are blocked with base labile groups such as, but not limited to, methyl, ethyl, and acetyl, in the presence of amines that are blocked with acid labile groups, such as t-butyl carbamate, or with carbamates that are both acid and base stable but hydrolytically removable.

In certain embodiments, carboxylic acid and hydroxy reactive moieties are blocked with hydrolytically removable protective groups such as the benzyl group, while amine groups capable of hydrogen bonding with acids are blocked with base labile groups such as Fmoc. Carboxylic acid reactive moieties are protected by conversion to simple ester compounds as exemplified herein, which include conversion to alkyl esters, or are blocked with oxidatively-removable protective groups such as 2,4-dimethoxybenzyl, while co-existing amino groups are blocked with fluoride labile silyl carbamates.

Allyl blocking groups are useful in the presence of acid- and base-protecting groups since the former are stable and are subsequently removed by metal or pi-acid catalysts. For example, an allyl-blocked carboxylic acid is deprotected with a palladium-catalyzed reaction in the presence of acid labile t-butyl carbamate or base-labile acetate amine protecting groups. Yet another form of protecting group is a resin to which a compound or intermediate is attached. As long as the residue is attached to the resin, that functional group is blocked and does not react. Once released from the resin, the functional group is available to react.

Typically blocking/protecting groups may be selected from:

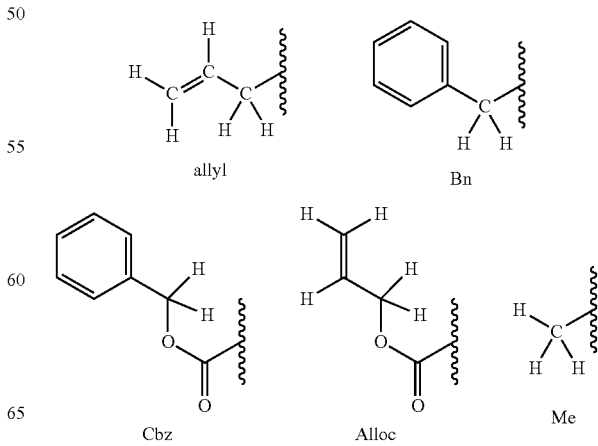

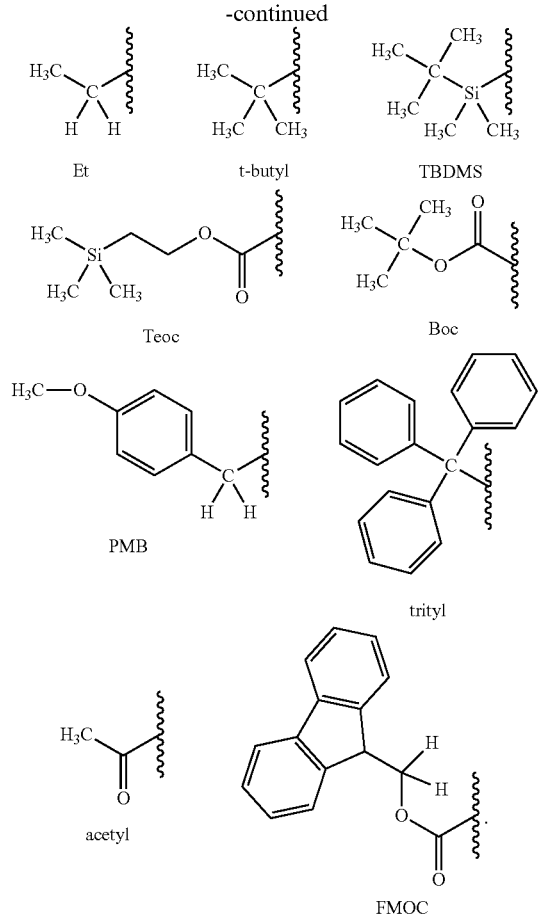

Other protecting groups, plus a detailed description of techniques applicable to the creation of protecting groups and their removal are described in Greene & Wuts, Protective Groups in Organic Synthesis, 3rd Ed., John Wiley & Sons, New York, NY, 1999, and Kocienski, Protective Groups, Thieme Verlag, New York, NY, 1994, which are incorporated herein by reference for such disclosure.

Compositions

The present disclosure further provides a composition comprising the compound of the present disclosure and tyrosinase or a biologically active fragment thereof. The present disclosure further provides a composition comprising the compound of the present disclosure, tyrosinase or a biologically active fragment thereof, and a strained alkene-containing compound, wherein the strained alkene-containing compound comprises a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid.

In certain embodiments, the strained alkene-containing compound comprises a moiety selected from the group consisting of trans-cyclooctene (TCO), cyclopropene, cyclobutene, and norbornene.

In certain embodiments, the strained alkene-containing compound comprises a compound of Formula (II):

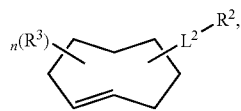

(II)

wherein:
L² is selected from the group consisting of a bond, -A¹-(optionally substituted $C_1$-$C_{30}$ alkenylene)-A²-', and -A¹-(optionally substituted $C_2$-$C_{30}$ heteroalkylene)-A²-', wherein ' indicates a bond between L² and R²;

A¹ and A² are each independently selected from the group consisting of a bond, —O—, —NR"—, —C(=O)—, —C(=O)NR"—, —C(=O)O—, C(=O)NR"——OC(=O)NR"—, and —NR"C(=O)O—;

each occurrence of R" is independently selected from the group consisting of H, optionally substituted $C_1$-$C_6$ alkyl, optionally substituted $C_2$-$C_6$ alkenyl, optionally substituted $C_6$-$C_{10}$ aryl, and optionally substituted $C_2$-$C_8$ heteroaryl;

R² is selected from the group consisting of a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid;

each occurrence of R³ is independently selected from the group consisting of H, optionally substituted $C_1$-$C_6$ alkyl, optionally substituted $C_2$-$C_6$ alkenyl, optionally substituted $C_6$-$C_{10}$ aryl, and optionally substituted $C_2$-$C_8$ heteroaryl; and n is an integer selected from the group consisting of 0, 1, 2, 3, 4, 5, 6, 7, 8, 9, 10, 11, 12, and 13.

In certain embodiments, each occurrence of R³ is H.

In certain embodiments, L² is —O(C=O)NH(CH₂CH₂O)₈CH₂CH₂C(=O)—'.

In certain embodiments, R² is an enzyme. In certain embodiments, R² is alkaline phosphatase (ALP) (SEQ ID NO:2). In certain embodiments, R² is glucose oxidase (GOx) (SEQ ID NO:3). In certain embodiments, R² is horseradish peroxidase (HRP) (SEQ ID NO:4). In certain embodiments, R² is a cyclic peptide. In certain embodiments, R² is c(RGDfK). In certain embodiments, R² is a fluorophore. In certain embodiments, R² is Cy5. In certain embodiments, R² is a therapeutic agent. In certain embodiments, R² is vancomycin.

In certain embodiments, the strained alkene-containing compound is ALP-TCO. In certain embodiments, the strained alkene-containing compound is GOx-TCO. In certain embodiments, the strained alkene-containing compound is HRP-TCO. In certain embodiments, the strained alkene-containing compound is Cy5-TCO. In certain embodiments, the strained alkene-containing compound is c(RGDfK)-TCO. In certain embodiments, the strained alkene-containing compound is vancomycin-TCO.

The present disclosure further provides a composition comprising a reaction product of the compound of the present disclosure and a strained alkene-containing compound, wherein the strained alkene-containing compound comprises a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid.

Methods of Surface Functionalization

The present disclosure further provides a method of coating a surface.

In certain embodiments, the method comprises contacting at least a portion of the surface with a composition comprising the compound of the present disclosure with or without tyrosinase or a biologically active fragment thereof to provide a first layer.

In certain embodiments, the method comprises contacting the first layer with a strained alkene-containing compound, to provide a coating composition. In certain embodiments, the strained alkene-containing compound comprises a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid. In certain embodiments, at least a portion of the surface is coated with the coating composition.

In certain embodiments, the composition is applied to the surface by drop coating or dip coating. In certain embodiments, the strained alkene-containing compound is applied to the first layer by drop coating or dip coating.

In certain embodiments, the contacting of the compound of the present disclosure and tyrosinase or a biologically active fragment thereof occurs at room temperature. In certain embodiments, the first layer is washed with a buffered solution before contact with the strained alkene-containing compound. In certain embodiments, the buffered solution is a phosphate buffered saline (PBS) solution. In certain embodiments, the contacting of the first layer and the strained alkene-containing compound occurs at room temperature. In certain embodiments, the coating composition is washed with a solvent selected from the group consisting of a buffered solution and an alcohol. In certain embodiments, the buffered solution is a phosphate buffered saline solution (PBS). In certain embodiments, the alcohol is ethanol. In certain embodiments, the alcohol is methanol.

In certain embodiments, the contacting occurs for a period of about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 and about 2 hours. In certain embodiments, the contacting occurs for a period of greater than 2 hours. In certain embodiments, the contacting occurs for a period of about 3, 4, 5, 6, 7, 8, 9, 10, 11, 12, 13, 14, 15, 16, 17, 18, 19, 20, 21, 22, 23, or about 24 hours.

In certain embodiments, the compound of the present disclosure has a concentration of about 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5 and about 20 mM when contacted with tyrosinase or a biologically active fragment thereof.

In certain embodiments, the tyrosinase or a biologically active fragment thereof has a concentration of about 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, and about 3000 units/mL when contacted with the composition of the present disclosure. In certain embodiments, the tyrosinase or a biologically active fragment thereof has a concentration which is greater than 3000 units/mL.

In certain embodiments, the strained alkene-containing compound has a concentration of about 0.01, 0.02, 0.03, 0.04, 0.05, 0.06, 0.07, 0.08, 0.09, 0.10, 0.15, 0.20, 0.30, 0.40, 0.50, 0.60, 0.70, 0.80, 0.90, 1.00, 1.10, 1.20, 1.30, 1.40, 1.50, 1.60, 1.70, 1.80, 1.90, and about 2.00 mM when contacted with the first layer. In certain embodiments, the strained alkene-containing compound has a concentration which is greater than 2.00 mM.

In certain embodiments, the strained alkene-containing compound comprises at least one moiety selected from the group consisting of trans-cyclooctene (TCO), cyclopropene, cyclobutene, and norbornene.

In certain embodiments, the strained alkene-containing compound comprises a compound of Formula (II):

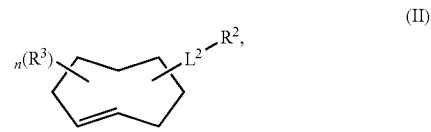

(II)

wherein:
L$^2$ is selected from the group consisting of a bond, -A$^1$-(optionally substituted C$_1$-C$_{30}$ alkenylene)-A$^2$-', and -A$^1$-(optionally substituted C$_2$-C$_{30}$ heteroalkylene)-A$^2$-', wherein ' indicates a bond between L$^2$ and R$^2$;

A$^1$ and A$^2$ are each independently selected from the group consisting of a bond, —O—, —NR"—, —C(=O)—, —C(=O)NR"—, —C(=O)O—, C(=O)NR"— —OC(=O)NR"—, and —NR"C(=O)O—;

each occurrence of R" is independently selected from the group consisting of H, optionally substituted C$_1$-C$_6$ alkyl, optionally substituted C$_2$-C$_6$ alkenyl, optionally substituted C$_6$-C$_{10}$ aryl, and optionally substituted C$_2$-C$_8$ heteroaryl;

R$^2$ is selected from the group consisting of a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid;

each occurrence of R$^3$ is independently selected from the group consisting of H, optionally substituted C$_1$-C$_6$ alkyl, optionally substituted C$_2$-C$_6$ alkenyl, optionally substituted C$_6$-C$_{10}$ aryl, and optionally substituted C$_2$-C$_8$ heteroaryl; and n is an integer selected from the group consisting of 0, 1, 2, 3, 4, 5, 6, 7, 8, 9, 10, 11, 12, and 13.

In certain embodiments, each occurrence of R$^3$ is H.

In certain embodiments, L$^2$ is —O(C=O)NH(CH$_2$CH$_2$O)$_8$CH$_2$CH$_2$C(=O)—'.

In certain embodiments, R$^2$ is an enzyme. In certain embodiments, R$^2$ is alkaline phosphatase (ALP) (SEQ ID NO:2). In certain embodiments, R$^2$ is glucose oxidase (GOx) (SEQ ID NO:3). In certain embodiments, R$^2$ is horseradish peroxidase (HRP) (SEQ ID NO:4). In certain embodiments, R$^2$ is a cyclic peptide. In certain embodiments, R$^2$ is c(RGDfK). In certain embodiments, R$^2$ is a fluorophore. In certain embodiments, R$^2$ is Cy5. In certain embodiments, R$^2$ is a therapeutic agent. In certain embodiments, R$^2$ is vancomycin.

In certain embodiments, the strained alkene-containing compound is ALP-TCO. In certain embodiments, the strained alkene-containing compound is GOx-TCO. In certain embodiments, the strained alkene-containing compound is HRP-TCO. In certain embodiments, the strained alkene-containing compound is Cy5-TCO. In certain embodiments, the strained alkene-containing compound is c(RGDfK)-TCO. In certain embodiments, the strained alkene-containing compound is vancomycin-TCO.

The present disclosure further provides a method of coating a surface.

In certain embodiments, the method comprises contacting the compound of the present disclosure and a strained alkene-containing compound, to provide a first reaction product. In certain embodiments, the strained alkene-containing compound comprises a chromophore, fluorogenic molecule, oligonucleotide, polynucleotide, nucleic acid, polyethylene glycol, peptide, polypeptide, enzyme, protein, therapeutic agent, nanoparticle, heterocatalyst, organic catalyst, or lipid.

In certain embodiments, the method comprises contacting at least a portion of the surface with a composition comprising the first reaction product and tyrosinase or a biologically active fragment thereof to provide a coating composition.

In certain embodiments, at least a portion of the surface is coated with the coating composition.

In certain embodiments, the contacting of the compound of the present disclosure and the strained alkene-containing compound occurs at room temperature.

In certain embodiments, the contacting of the compound of the present disclosure and the strained alkene-containing compound occurs for a period of about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 and about 2 hours. In certain embodiments, the contacting occurs for a period of greater than 2 hours. In certain embodiments, the contacting occurs for a period of about 3, 4, 5, 6, 7, 8, 9, 10, 11, 12, 13, 14, 15, 16, 17, 18, 19, 20, 21, 22, 23, or about 24 hours.

In certain embodiments, the contacting of the first reaction product and tyrosinase or a biologically active fragment thereof occurs at room temperature.

In certain embodiments, the contacting of the first reaction product and tyrosinase or a biologically active fragment thereof occurs for a period of about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 and about 2 hours. In certain embodiments, the contacting occurs for a period of greater than 2 hours. In certain embodiments, the contacting occurs for a period of about 3, 4, 5, 6, 7, 8, 9, 10, 11, 12, 13, 14, 15, 16, 17, 18, 19, 20, 21, 22, 23, or about 24 hours.

In certain embodiments, the composition comprising the first reaction product and tyrosinase or a biologically active fragment thereof is applied to the surface by drop coating or dip coating.

In certain embodiments, the compound of the present disclosure has a concentration of about 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5 and about 20 mM when contacted with the strained alkene-containing compound.

In certain embodiments, the strained alkene-containing compound has a concentration of about 1, 5, 10, 15, 20, 25, 30, 35, 40, 45, 50, 55, 60, 65, 70, 75, 80, 85, 90, 95, and about 100 μM when contacted with the compound of the present disclosure.

In certain embodiments, the tyrosinase or a biologically active fragment thereof has a concentration of about 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, and about 3000 units/mL when contacted with the first reaction product. In certain embodiments, the tyrosinase or a biologically active fragment thereof has a concentration which is greater than 3000 units/mL.

In certain embodiments, the strained alkene-containing compound comprises a moiety selected from the group consisting of trans-cyclooctene (TCO), cyclopropene, cyclobutene, and norbornene.

In certain embodiments, the strained alkene-containing compound comprises an enzyme. In certain embodiments, the enzyme is selected from the group consisting of a peroxidase, protease, peptidase, nuclease, lipidase, oxygenase, isomerase, Diels-Alderase, and a CRISPR-associated protein. In certain embodiments, the enzyme is selected from the group consisting of alkaline phosphatase (ALP), glucose oxidase (GOx), and horseradish peroxidase (HRP).

In certain embodiments, the strained alkene-containing compound comprises a fluorophore. In certain embodiments, the fluorophore is Cy5.

In certain embodiments, the strained alkene-containing compound comprises a cyclic peptide. In certain embodiments, the cyclic peptide is c(RGDfK). In certain embodiments, the strained alkene-containing compound is selected from the group consisting of ALP-TCO, GOx-TCO, HRP-TCO, Cy5-TCO, and c(RGDfK)-TCO.

In certain embodiments, the strained alkene-containing compound comprises a compound of Formula (II):

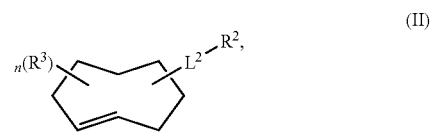

(II)

wherein:
- $L^2$ is selected from the group consisting of a bond, -$A^1$-(optionally substituted $C_1$-$C_{30}$ alkenylene)-$A^2$-', and -$A^1$-(optionally substituted $C_2$-$C_{30}$ heteroalkylene)-$A^2$-', wherein ' indicates a bond between $L^2$ and $R^2$;
- $A^1$ and $A^2$ are each independently selected from the group consisting of a bond, —O—, —NR"—, —C(=O)—, —C(=O)NR"—, —C(=O)O—, C(=O)NR"—OC(=O)NR"—, and —NR"C(=O)O—;
- each occurrence of R" is independently selected from the group consisting of H, optionally substituted $C_1$-$C_6$ alkyl, optionally substituted $C_2$-$C_6$ alkenyl, optionally substituted $C_6$-$C_{10}$ aryl, and optionally substituted $C_2$-$C_8$ heteroaryl;
- $R^2$ is selected from the group consisting of a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid;
- each occurrence of $R^3$ is independently selected from the group consisting of H, optionally substituted $C_1$-$C_6$ alkyl, optionally substituted $C_2$-$C_6$ alkenyl, optionally substituted $C_6$-$C_{10}$ aryl, and optionally substituted $C_2$-$C_8$ heteroaryl; and
- n is an integer selected from the group consisting of 0, 1, 2, 3, 4, 5, 6, 7, 8, 9, 10, 11, 12, and 13.

In certain embodiments, each occurrence of $R^3$ is H.

In certain embodiments, $L^2$ is —O(C=O)NH(CH$_2$CH$_2$O)$_8$CH$_2$CH$_2$C(=O)—'.

In certain embodiments, $R^2$ is an enzyme. In certain embodiments, $R^2$ is alkaline phosphatase (ALP) (SEQ ID NO:2). In certain embodiments, $R^2$ is glucose oxidase (GOx) (SEQ ID NO:3). In certain embodiments, $R^2$ is horseradish peroxidase (HRP) (SEQ ID NO:4). In certain embodiments, R² is a cyclic peptide. In certain embodiments, R² is c(RGDfK). In certain embodiments, R² is a fluorophore. In certain embodiments, R² is Cy5. In certain embodiments, R² is a therapeutic agent. In certain embodiments, R² is vancomycin.

In certain embodiments, the strained alkene-containing compound is ALP-TCO. In certain embodiments, the strained alkene-containing compound is GOx-TCO. In certain embodiments, the strained alkene-containing compound is HRP-TCO. In certain embodiments, the strained alkene-containing compound is Cy5-TCO. In certain embodiments, the strained alkene-containing compound is c(RGDfK)-TCO. In certain embodiments, the strained alkene-containing compound is vancomycin-TCO.

In certain embodiments, the surface comprises a biological surface, metal, stone, glass, wood, ceramic, semi-conductor, polymer, inorganic material, or combinations thereof. In certain embodiments, the polymer is polypropylene. In certain embodiments, the metal is titanium.

In certain embodiments, the biological surface comprises a cell. In certain embodiments, the cell is a eukaryotic cell. In certain embodiments, the eukaryotic cell is a yeast cell or a mammalian cell. In certain embodiments, the mammalian cell is a fibroblast. In certain embodiments, the fibroblast is a mouse embryonic fibroblast (NIH/3T3).

Materials and Methods

General Methods

Near-physiologic buffers were prepared for reactions involving biomolecules. 1× phosphate-buffered saline at pH 7.4 (PBS) (Millipore-Sigma) was prepared per the manufacturer's instructions. Tris-buffered saline (TBS) was produced with 50 mM tris(hydroxymethyl)aminomethane (VWR) and 150 mM NaCl (Millipore-Sigma) and adjusted with HCl (Millipore-Sigma) to produce pH 7.5 (TBS 7.5) and pH 8.5 (TBS 8.5) buffers.

For cell studies, all coating solutions were filtered using a 0.2 μm cellulose filter (VWR International) and coating procedures were performed in a standard biosafety cabinet (ThermoFisher Scientific, USA). Except where noted, all data analysis was done using R version 3.6.3. Welch's t-test was used for comparisons of sample means, as equal sample variances could not be assumed.

Reagents 3,4-dihydroxy-L-phenylalanine (L-DOPA) and dimethylpropan-1-amine HCl salt (EDC.HCl) was purchased from Alfa Aesar. Alkaline phosphatase, para-nitro phenol phosphate, para-nitro phenol, diethanolamine, trypsin, N-α-benzoyl-DL-arginine 4-nitroanilide hydrochloride, N-hydroxy succinimide (NHS), di-tert-butyl dicarbonate (Boc₂O), 3-(ethylimino-methylideneamino)-N,N-trifluoroacetic acid (TFA), N-methylmorpholine (NMM), glutaraldehyde, paraformaldehyde, α-MEM medium, bovine serum albumin (BSA), anti-vinculin monoclonal antibody, fluorescein isothiocyanate (FITC)-labeled goat anti-rabbit IgG, tetramethylrhodamine-isothiocyanate (TRITC)-phalloidin kit, 4',6-diamidino-2-phenylindole dihydrochloride (DAPI), actin cytoskeleton/focal adhesion staining kit (FAK100), and Triton X-100 were purchased from Millipore-Sigma. 1-hydroxybenzotriazole (HOBt) was purchased from TCI America. Methyltetrazine-PEG4-amine HCl salt and Maleimide-PEG9-TCO were purchased from BroadPharm. Cy-5 TCO was purchased from Click Chemistry Tools. 3-(4,5-dimethylthiazol-2-yl)-2,5-diphenyl tetrazolium bromide (MTT) cell proliferation assay kit was purchased from BioVision Inc. Dulbecco's Modified Eagle Medium (DMEM) was purchased from VWR International. If not specified here, other reagents will be detailed elsewhere herein.

Buffers and Solvents

Phosphate-buffered saline (PBS), 4-morpholineethanesulfonic acid (MES), and tris(hydroxymethyl)aminomethane (Tris) were purchased from Millipore-Sigma. $CH_2Cl_2$ and dimethylformamide (DMF) were purchased from Millipore Sigma. Methanol (MeOH), ethyl acetate (EtOAc) and diethyl ether ($Et_2O$) were purchased from Fisher Scientific. Deuterated solvents were purchased from either Cambridge Isotope Laboratories or Millipore Sigma. Deuterated solvents contained 0.05% (v/v) TMS as a secondary internal reference. Water was deionized and filtered to a resistivity of 18.2 ΩM with a Milli-Q® Plus water purification system (Millipore, Massachusetts). Buffers were prepared freshly in Milli-Q® water and their pH were adjusted using HCl or NaOH.

Materials 700 nm fiber diameter NanoECM™ (a randomly oriented electrospun polycaprolactone fiber product) was purchased from Nanofiber Solutions, LLC. Glass was purchased from VWR International. Si/$SiO_2$ wafer substrate was purchased from University Wafer. All of these materials were cleaned ultrasonically in ethanol and water for 15 min before use, except NanoECM, which was used as received. Commercially available pure titanium rods were cut into plates and polished up to 1200 grit using Silicon Carbide paper and then ultrasonically rinsed in acetone, ethanol, and water for 15 min each.

Biologics

NIH3T3 cell line (CAL-1658) was purchased from American Type Culture Collection (ATCC). Vancomycin (from *Streptomyces orientalis*), Alkaline phosphatase (ALP), glucose oxidase (GOx), horseradish peroxidase (HRP), and tyrosinase were purchased from Millipore-Sigma. Cyclo[Arg-Gly-Asp-D-Phe-Lys] (c(RGDfK)) was purchased from Apex Bio.

General Synthetic Methods

For the chemical synthesis of organic compounds, all reactions were performed under a dry nitrogen atmosphere unless otherwise stated. All glassware was oven-dried before use. Purification of the synthesized compounds was performed using a Büchi Reveleris® flash chromatography system equipped with a FlashPure EcoFlex silica (50 μm sphere) column. Observed rotation ($\alpha_{obs}$) values were measured in a standard glass cell (100 mm, 1 mL) using a sodium D-line lamp at 20° C. in a PerkinElmer Model 241 Polarimeter. Specific rotation [α] was calculated based on $[\alpha]^{20}_D = (\alpha_{obs})/[(g_{sample}\text{ in 1 mL}) \times 1\text{ dm}]$. Nuclear Magnetic Resonance (NMR) spectroscopic analyses were carried out on either a Varian VNMRS 500 MHz or Bruker Avance Neo 500 MHz spectrometer. NMR data is provided for new compounds. ¹H NMR spectra were acquired at 500 MHz and ¹³C NMR spectra were acquired at 125 MHz. Chemical shifts (δ) for ¹H NMR spectra were referenced to $(CH_3)_4Si$ at δ=0.00 ppm, to $CHD_2S(O)CD_3$ at δ=2.50 ppm, to HDO at δ=4.79 ppm or to $CHCl_3$ at δ=7.26 ppm. ¹³C NMR spectra were referenced to $CD_3S(O)CD_3$ at δ=39.52 ppm, to $CD_3OD$ at δ=49.00 ppm or to $CDCl_3$ at δ=77.16 ppm. The following abbreviations are used to describe NMR resonances: s (singlet), d (doublet), t (triplet), m (multiplet), dd (doublet of doublet), ddd (doublet of doublet of doublet), br (broad), and app (apparent). Coupling constants (J) are reported in Hz. Liquid chromatography followed by high-resolution mass spectroscopy (LC-HRMS) analysis in the ESI mode was carried out on a Waters Acquity-Xevo G2-XS QTof.

Preparation of Tetrazine-Conjugated L-DOPA and TCO-Conjugated Biomolecules

DOPA-Tet was synthesized from commercially sourced L-DOPA (Alfa-Aesar) and methyltetrazine-PEG4-amine (BroadPharm). Briefly, the amino group of L-DOPA was BOC protected and EDC/HOBt coupling was used to conjugate L-DOPA and methyltetrazine-PEG4-amine. The BOC protecting group was subsequently removed under acidic conditions. TCO-conjugated biomolecules were obtained commercially or prepared using protocols as appropriate for each molecule. Cy5-TCO (Click Chemistry Tools) was purchased and used as received. ALP, GOx, and HRP (all from Millipore-Sigma) were modified with TCO using a TCO-PEG24-COOH linker (BroadPharm) under the EDC/NHS coupling conditions. After conjugation, the resulting TCO-containing enzymes were extracted using a 3 kDa cutoff centrifuge filter (Millipore-Sigma) by centrifugation (Eppendorf 5430R) at 14000 rcf. When establishing concentrations in further experiments, it was assumed that 100% of the enzyme was conjugated and recovered. To functionalize c(RGDfK) (Apex Bio), a commercially available TCO-BEG-NHS linker (BroadPharm) was used. Two equivalents of linker were combined with one equivalent of c(RGDfK) in 50 mM HEPES pH 8.0 buffer (Millipore-Sigma) and incubated at room temperature for 1 hour. The reaction product was confirmed by HR-LCMS and the resultant c(RGDfK)-TCO was used in cell studies without any purification.

Activity Comparison of TCO-Enzymes and Native Enzymes

To verify that TCO-conjugation did not disrupt enzyme activity, three solutions were prepared: 1) 5 mM ALP-TCO and 1 mg/mL p-NPP (Millipore-Sigma), 2) 5 mM ALP-TCO, and 3) 1 mg/mL p-NPP, all in TBS 8.5. Similarly, solutions comprising of 5 mM GOx-TCO, 5 mM HRP-TCO, 1 mM D-glucose (Research Products International), and 1 mM ABTS (Millipore-Sigma) in PBS, were prepared, and four solutions where one of these four components was missing were also prepared. All solutions were incubated at room temperature for 1 hour and their color changes were assessed visually.

The kinetics of the native and TCO-conjugated enzymes were compared quantitatively using two UV-Vis assays. The kinetics of 5 nM ALP, either TCO-conjugated or native, were measured with 2.282 (equivalent to 0.5 mg/mL), 1.826, 1.461, 1.168, 0.935, 0.748, 0.598, 0.479, 0.383, 0.306, 0.245, 0.196, 0.157, 0.125, 0.100, 0.080 mM p-NPP in TBS 8.5 (16 total trials produced with 1.25× serial dilution of the substrate). The kinetics of 5 nM GOx and 5 nM HRP, both TCO-conjugated or both native were measured. A 1.25× serial dilution was performed to produce 24 total trials, with concentrations of 32, 25.6, 20.48, 16.384, 13.107, 10.486, 8.389, 6.711, 5.369, 4.295, 3.436, 2.749, 2.199, 1.759, 1.407, 1.126, 0.901, 0.721, 0.576, 0.461, 0.369, 0.295, 0.236, 0.189 mM ABTS and the same concentrations of D-glucose in PBS.

Both assays produce an increase in absorbance at 405 nm, the evolution of which at room temperature was measured on a microplate reader (SpectraMax iD3) over 1 hour. Small irregularities in the curves of some of the trials were observed in the first 2.5 minutes, so enzyme reaction rates were calculated using data from minutes 2.5-12, which included 19 data points per assay. Additionally, one outlier was observed in the first replicate of the native ALP assay at concentration 0.479 and low regression fitness was observed for the lowest concentration trails of both GOx/HRP assays, concentrations 0.189, 0.236, and 0.295 mM—likely due to their OD being close to the limit of detection of the instrument. These trials were omitted from data analysis. Velocities were estimated by linear regression, and Michaelis-Menten parameters were calculated using both Lineweaver-Burk plots and non-linear least squares regression. R-squared values for all regressions were above 0.95 with the vast majority being above 0.98.

Surface Grafting Method

Figure 5:
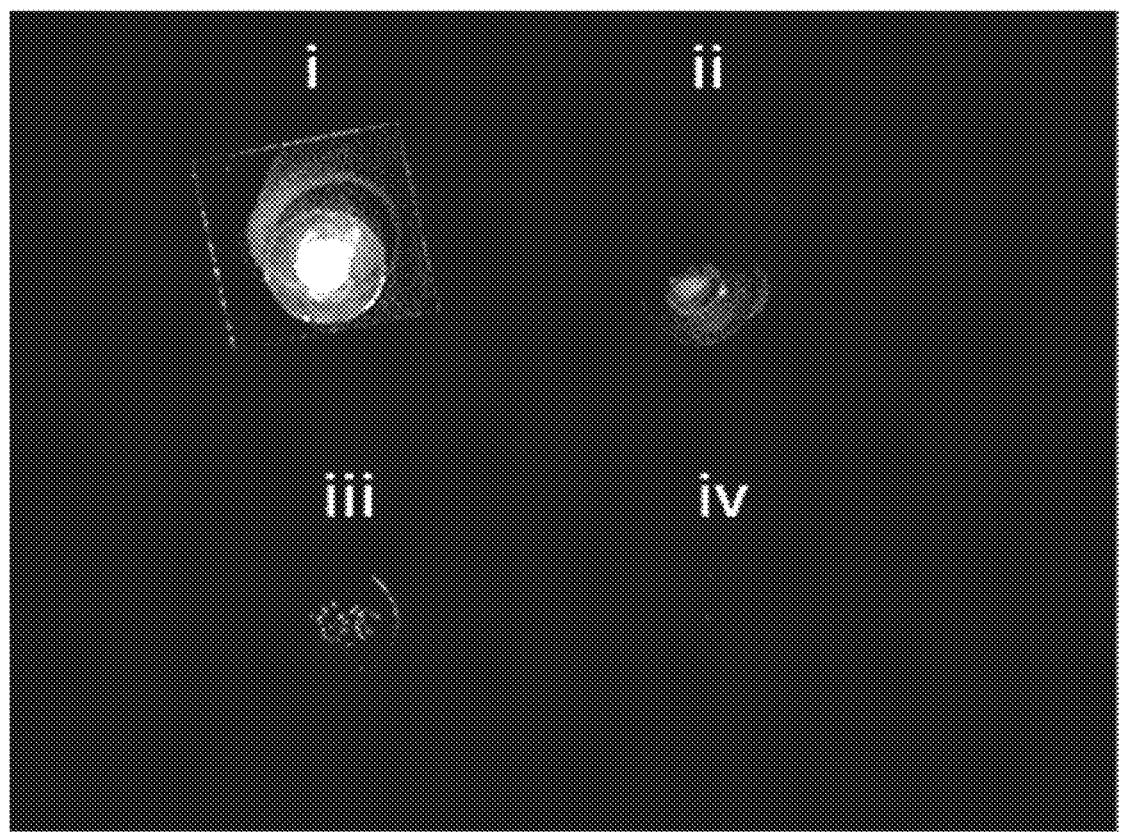
FIG. 5 illustrates Cy5 and Cy5-TCO on DOPA-Tet coated and uncoated titanium discs; (i) Cy5-TCO on DOPA-Tet coating; (ii) Cy5 on DOPA-Tet coating; (iii) Cy5-TCO on uncoated titanium; (iv) Cy5 on uncoated titanium.

In certain embodiments, a general process for functionalizing a surface with an MOI is described herein. In certain embodiments, the surface to be coated is first incubated with a solution of 1-10 mM DOPA-Tet and 2,500 U/mL tyrosinase in PBS for at room temperature for 1-2 hours. After incubation the surface is washed with water or PBS, after which, in certain embodiments, a red-colored film may persist on the surface. This film is observable with concentrations as low as 1 mM DOPA-Tet and serves as a visual indicator of successful coating. When coating with concentrations significantly above 10 mM DOPA-Tet, excessive aggregation and uneven coating were observed. It should also be noted that, due to the synthetic route described herein, the solution of DOPA-Tet will be acidic. Acidified coating solutions from high concentrations of DOPA-Tet were observed to inhibit tyrosinase activity and polymerization. If coating with concentrations above 10 mM, the pH of the coating may need to be adjusted or adequately buffered. After coating and washing away of residual coating material, a solution of 0.1-0.5 mM TCO-conjugated MOI in PBS is incubated on the coated surface at room temperature for 1-2 hours, after which residual solution is washed from the surface. The choice of wash solution was found to be important in removal of unreacted MOI from the surface. It was observed that Cy5 and Cy5-TCO were not readily removed from most surfaces with aqueous solutions, and methanol proved more effective. It was also observed that ALP was more readily washed from coated microcentrifuge tubes with ionic buffers than with water (FIG. 5). After ligation, the coating color diminishes and may become less visible. Checking for differences in surface hydrophobicity with a droplet of water proved useful in verifying that the coating was still present.

Alternatively, the DOPA-Tet, TCO-conjugated MOI, and tyrosinase solutions described above can be applied to a surface directly to perform the surface functionalization process in a single step.

Coating Verification via Small Molecule Fluorophore

Figure 3A:
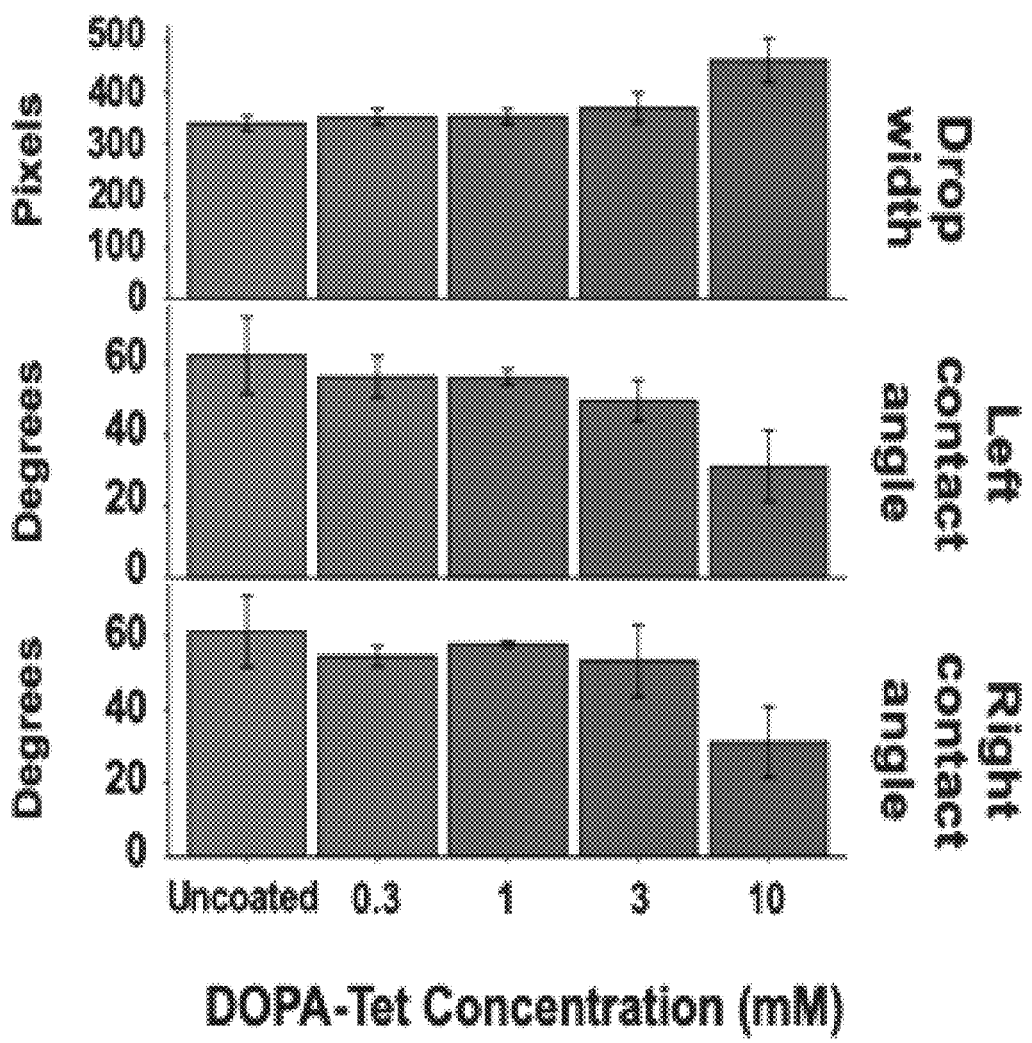
FIG. 3A: Contact angle measurements for sessile drop method on DOPA-Tet coated and uncoated Ti discs (top); DOPA-Tet coated Ti discs (bottom).
Figure 3A:
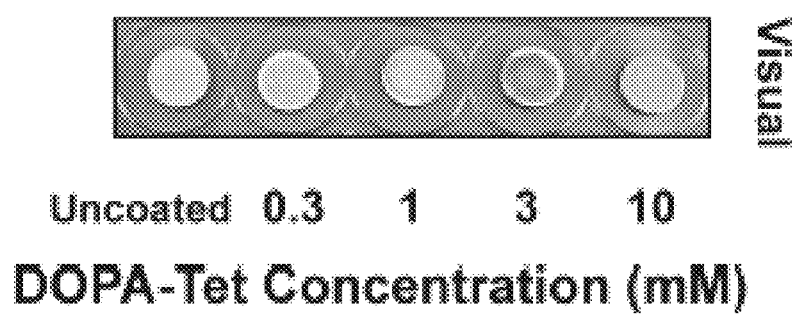

As an initial test of the DOPA-Tet coating method, the plastic handle of a pH strip (Millipore-Sigma) and polypropylene were coated with solutions of 10 mM DOPA-Tet or 10 mM L-DOPA in PBS, both with and without 2,500 U/mL tyrosinase. Samples were covered and incubated at room temperature for 1 hour before washing with DI water. Samples were imaged both before and after rinsing (FIG. 3C).

Cy5-TCO was used to verify the successful grafting of small molecules onto the coating. Titanium discs were either coated with 10 mM DOPA-Tet or left uncoated, and then were incubated with either 0.5 mM Cy5-TCO or 0.5 mM Cy5 (Lumiprobe) for 1 hour at room temperature. All samples were washed with methanol followed by Milli-Q water. After washing, PBS was added to each sample as a mounting media and covered with a glass coverslip. Samples were imaged using a gel imager (BioRad Chemi-Doc MP Imaging System) with the Cy5 blot setting.

Coating Stability at Various pH and in Human Serum

Six 4 mL glass vials (VWR International) were coated with 10 mM DOPA-Tet and incubated for 5 days at 37° C. in 1 mL of either 50 mM MES pH 4.5 (Millipore-Sigma), 100 mM IVIES pH 6.0, PBS, TBS 8.5, 100 mM NaHCO$_3$ pH 9.5 (Millipore-Sigma) or 10% DMSO (Millipore-Sigma) in PBS. After incubation, samples were rinsed with Milli-Q water, dried, and imaged.

Two additional 4 mL glass vials were prepared and incubated in human serum. Both samples were coated with 10 mM DOPA-Tet, and one was grafted with 0.2 mM ALP-TCO. Both samples were incubated in 1 mL of human serum from clotted whole blood (Millipore-Sigma) for 5 days at 37° C. After incubation, both samples were washed with PBS and 1 mL of 1 mg/mL p-NPP was added. After incubation for 1 hour at room temperature, both samples were imaged and their absorbance at 405 nm was measured on a spectrophotometer (NanoDrop One).

Surface Wettability

Static contact angles on coated and uncoated titanium discs were measured using the sessile drop method. Samples coated with 0.3, 1, 3, 10 mM DOPA-Tet or were left uncoated. For each test, 5 µL aliquots of Milli-Q water were added at room temperature to the surface by slowly raising the surface to contact the suspended drop. 10-second videos were recorded on a benchtop goniometer (Ossila L2004A1) during contact and droplet spreading. Contact angles for each frame were calculated using Ossila Contact Angle v.3.1.1.0 and the mean of the last 5 frames, occurring at least 3 seconds after droplet settling, was used for static contact angle analysis. Three replicates of each coated or uncoated sample were prepared and measured.

Stability of Grafted Enzymes After Repeated Use

Eight 0.2 mL microcentrifuge tubes were coated with 50 µL of 10 mM DOPA-Tet. The tubes were washed thoroughly with TBS (pH 7.5). Three tubes each were grafted with 50 µL of either 0.1 mM ALP-TCO or 0.1 mM GOx-TCO and 0.1 mM HRP-TCO. The two remaining coated tubes were not grafted with any enzymes. The tubes were washed thoroughly with TBS (pH 7.5). 25 µL of 1 mg/mL p-NPP in TBS (pH 8.5) was added to the ALP-grafted tubes and 25 µL 1 mM ABTS and 1 mM D-glucose in PBS (pH 7.4) was added to the GOX/HRP grafted tubes. Each substrate solution was also added to one of the tubes that was not grafted (for controls). All eight tubes were incubated at room temperature for 1 hour. Absorbance at 405 nm was measured on a spectrophotometer (Thermo Scientific NanoDropOneC). All tubes were then thoroughly washed with TBS (pH 7.5). Then TBS (pH 8.5) was added to the ALP-grafted tubes and PBS (pH 7.4) was added to the GOX/HRP grafted tubes. Each buffer solution was also added to one of the tubes that was not grafted. All eight tubes were incubated at room temperature for 1 hour after which absorbance at 405 nm was again measured. The buffer solutions were then removed from the tubes. This process of incubating with substrate and then buffer solutions was repeated for all tubes 9 more times, for a total of 10 cycles.

Coating Characterization via XPS

Three samples; a pure titanium disc prepared from a rod (McMaster-Carr), a glass microscope slide (VWR International), and a silicon wafer (University Wafer); were coated with 10 mM DOPA-Tet. Three additional uncoated samples, one of each material, were also prepared. X-ray photoelectron spectroscopy (XPS) (Thermo Scientific K-Alpha™ XPS System) studies were carried out on all six samples using a monochromatic Al Kα source (hv=1486.6 eV) at an energy step of 0.5 eV.

Colorimetric Assay Using ALP

For the colorimetric assay using ALP, TBS was chosen as the buffer for washing and testing, because the high concentration of phosphate in PBS could affect the phosphatase activity of ALP. TCO-conjugated ALP (ALP-TCO) was prepared as described elsewhere herein. 0.2 mL microcentrifuge tubes (Bio-Rad Laboratories) were coated with 10 mM DOPA-Tet. The tubes were washed thoroughly with TBS 7.5 and sonicated to remove any loose aggregates. The tubes were grafted with either 0.2 mM ALP-TCO or 0.2 mM ALP, both in TBS 7.5. 50 µL of 1 mg/mL p-NPP in TBS 8.5 was added to each tube and incubated at room temperature for 1 hour. Absorbance at 405 nm was measured on a spectrophotometer (NanoDrop One). Three replicates for each grafted molecule, ALP-TCO or ALP, were prepared and measured.

Colorimetric Assay Using GOx/HRP

TCO-conjugated GOx (GOx-TCO) and HRP (HRP-TCO) were prepared as described above. 0.2 mL microcentrifuge tubes were coated with 10 mM DOPA-Tet. The tubes were washed with PBS and sonicated to help remove any loose aggregates. The tubes were grafted with either 0.2 mM GOx-TCO and 0.2 mM HRP-TCO, or 0.2 mM GOx and 0.2 mM HRP. 50 µL of 1 mM D-glucose and 1 mM ABTS was added to each tube and were incubated at room temperature for 1 hour. Absorbance at 405 nm was measured on a spectrophotometer (NanoDrop One). Three replicates of each set of enzymes, TCO-conjugated or native, were prepared and measured.

Click-then-Coat Method

The feasibility of adding the MOI to a solution of DOPA-Tet first, allowing conjugation, and then subsequently polymerizing the sample with tyrosinase was evaluated. Solutions of 10 mM DOPA-Tet and 2, 6, 20, or 60 µM GOx-TCO and HRP-TCO were prepared in 0.2 mL microcentrifuge tubes and incubated at room temperature for 2 hours. Tyrosinase was added to a final activity of 2,500 U/mL and the solutions were incubated at room temperature for 2 hours. The tubes were washed with PBS and sonicated to help remove any loose aggregate. 100 µL of 1 mM D-glucose and 1 mM ABTS was added to each tube and incubated at room temperature for 1 hour and the absorbance of the solutions at 405 nm was measured on a spectrophotometer (NanoDrop One).

Cell Culture

NIH3T3 cells (CAL-1658, ATCC) were cultured in DMEM (VWR International) that contained 10% (v/v) fetal bovine serum (FBS) (Hyclone Laboratories, Inc.), 100 units/mL penicillin (VWR International), and 100 µg/mL streptomycin (VWR International). Cultivation was performed in a humidified incubator with 5% $CO_2$ at 37° C. The medium was refreshed every 2-3 days. For cell seeding, sub-confluent cells were harvested using 0.05% trypsin-EDTA, centrifuged, and resuspended to the desired density.

Fibroblast Adhesion and Morphology on NanoECM

TCO-conjugated c(RGDfK) (c(RGDfK)-TCO) was prepared as described above. For sterility, coating solutions were filtered using a 0.2 µm cellulose filter, and coating procedures were performed in a standard biosafety cabinet (Thermo Fisher Scientific, USA). Samples of 700 nm fiber diameter NanoECM (Nanofiber Solutions, LLC) discs were coated with either 3 mM or 10 mM DOPA-Tet and clicked with a solution of 0.5 mM c(RGDfK)-TCO in PBS. NIH3T3 cells ($5 \times 10^4$ cells/mL) were seeded onto uncoated and coated NanoECM substrates in 24-well TCPS plates and cultured at 37° C. for 6 hours. After culturing, the cells were fixed in 4% paraformaldehyde, permeabilized in 0.1% Triton X-100, and stained with a FAK100 kit (Millipore-Sigma) per manufacturer instructions. In brief, the cultures were blocked with 1% BSA in PBS for 30 minutes and incubated with an anti-vinculin monoclonal antibody (1:500 dilution) at RT for 1 hour. Subsequently, they were stained with FITC-conjugated goat anti-mouse IgG (1:100 dilution; 1 hour), TRITC-conjugated phalloidin (1:500 dilution; 1 hour), and DAPI (1:1000 dilution; 5 minutes). The samples were thoroughly washed with PBS and imaged using confocal laser scanning microscopy (CLSM, Zeiss LSM780). Images were processed using either ZENBlack or ImageJ. The F-actin cytoskeleton (via TRITC-phalloidin), vinculin (via anti-vinculin), and nuclei (via DAPI) were visualized as red, green, and blue, respectively.

Fibroblast ECM Deposition on NanoECM

Five samples of NanoECM were coated with 10 mM DOPA-Tet and clicked with 0.5 mM c(RGDfK)-TCO in PBS as described above. Five additional uncoated samples were prepared. NIH3T3 cells ($5 \times 10^4$ cells/mL) were seeded onto each sample and incubated at 37° C. for up to 3 days. At 1, 4, 6, and hours and 1 and 3 days, a sample was gently rinsed with PBS, fixed overnight using 2.5% glutaraldehyde solution at 4° C., and subsequently dehydrated in an ethanol gradient (50-100%) for 15 min. The resultant samples were dried in open air in the biosafety cabinet and sputter-coated with gold before imaging. Samples were imaged via scanning electron microscopy (SEM, Zeiss Sigma, Germany) at an accelerating voltage of 2 keV under vacuum.

MTT Assay

Four samples of NanoECM were coated with 10 mM DOPA-Tet and clicked with 0.5 mM c(RGDfK)-TCO in PBS as described elsewhere herein. Four additional uncoated samples were prepared. The uncoated and coated samples were each incubated in serum-free DMEM at 37° C. for 72 hours with an extraction ratio of 1.25 cm$^2$/mL. The collected extracts were preserved at 4° C. and supplemented with 10% (v/v) FBS before use. NIH3T3 cells ($5 \times 10^4$ cells/mL) were seeded in 96-well tissue culture polystyrene plates (TCPS) and cultured for 24 hours to allow complete attachment. After seeding, the medium was replaced with an equal volume of extract and cultured for 1 day and 3 days. The normal DMEM and 10% DMSO-containing DMEM were set as negative and positive controls, respectively. After culturing, a colorimetric MTT assay (Biovision Incorporated) was performed according to the manufacturer's instructions. Briefly, the culture medium was discarded, and to each well 50 μL of serum-free α-MEM and 50 μL of MTT solution were added. The plates were incubated at 37° C. for 3 hours to yield formazan crystals. The formazan was dissolved in an MTT solvent under gentle shaking in darkness, and its absorbance was measured on a microplate reader (SpectraMax iD3, Molecular Devices) at 590 nm.

Minimum Inhibitory Concentration (MIC) Assay

A glycerol stock of *S. aureus* was struck on a tryptic soy agar plate and incubated overnight at 37° C. Single colonies were then picked and diluted into tryptic soy broth (TSB) and left to grow overnight. Next, the culture was diluted approximately 40-fold into fresh TSB and grown to mid-log phase ($OD_{600}$=0.4 to 0.8). 5 mg/mL stock solutions of Vancomycin-TCO and vancomycin in DMSO were serially diluted two-fold with TBS across the wells of a non-treated 96-well plate, with concentrations ranging from 0.0625 to 128 μg/mL. The mid-log phase cultures were diluted to a final concentration of $5 \times 10^5$ colony forming units (CFU)/mL in TSB then 50 μL was added to each antimicrobial-containing well, giving a final antimicrobial concentration range of 0.031 to 64 μg/mL. All the plates were covered and incubated at 37° C. for 18 to 24 h. The MIC was defined as the lowest compound concentration at which no bacterial growth was visible (n=3).

Biofilm Crystal Violet Assay

100 μL of freshly prepared coating solution containing 10 mM DOPATet and 2500 U/mL tyrosinase in PBS was added to the wells of a 96-well plate and incubated at room temperature for 6 hours. The wells were then washed three times with PBS. 100 μL of 0.2 mM vancomycin-TCO in PBS was added and the plate was incubated at room temperature for 1 hour and subsequently washed with PBS.

As described elsewhere herein, *S. aureus* was grown overnight in TSB, then diluted 1:100 in TSB containing 3% glucose. 300 μL of the dilute bacteria was added to the coated well plate, which was then incubated at 37° C. for 72 hours. After incubation the media was decanted, and the plate was air dried for 5 minutes. 200 μL of 0.9% NaCl in sterile water was gently added to the wells, then decanted, and air dried for 5 minutes. The wells were washed twice more with 0.9% NaCl, and after the final drying, 200 μL methanol was added to each well. The plate was left at room temperature for 15 minutes, then the methanol was decanted and the plate air dried for 5 minutes. 100 μL of 3% crystal violet in sterile water was added to the wells and incubated at room temperature for 20 minutes. The dye was decanted, and the plate air dried. The wells were washed three times with 0.9% NaCl as above. After the final air drying, 150 μL of methanol was added to the wells, and mixed to allow for dissolution of the crystal violet. The dye solution was then decanted and diluted 1:10 in methanol, then the absorbance at 590 nm was recorded.

Biofilm Microscopy Protocol

200 μL of freshly prepared coating solution containing 10 mM DOPA-Tet and 2500 U/mL tyrosinase in PBS was added to a glass bottom culture dish. The dish was incubated at room temperature for 6 hours, during which a coating was formed. The resulting coated surface was washed three times with PBS and 200 μL of 0.2 mM vancomycin-TCO in PBS was added. Then the surface was incubated at room temperature for 1 hour and subsequently washed with PBS.

*S. aureus* was grown overnight in TSB, then diluted 1:100 in TSB containing 3% glucose. 300 μL of the dilute bacteria was added to the microscope dishes, which were then placed in a 37° C. incubator. The samples were incubated for 72 hours, with the media being topped up every day to account for evaporation. The media was decanted and then the dishes were washed with 200 μL of 0.9% NaCl, followed by a 1-hour incubation at room temperature with 250 μL of TSB containing Syto9 (10 μM) and PI (10 μM). The dyes were then decanted and the samples were washed again with saline. Finally, 150 μL of HBSS was added, and the dishes were imaged on a Leica SP8 confocal microscope.

Planktonic Bacterial Growth Inhibition at the Surface

The wells of a non-treated clear 96 well culture plate were either left uncoated or coated with 10 mM DOPA-Tet and then incubated with either vancomycin-TCO, vancomycin, or PBS. A stock of *S. aureus* was grown to mid-log phase ($OD_{600}$=0.4 to 0.8) as above, then diluted to $5 \times 10^5$ CFU/mL in TSB. 100 μL of culture was added to the wells and the plate was covered and incubated at 37° C. for 18 hours, after which 10 μL of PrestoBlue™ was added to each well. After 1 hour incubation, the media was transferred to clean wells and absorbance at 570 nm was recorded using a plate reader.

Live Cell Microscopy of Planktonic Bacteria on the Surface

Sterile glass-bottomed 35 mm dishes were either left uncoated or with 10 mM DOPA-Tet and then incubated with PBS or vancomycin-TCO. A stock of *S. aureus* was grown to mid-log phase (OD$_{600}$=0.4-0.8) as above, then diluted to ~5×10$^5$ CFU/mL in TSB and 250 µL was added to each dish. The plate was incubated at 37° C. for 18 hours, after which the media was decanted. A solution of propidium iodide (PI, 20 µM) and SYTO 9 (3.34 µM) was prepared in sterile Hanks' Buffered Salt Solution (HBSS) and 100 µL was added to each dish. The dishes were incubated for 30 mins in the dark at room temperature, after which the staining solution was decanted and 100 µL of HBSS was added to the dishes. Each dish was then imaged using a 63× oil objective on a Leica TCS SP8 confocal microscope.

EXAMPLES

Various embodiments of the present application can be better understood by reference to the following Examples which are offered by way of illustration. The scope of the present application is not limited to the Examples given herein.

Example 1: Preparation of Tetrazine-Conjugated L-DOPA and TCO-Conjugated Biomolecules Synthesis of (S)-2-((tert-butoxycarbonyl)amino)-3-(3,4-dihydroxyphenyl)propanoic acid (Compound 1)

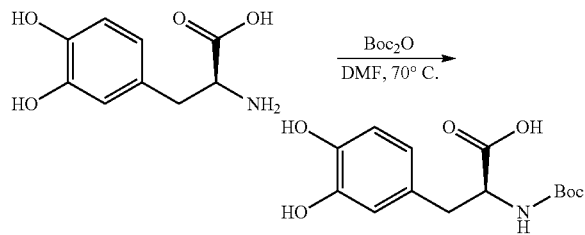

To a 50-mL round-bottom flask L-DOPA (2.00 g, 10.1 mmol, 1 equiv), Boc$_2$O (2.22 g, 10.2 mmol, 1 equiv) and 17 mL of DMF was added. The heterogenous mixture was purged with N$_2$ for 10 minutes and allowed to stir for 19 hours at 70° C. under inert atmosphere. Upon cooling down to RT, 0.716 g of L-DOPA was recovered by filtration. The filtrate was diluted in ca. 50 mL of ethyl acetate and extracted with 5% aqueous citric acid. The aqueous layer was extracted with another 50 mL of ethyl acetate and the combined organic layers were washed with brine and dried over anhydrous sodium sulfate. Decanting the solution and concentrating under reduced pressure afforded 1.92 grams of the known compound (S)-2-((tert-butoxycarbonyl)amino)-3-(3,4-dihydroxyphenyl)propanoic acid (6.5 mmol, 64% isolated yield; 8.8 mmol, 87% based on the recovered starting material) in a thick oil form with opaque white color. $^1$H NMR (500 MHz, d$_6$-DMSO) δ 8.72 (br s, 2H), 6.93 (d, J=8.0 Hz, 1H), 6.61 (d, J=2.0 Hz, 1H), 6.60 (d, J=8.0 Hz, 1H), 6.47 (dd, J=8.0, 2.0 Hz, 1H), 3.97 (ddd, J=10.0, 8.0, 4.5 Hz, 1H), 2.80 (dd, J=14.0, 4.5 Hz, 1H), 2.63 (dd, J=14.0, 10.0 Hz, 1H), and 1.33 (s, 9H). $^{13}$C NMR (125 MHz, d$_6$-DMSO) δ 173.8, 155.4, 144.9, 143.8, 128.7, 119.8, 116.5, 115.3, 78.0, 55.6, 35.9, and 28.2. HRMS (ESI) m/z: [M−H]$^-$ Calculated for C$_{14}$H$_{18}$NO$_6$ 296.1140; found 296.1112. [α]$^{20}_D$=+11.8° (c=0.03 g/mL, MeOH).

Synthesis of tert-butyl (±)-(15-(3,4-dihydroxyphenyl)-1-(4-(6-methyl-1,2,4,5-tetrazin-3-yl)-phenoxy)-13-oxo-3,6,9-trioxa-12-azapentadecan-14-yl)carbamate (Compound 2)

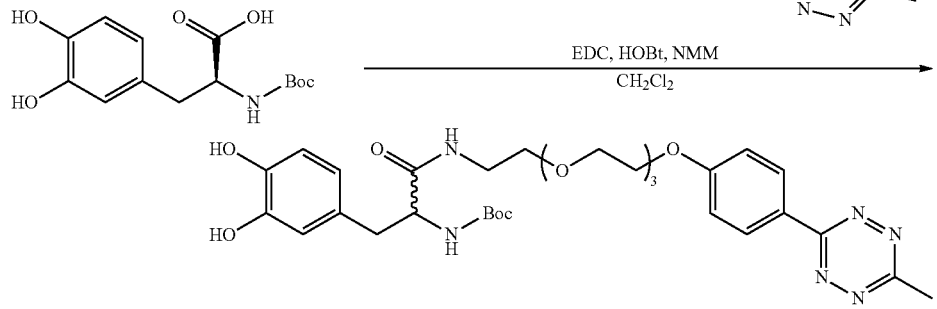

In a 20 mL amber vial, (S)-2-((tert-butoxycarbonyl)amino)-3-(3,4-dihydroxyphenyl)propanoic acid (150 mg, 0.50 mmol, 1 equiv), methyltetrazine-PEG4-amine HCl salt (200 mg, 0.50 mmol, 1 equiv), EDC.HCl (106 mg, 0.55 mmol, 1.1 equiv), HOBt (85 mg, 0.55 mmol, 1.1 equiv) and 5 mL of anhydrous CH$_2$Cl$_2$ were mixed and purged with N$_2$ for 10 minutes. Upon addition of NMM (61 µL, 0.55 mmol, 1.1 equiv) the sealed vial was allowed to stir for 18 hours at RT. The reaction mixture was diluted in CH$_2$Cl$_2$ and extracted with 5% aqueous citric acid solution. The aqueous phase was extracted with CH$_2$Cl$_2$ again and the combined organic layers were washed with brine, dried over sodium sulfate and concentrated under reduced pressure. The crude mixture was purified by silica gel column chromatography (MeOH/CH$_2$Cl$_2$ step gradient) to yield 215 mg of tert-butyl (±)-(15-(3,4-dihydroxyphenyl)-1-(4-(6-methyl-1,2,4,5-tetrazin-3-yl)-phenoxy)-13-oxo-3,6,9-trioxa-12-azapentadecan yl)carbamate (67% isolated) in a foam form with magenta color. $^1$H NMR (500 MHz, CDCl$_3$) δ 8.45 (d, J=9.0 Hz, 2H), 7.01 (d, J=9.0 Hz, 2H), 6.73 (d, J=8.0 Hz, 1H), 6.71 (br s, 1H), 6.52 (d, J=8.0 Hz 1H), 5.38 (br s, 1H), 4.25 (br s, 1H), 4.18-4.14 (m, 2H), 3.86-3.82 (m, 2H), 3.73-3.69 (m, 2H), 3.66-3.61 (m, 2H), 3.59-3.55 (m, 2H), 3.51-3.46 (m, 2H), 3.44-3.19 (m, 4H), 3.01 (s, 3H), 2.95-2.88 (app m, 1H), 2.78 (dd, J=13.0, 8.0 Hz, 1H), and 1.37 (s, 9H). $^{13}$C NMR (125 MHz, CDCl$_3$) δ 171.9, 166.7, 163.8, 162.4, 155.5, 144.4, 143.7, 129.8, 128.6, 124.4, 121.4, 116.6, 115.6, 115.3, 80.3, 70.9, 70.6, 70.5, 70.1, 69.65, 69.63, 67.6, 56.2, 39.4, 38.5, 28.4, and 21.1. HRMS (ESI) m/z: [M+H]$^+$ Calculated for $C_{31}H_{43}N_6O_9$ 643.3086; found 643.3118.

Synthesis of (±)-2-amino-3-(3,4-dihydroxyphenyl)-N-(2-(2-(2-(2-(4-(6-methyl-1,2,4,5-tetrazin-3-yl)phenoxy)ethoxy)ethoxy)ethoxy)ethyl)propanamide (DOPA-Tet)

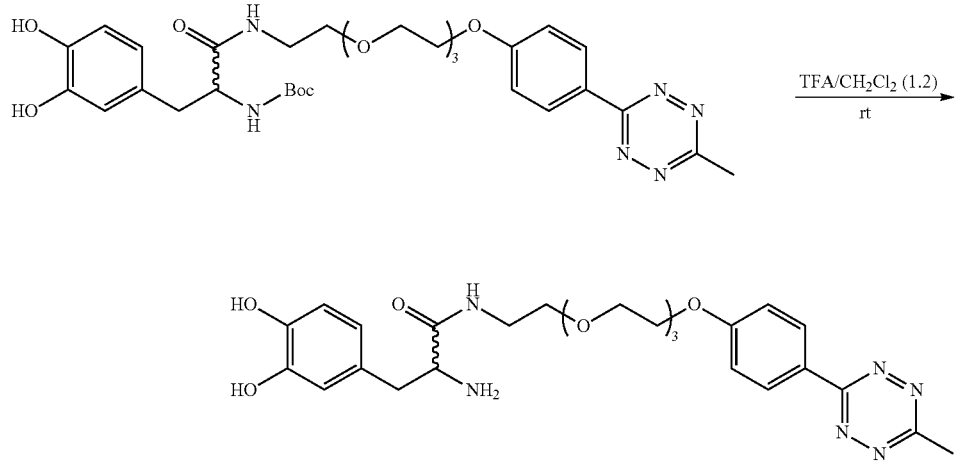

In a 50 mL round bottomed flask, tert-butyl (±)-(15-(3,4-dihydroxyphenyl)-1-(4-(6-methyl-1,2,4,5-tetrazin-3-yl)-phenoxy)-13-oxo-3,6,9-trioxa-12-azapentadecan-14-yl)carbamate (215 mg, 0.335 mmol) was dissolved in 12 mL of $CH_2Cl_2$. After purging with $N_2$ for 10 minutes, 6 mL of previously $N_2$ purged TFA was added to the solution dropwise and the reaction mixture was allowed to stir at RT for 3 hours. The mixture was diluted first with $CH_2Cl_2$ and then chilled $Et_2O$, which resulted in precipitation of the product. The liquid was removed and the remaining precipitate was dried under reduced pressure, providing DOPA-Tet (150 mg, 0.228 mmol, 68% yield) in a powder form with magenta color. An aliquot was dissolved in water and lyophilized for the NMR spectral characterizations. $^1$H NMR (500 MHz, $D_2O$) δ 8.15 (d, J=8.6 Hz, 2H), 7.06 (d, J=8.7 Hz, 2H), 6.69 (d, J=8.1 Hz, 1H), 6.54 (d, J=1.6 Hz, 1H), 6.49 (dd, J=8.1, 1.8 Hz, 1H), 4.26-4.21 (m, 2H), 4.03 (t, J=7.2 Hz, 1H), 3.94-3.89 (m, 2H), 3.80-3.75 (m, 2H), 3.74-3.70 (m, 2H), 3.68-3.65 (m, 2H), 3.61-3.56 (m, 2H), 3.54-3.50 (m, 1H), 3.41 (ddt, J=13.7, 9.8, 5.2 Hz, 2H), 3.24 (ddd, J=15.1, 7.2, 3.7 Hz, 1H), 2.98 (s, 3H), and 2.87 (app d, J=7.0, 2H). $^{13}$C NMR (125 MHz, $CD_3OD$) δ 169.7, 168.1, 165.0, 164.0, 146.8, 146.1, 130.6, 126.8, 125.8, 121.8, 117.5, 116.7, 116.3, 71.7, 71.6, 71.5, 71.2, 70.7, 70.2, 68.9, 56.0, 40.5, 38.2, and 20.9. HRMS (ESI) m/z: [M+H]$^+$ Calculated for $C_{26}H_{35}N_6O_7$ 543.2562; found 543.2599.

Preparation of TCO-substituted ALP, GOx, and HRP

Fresh solutions of EDC and NHS were prepared for this protocol, which is a prerequisite for its successful completion. EDC and NHS will hydrolyze in aqueous solution to unreactive products over time. 20 μL of 200 mM TCO-24EG-COOH was added to 400 μL of 100 mM EDC in 50 mM MES pH 6.0 (final concentrations of 9.5 mM TCO-24EG-COOH and 95 mM EDC). The solution was incubated at room temperature for 15 minutes. After incubation, 400 μL of 200 mM NHS in 50 mM MES pH 6.0 was added to the solution (final concentration of 97.5 mM NHS and approximately 4.9 mM TCO-24EG-COEDC). The solution was incubated at room temperature for 30 minutes. To this solution 200 μL of either 0.344 mM ALP in 50 mM TBS pH 7.4, 1 mM GOx in 1× PBS pH 7.4, or 0.5 mM HRP in 1× PBS pH 7.4 was added. The solution was tumbled and incubated at room temperature for 2 hours to complete the reaction and produce the TCO-conjugated enzyme.

After reaction completion, 0.4 mL of the reaction solution was added to a 3 kDa cutoff centrifuge filter (UFC5003, Sigma) and centrifuged (Eppendorf 5430R) at 14,000 rcf for 15 minutes. The filtrate in the tube was discarded, and additional 0.4 mL aliquots of the reaction solution were added to the filter, centrifuged, and the filtrate discarded, until all the reaction solution was filtered. Two successive aliquots of 0.4 mL Milli-Q filtered water were added to the filter and centrifuged at 14,000 rcf for 15 minutes to wash away any remaining reaction reagents. The filtrate was discarded, and the tube was washed with Milli-Q filtered water. 0.5 mL of eluent, either 50 mM TBS pH 7.5 for ALP or 1× PBS pH 7.4 for HRP or GOx, was added to the filter and the filter was inverted in the collection tube. The tube was centrifuged on a mini centrifuge at approximately 3000 rcf for 15 seconds and the eluent was collected. An additional 0.5 mL of eluent was added to the filter and the filter was again inverted and centrifuged and the eluent collect. Both eluents were combined (approximately 1 mL total) and this was the purified product.

The purified product was added to a 2 mL Eppendorf tube and frozen at −80° C. overnight. 5 holes were made in the cap of the tube with a 20-gauge needle. The tube was lyophilized (Labconco Freezone 4.5 Plus) at approximately 0.06 torr pressure and −80° C. until the product was dry (approximately 4 hours). For some runs, the products were lyophilized overnight (for approximately 16 hours) without issue. After lyophilization, either 50 mM TBS pH 7.5 for ALP or 1× PBS pH 7.4 for HRP or GOx, was added to the tube to make a stock solution of the TCO-conjugated enzyme at the desired concentration (typically 0.5 mM). For calculations of the concentration of the final product, it was assumed that 100% of enzyme was successfully conjugated and recovered Synthesis of TCO-Containing c(RGDfK)

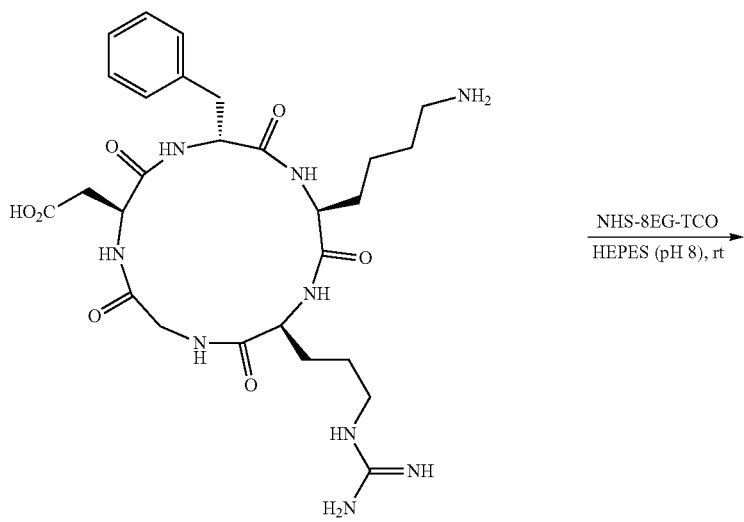

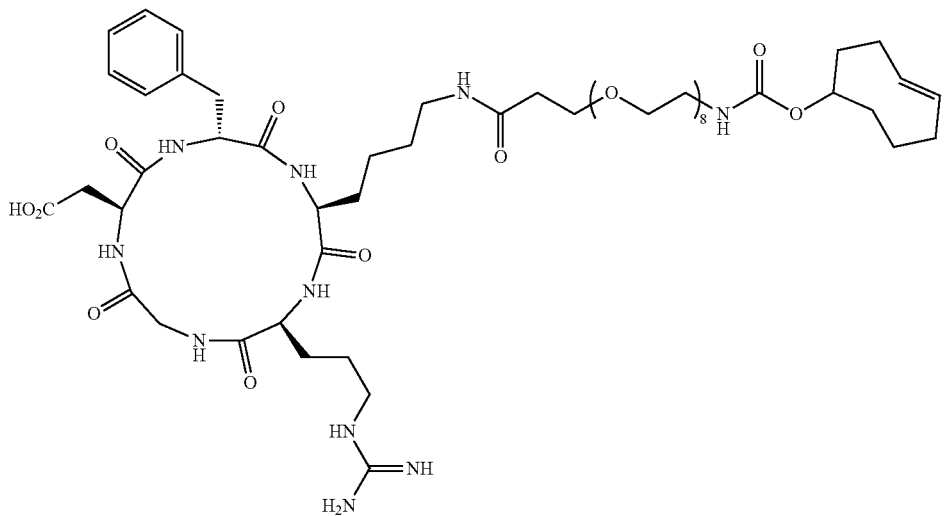

Commercially available TCO-BEG-NHS linker (Broad-Pharm) was used to functionalize c(RGDfK) (Apex Bio). Two equivalents of linker were combined with one equivalent of c(RGDfK) in 50 mM HEPES pH 8.0 buffer (Millipore-Sigma) and incubated at room temperature for 1 hour. The reaction product was confirmed by HR-LCMS and the resultant c(RGDfK)-TCO was used in cell studies without any purification. HR-LCMS (ESI) m/z: [M+H]$^+$ Calculated for $C_{55}H_{91}N_{10}O_{18}$ 1179.6507; found 1179.6511.

Synthesis of Vancomycin-TCO

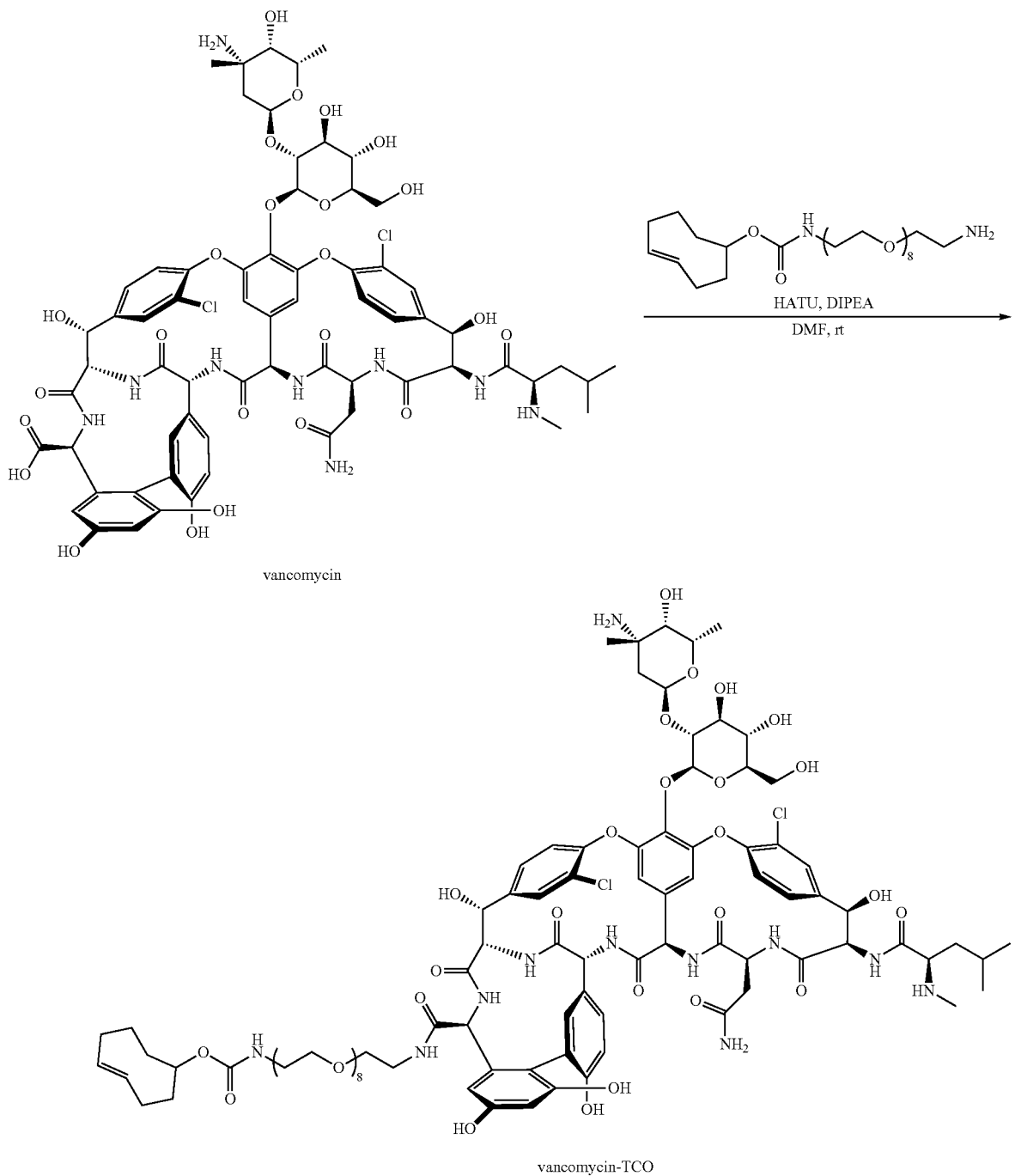

Vancomycin-HCl (90.8 mg, 0.061 mmol, 1 equiv) was suspended in 2 mL DMF under nitrogen, then DIPEA (31.9 µL, 0.183 mmol, 3 equiv) and HATU (69.7 mg, 0.183 mmol, 3 equiv) were added. The resulting yellow solution was stirred for 5 minutes, then TCO-PEG8-NH$_2$ (43.1 mg, 0.076 mmol, 1.3 equiv) dissolved in 1 mL DMF was added. The mixture was stirred overnight at room temperature, quenched with water, and directly concentrated under reduced pressure. The crude product was redissolved in water and purified using reverse-phase chromatography on C18 column (Eluent A: 0.1% TFA in H$_2$O, Eluent B: 0.1% TFA in CAN, step gradient from 100% Eluent A to 100% B). Product fractions (based on HRMS) were collected and lyophilized, providing vancomycin-TCO (46.1 mg, 38% isolated yield) as a pale-yellow solid. For NMR characterization and biofilm assays, this material was subjected to HPLC purification (same elution system as described elsewhere herein).

$^1$H-NMR (500 MHz, (DMSO-d$_6$) δ 9.31 (d, J=3.2 Hz, 1H), 8.97 (br s, 1H), 7.86 (d, J=1.0 Hz, 1H), 7.75-7.63 (m, 1H), 7.55 (d, J=8.4 Hz, 1H), 7.50 (s, 1H), 7.46 (dd, J=8.4, 1.3 Hz, 1H), 7.33 (d, J=8.4 Hz, 1H), 7.28 (br s, 2H), 7.20 (s,

1H), 6.76 (d, J=8.3, 1H), 6.70 (dd, J=8.3, 2.2 Hz, 1H), 6.65 (br s, 1H), 6.39-6.35 (m, 1H), 6.25 (app s, 1H), 5.97 (app s, 1H), 5.86 (d, J=6.2 Hz, 1H), 5.76 (s, 1H), 5.62-5.53 (m, 2H), 5.43 (ddd, J=14.6 Hz, J=11.0 Hz, J=3.5 Hz, 1H), 5.36 (d, J=5.5 Hz, 1H), 5.28-5.21 (m, 2H), 5.18 (app s, 2H), 5.11 (br s, 1H), 4.94 (br s, 1H), 4.68 (q, J=6.4 Hz, 1H), 4.44 (s, 1H), 4.39 (s, 1H), 4.28-4.17 (m, 2H), 4.06-4.00 (m, 1H), 3.94 (br s, 1H), 3.68 (d, J=10.4 Hz, 1H), 3.59-3.46 (m, 28H)*, 3.39-3.35 (m, 2H), 3.27 (s, 2H), 3.17 (s, 1H), 3.13-3.03 (m, 2H), 2.92 (s, 1H), 2.64 (app br s, 2H), 2.34-2.08 (m, 4H), 1.95-1.80 (m, 4H), 1.30 (s, 3H), 1.69-1.60 (m, 3H), 1.60-1.49 (m, 3H), 1.49-1.41 (m, 1H), 1.30 (app s, 3H), 1.07 (d, J=6.0 Hz, 3H), 0.91 (d, J=6.0 Hz, 3H), 0.86 (d, J=6.0 Hz, 3H); *ethylene glycol units. $^{13}$C-NMR (125 MHz, DMSO-$d_6$) δ 171.44, 171.39, 171.37, 171.32, 170.32, 170.14, 169.02, 167.94, 158.01, 157.76, 157.52, 157.11, 156.27, 155.80, 154.97, 152.57, 151.25, 148.16, 142.49, 139.65, 137.55, 135.55, 134.93*, 132.53*, 131.92, 129.65, 129.48, 127.29, 127.21, 126.30, 125.28, 124.36, 123.40, 121.18, 118.53, 116.14, 113.73, 107.35, 104.65, 101.98, 101.25, 96.75, 79.07*, 78.19, 76.99, 76.73, 74.42*, 69.77*‡, 69.72*, 69.63*, 69.52*, 69.16*, 69.14*, 68.92*, 63.10, 61.96, 61.88, 61.23, 61.12, 57.40, 54.84, 53.83, 53.78, 53.63, 50.94, 40.68, 38.19*, 33.75*, 33.70, 33.12, 32.16*, 31.26, 31.15, 30.59*, 29.00, 25.28, 25.14, 24.54, 23.69, 22.74, 22.51, 22.47, 22.43, 22.32, 21.93, 16.80; *TCO-PEG8 group; ‡10 Cs, representing 5 repeating units of ethylene glycol, or more with potential overlap. HRMS (ESI) m/z: Calculated for $[C_{93}H_{127}Cl_2N_{11}O_{33}]^{2+}$, $[M+2H]^{2+}$, requires 997.8987; found 997.9009.

Example 2: Activity Comparison of TCO-Enzymes and Native Enzymes

Figure 3B:
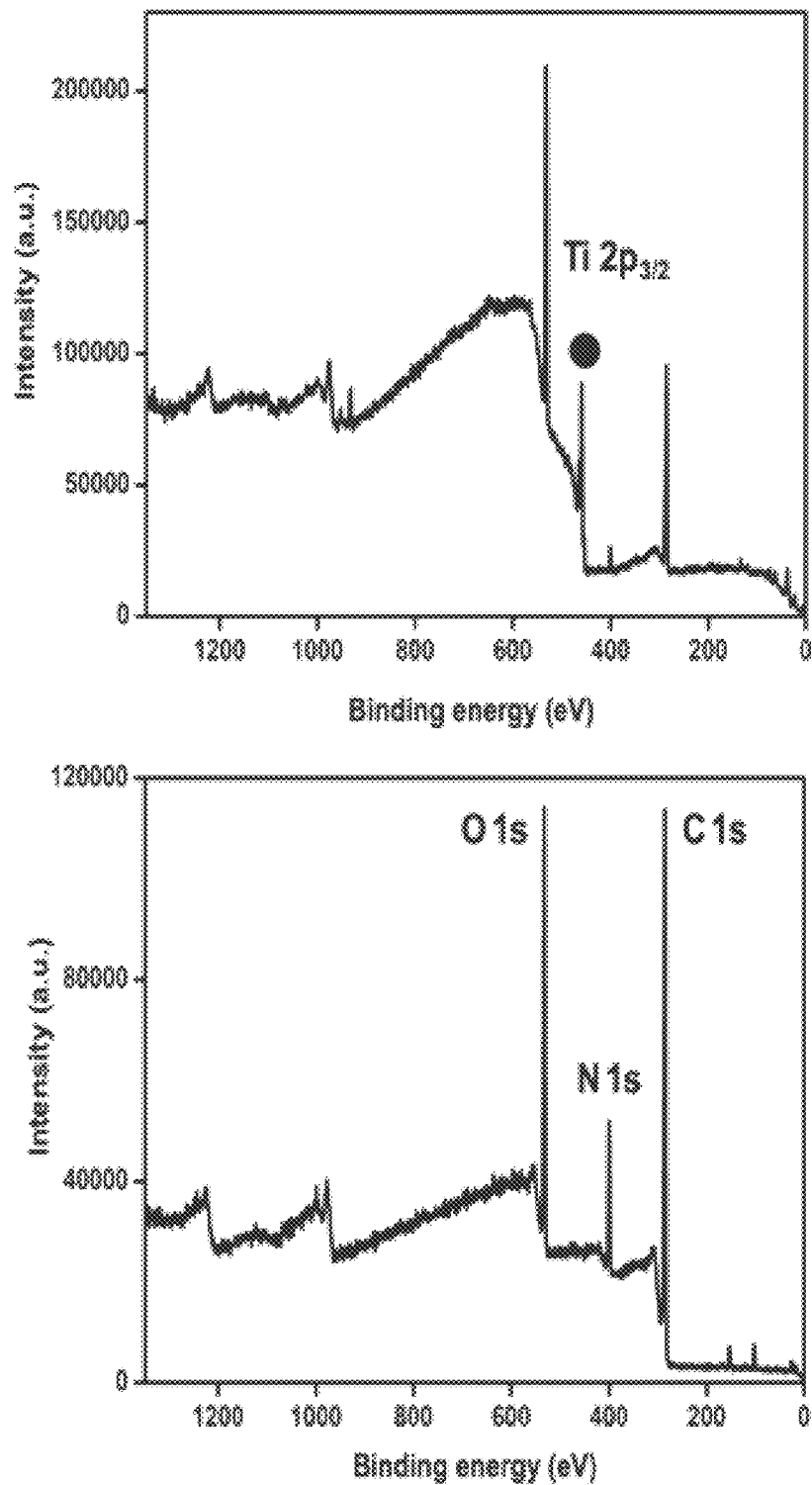
FIG. 3B: XPS spectra of Ti/$TiO_2$ before (top) and after (bottom) coating with 10 mM DOPA-Tet. The black dot denotes substrate peak.
Figure 3C:
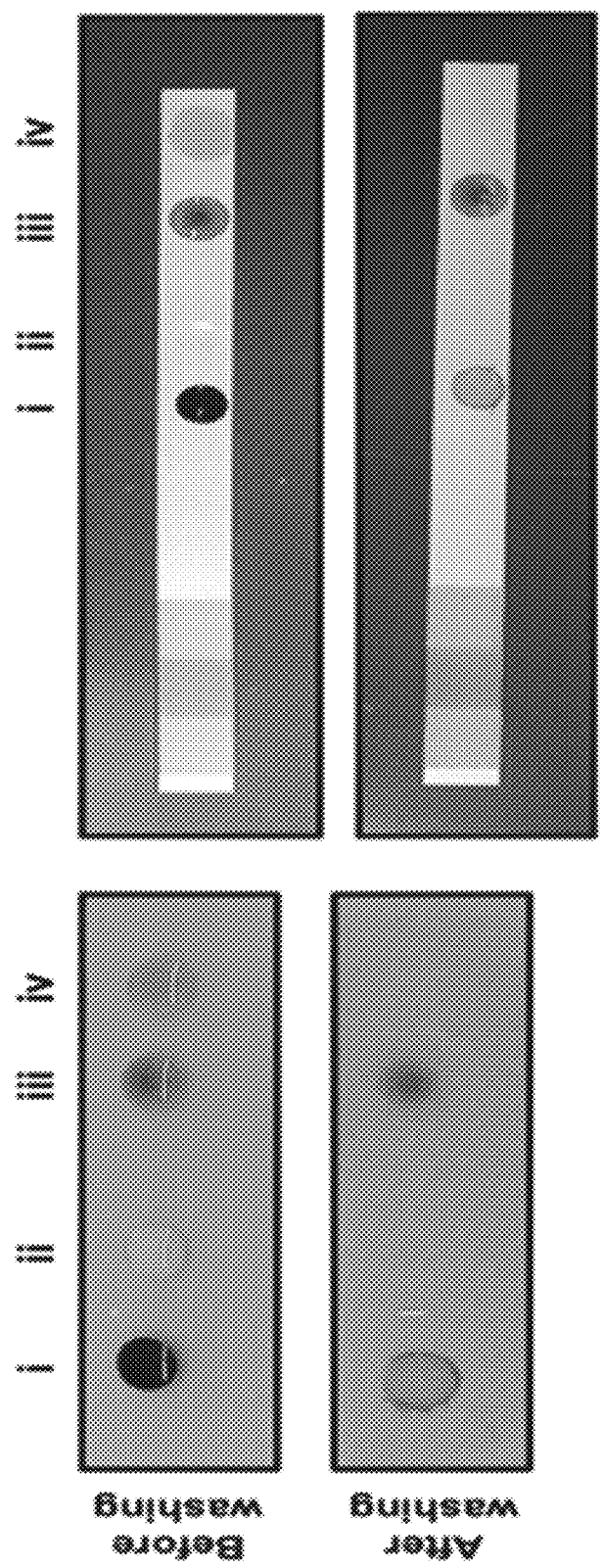
FIG. 3C: Polyproylene surface (left) and pH test strip handle (right) incubated with (i) L-DOPA and tyrosinase, (ii) L-DOPA, (iii) DOPA-Tet and tyrosinase, and (iv) DOPA-Tet. before (top) and after (bottom) rinsing away coating solutions.

Assays prepared from TCO-conjugated enzymes successfully produced the expected color changes, which only occurred when all necessary reaction components were present (FIG. 3B). A solution of 5 nM ALP-TCO and 1 mg/mL p-NPP together in TBS 8.5 incubated at room temperature for 1 hour produced the expected change from colorless to yellow, whereas solutions of only 5 nM ALP-TCO or 1 mg/mL p-NPP in TBS 8.5 did not change color. Similarly, a solution of 5 nM GOx-TCO, 5 nM HRP-TCO, 1 mM D-glucose, and 1 mM ABTS in PBS incubated at room temperature for 1 hour produced the expected change from colorless to blue-green, whereas the same solution missing any one of the components produced no color change.

Figure 3D:
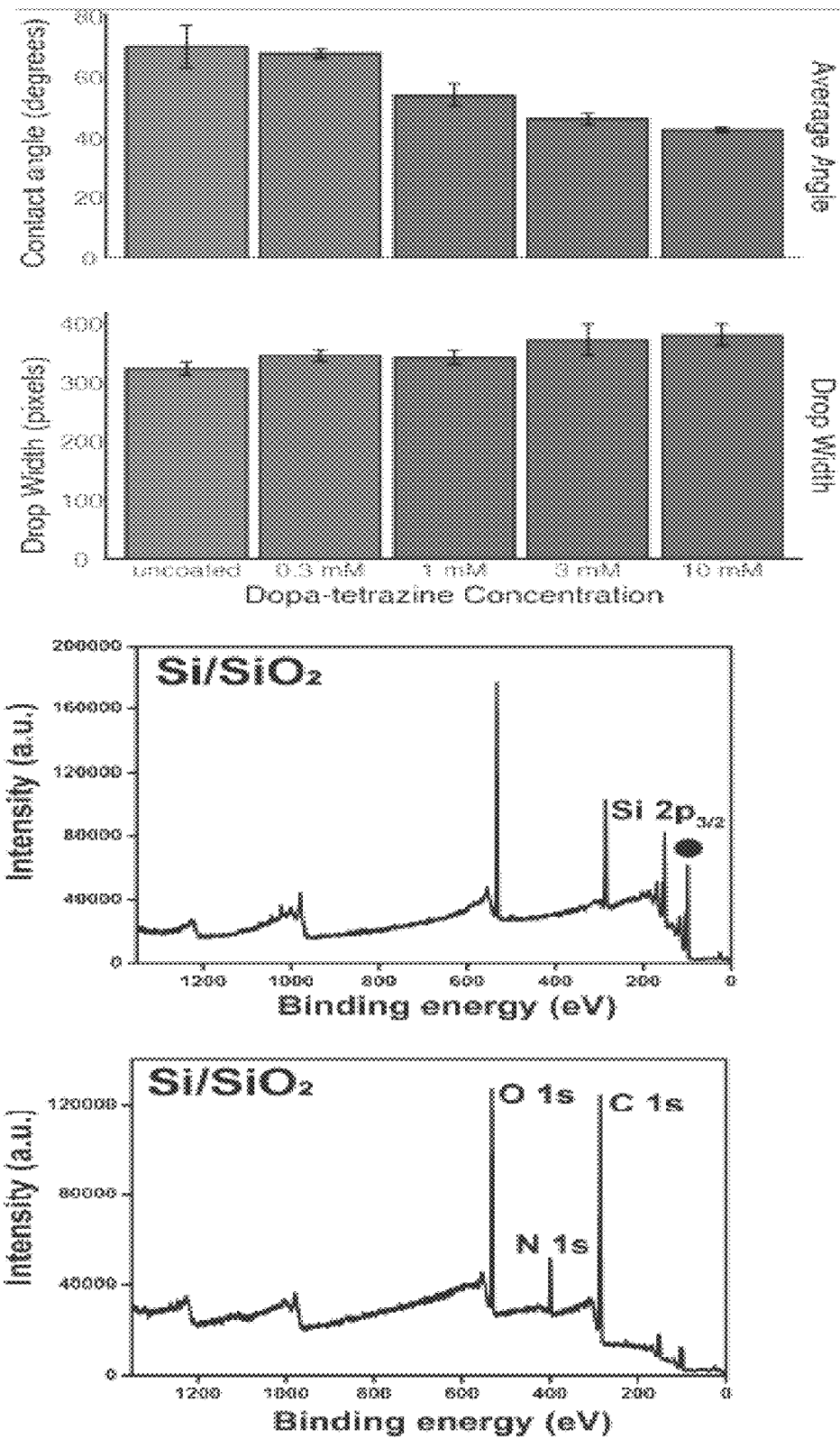
FIGS. 3D-3E provide coating characterization data for uncoated and DOPA-Tet coated silicon (FIG. 3D) and glass (FIG. 3E) surfaces; sessile drop (top) and XPS spectra (middle and bottom).
Figure 3E:
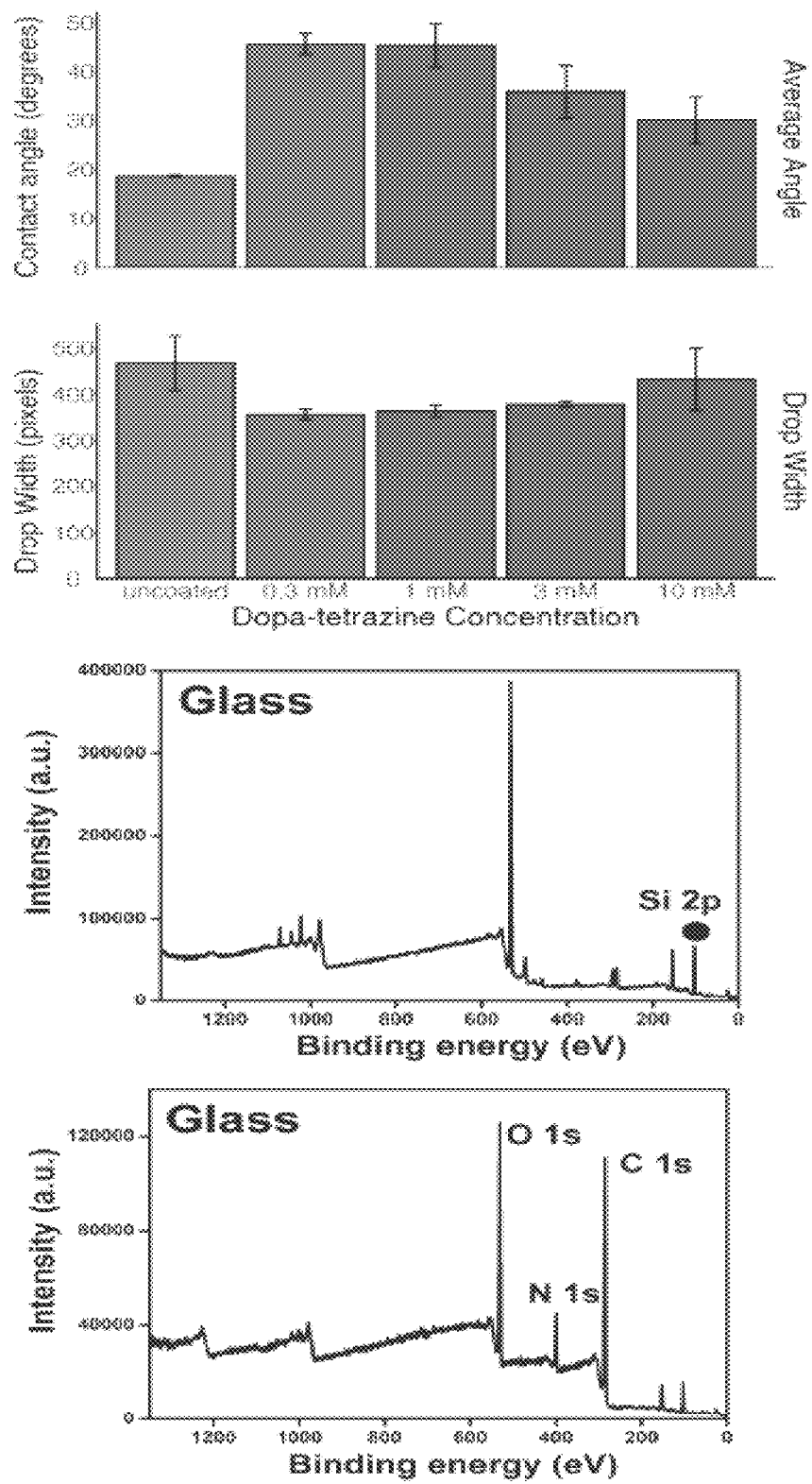

In a comparison of the reaction kinetics of the native and TCO-conjugated enzymes, estimations of Michaelis-Menten parameters using both Lineweaver-Burk plots (LB) and non-linear least squared regression (nls) showed that the native and TCO-conjugated systems showed similar activities for both systems (FIGS. 3C-3E). For ALP, $K_m$=0.281 mM by LB and $K_m$=0.207 mM by nls. Similarly for ALP-TCO, $K_m$=0.179 mM by LB and $K_m$=0.151 mM for nls. No statistically significant difference in the means of ALP and ALP-TCO was established (p=0.278 by LB and p=0.162 by nls). A similar relation was observed for the GOx HRP system, where the native enzymes had a $K_m$=9.13 mM by LB and $K_m$=13.5 mM by nls, and the TCO-conjugated enzymes showed a similar $K_m$=6.63 mM by LB and $K_m$=9.89 mM by nls. No statistically significant difference in the means was established (p=0.156 by LB and p=0.153 by nls).

The preservation of activity in the TCO-conjugated molecules suggests minimal enzyme degradation or denaturation during the conjugation process. These results also confirm that both GOx-TCO and HRP-TCO must be present to produce a color change in an ABTS/glucose solution and that the coenzymes of GOx and HRP, FAD and heme, respectively, are not lost or disrupted by the enzyme-TCO conjugation.

Example 3: Surface Grafting Method

After incubation of the material substrate with DOPA-Tet and tyrosinase, a red-colored film forms on the surface. This film was observable with concentrations as low as 1 mM DOPA-Tet and serves as a good indicator of successful coating. When coating with concentrations significantly above 10 mM DOPA-Tet, excessive aggregation and uneven coating were observed.

The choice of solution used in washing the surface grafted with the MOI was found to be crucial. A test was performed to examine the efficacy of various solvents and buffers in removing native ALP from DOPA-Tet coated surfaces. Seven wash solutions were prepared: 1) Milli-Q filtered water, 2) 50% ethanol, 3) 50 mM TBS pH 7.5, 4) 5× PBS pH 7.4, 5) 50 mM IVIES and 180 mM NaCl pH 5.2, 6) 100 mM $NaHCO_3$ pH 9.5, 7) 500 mM pyridine in 50 mM TBS pH 7.5. Wells in a black 96-well plate (Grenier) were coated with 10 mM DOPA-Tet and incubated with 0.25 mM ALP (approximately 40 mg/mL) for 1 hour. The ALP solution was removed, and each well was washed with twice with 300 µL the chosen wash solution. For the "fast" group, a third wash was performed with the wash solution. For the "overnight" group, a third quantity of wash solution was added to each well and incubated for approximately 12 hours before being removed.

Figure 4:
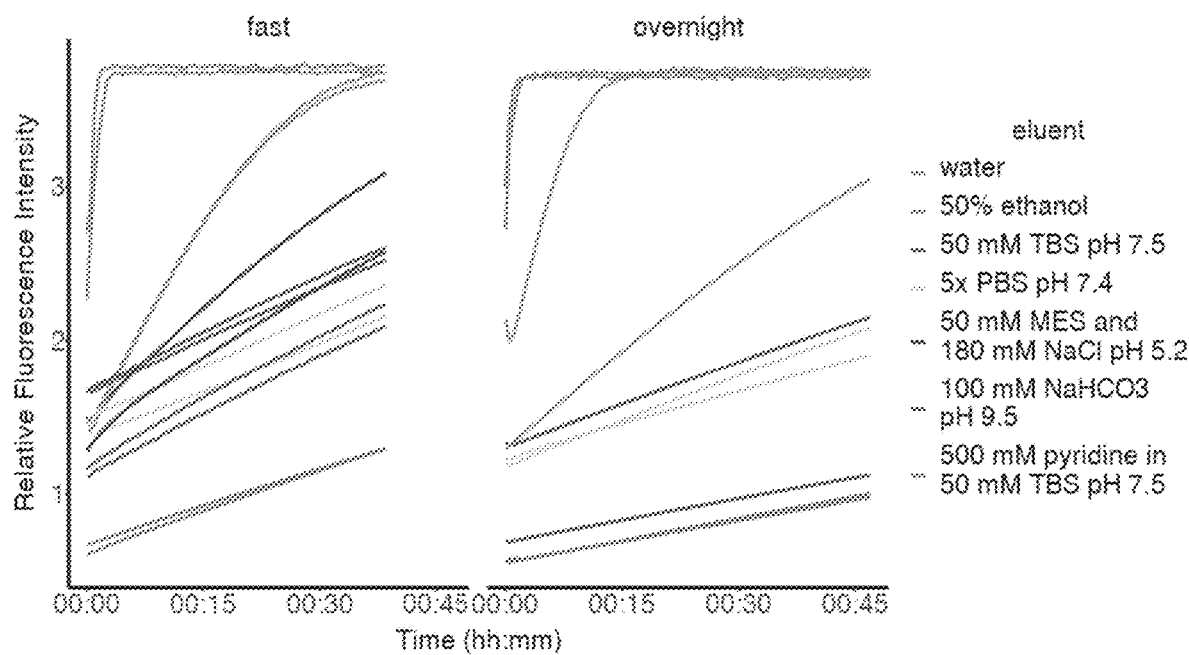
FIG. 4 illustrates residual alkaline phosphatase (ALP) activity on a solution of p-NPP in DOPA-Tet coated microcentrifuge tubes incubated with ALP after washing with various eluents.

After washing, 100 µL 1 mg/mL p-NPP was added to each well and the change in absorbance at 405 nm was measured on a microplate reader (SpectraMax iD3). Higher activity was observed in tubes washed with Milli-Q filtered water and especially 50% ethanol (FIG. 4). This suggests that these solutions are poor eluents, and the ionic buffers are better. No significant difference was observed between buffers of different pH, nor in the solvent with pyridine.

It was observed that Cy5 and Cy5-TCO were not readily removed from most surfaces with water, however methanol proved more effective. In the case of ALP, it was observed that native ALP was more readily washed from coated 0.2 mL microcentrifuge tubes with ionic buffers as compared to water (FIG. 4). After undergoing the click reaction, the coating changes from red-colored to colorless, which serves as a visual indicator of successful clicking. It should be noted that the colorless coating is often challenging to observe after Tet-TCO conjugation. Checking for changes in surface hydrophobicity with a droplet of water has proven a useful verification that coating is still present.

Example 4: Characterization of Coating and Grafting

Surface Wettability

Contact angles on coated and uncoated titanium discs (FIG. 3A), $Si/SiO_2$ (FIG. 3D), and glass (FIG. 3E) using the sessile drop method were analyzed. Minimal changes in contact angle were observed for low concentrations of DOPA-Tet, but a significant difference in contact angle between the uncoated and 10 mM coated surfaces was observed (left angle p=0.0218; right angle p=0.01863, left angle p=0.02891).

Coating Characterization via XPS

Titanium (Ti), silicon (Si), and glass substrates were investigated with XPS (FIG. 3B and FIGS. 3D-3E). Substrate peaks were observed in uncoated samples but were greatly diminished in the coated samples. Additionally, C, N, and O peaks of the organic polymer coating were observed in the coated samples.

Coating Characterization via ATR-FTIR

Figure 16:
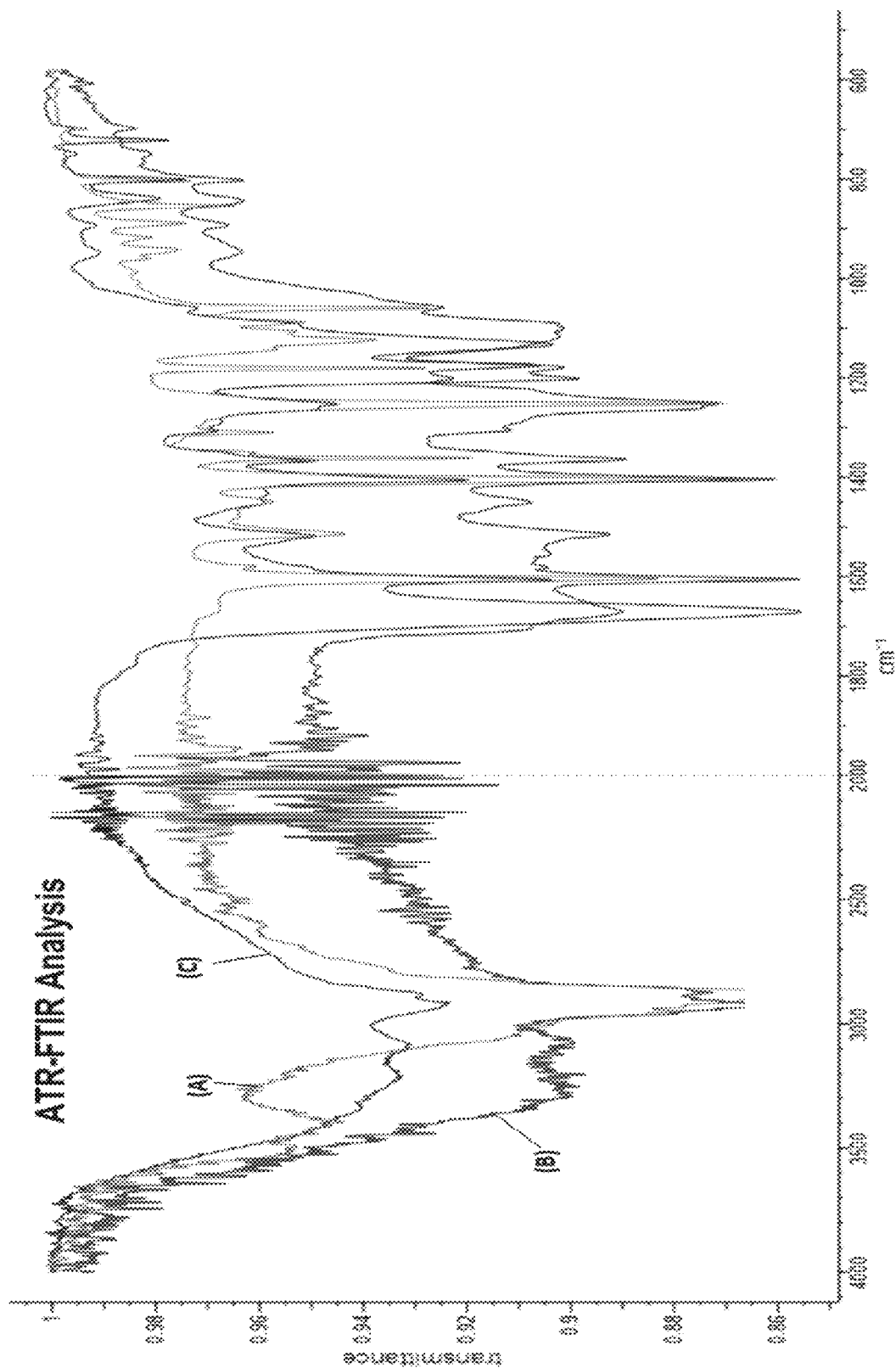
FIG. 16 provides a graph showing attenuated total reflectance Fourier-transform infrared spectroscopy (ATR-FTIR) spectra for coating materials. Spectra are shown for (3-phenyl-6-methyl-1,2,4,5-tetrazine)-PEG4-amine (A) (i.e., Tet-PEG4-$NH_2$), DOPA-Tet treated with tyrosinase (B), and DOPA-Tet (C). Spectra were collected from solutions deposited directly onto the ATR-FTIR diamond sensor.

Materials were characterized via ATR-FTIR to elucidate features of the structure (FIG. 16). 10 µL of 10 mM DOPA-Tet, either with or without 2500 U/mL tyrosinase was deposited directly onto the ATR-FTIR diamond sensor. The tyrosinase-treated samples were washed with PBS to remove residual tyrosinase and unreacted DOPA-Tet. The samples without tyrosinase were not washed. All samples allowed to air dry. Additionally, a sample was produced where 10 µL of 10 mM (3-phenyl-6-methyl-1,2,4,5-tetrazine)-PEG4-amine was similarly deposited onto the sensor and allowed to air dry. Spectra of the samples were measured using a three reflection diamond ATR attached to a PerkinElmer Spectrum 100 FT-IR. 32 scans were taken from 580 to 4000 cm−1 at 4 cm−1 resolution.

ATR-FTIR was utilized to observe coating materials both before and after the application of tyrosinase. DOPA-Tet both before and after incubation with tyrosinase was characterized as deposits from solutions added directly onto the FTIR diamond sensor. These spectra were compared to references for Tet-PEG4-NH$_2$, which was characterized by us using the same approach, and a reported spectrum for L-DOPA. We observed peaks in the 2800-3800 cm$^{-1}$ region representing the stretching vibration of O—H (catechol) and N—H (either RNH$_2$ or R$_2$NH). The strength of the C=O stretching peak at 1670 cm$^{-1}$, corresponding to the amide bond, was reduced in the tyrosinase-treated DOPA-Tet sample relative to the untreated sample. These observations are consistent with those for the coatings obtained with a previously reported amide-containing DOPA analogue. The C=C and N—N stretching vibration peaks within the region of 500-1600 cm$^{-1}$ observed in Tet-PEG4-NH$_2$ were reflected in the coated sample, supporting the existence of tetrazine residues on the coating.

Tyrosinase Activity on DOPA-Tet

To assess whether tyrosinase can catalyze the polymerization of DOPA-Tet, the handle of a pH strip was coated with DOPA-Tet and L-DOPA, both with and without tyrosinase (FIG. 3C). For both DOPA-Tet and L-DOPA, the tyrosine-containing samples displayed a color change over time compared to the initial reaction solutions and the samples without tyrosine. Most dramatic was the L-DOPA, for which the sample without tyrosine was colorless and the tyrosine-containing sample turned dark brown. When washed with DI water, the tyrosine-containing samples left material coated on the surface. After washing, both tyrosine-containing samples showed clearly visible coatings on the surface. In contrast, no coating was visible from the L-DOPA sample without tyrosine, and only a small amount was visible from the DOPA-Tet sample without tyrosine.

Grafting Verification via Small Molecule Fluorophore

To verify the grafting of TCO-conjugated molecules onto coated surfaces, titanium discs were grafted with Cy5 or Cy5-TCO, both with and without first coating with DOPA-Tet (FIG. 5). Fluorescence was observed in all samples before rinsing, however, the sample that was coated and grafted with Cy5-TCO was detected to exhibit significantly higher fluorescence intensity than either the uncoated samples or the Cy5 clicked samples. The coated sample that was functionalized with Cy5 showed a small amount of fluorescence, suggesting non-specific binding between the enzyme and coating.

Coating Stability at Various pH and in Human Serum

Figure 6:
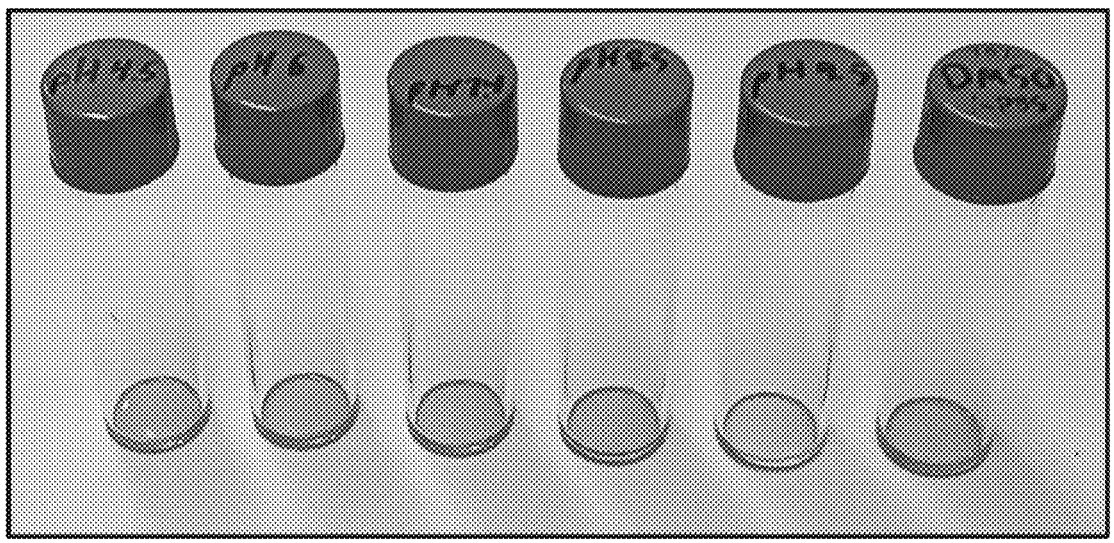
FIG. 6 illustrates DOPA-Tet coatings after incubation for 5 days at 37° C. in various buffers. Buffers from left to right: 50 mM MES pH 4.5, 50 mM MES pH 6.0, 1× PBS pH 7.4, 50 mM TBS pH 8.5, 100 mM $NaHCO_3$ pH 9.5, 10% DMSO in 1× PBS pH 7.4.

DOPA-Tet-coated glass vials were for 5 days at 37° C. in buffers with pH ranging from 4.5 to 9.5 and in 10% DMSO (FIG. 6). No degradation of the coating was observed in the samples buffered from pH 4.5 to 8.5. However, delamination and degradation of the coating were observed in the sample incubated at pH 9.5 and the sample subjected to 10% DMSO in PBS was slightly solubilized.

Figure 7:
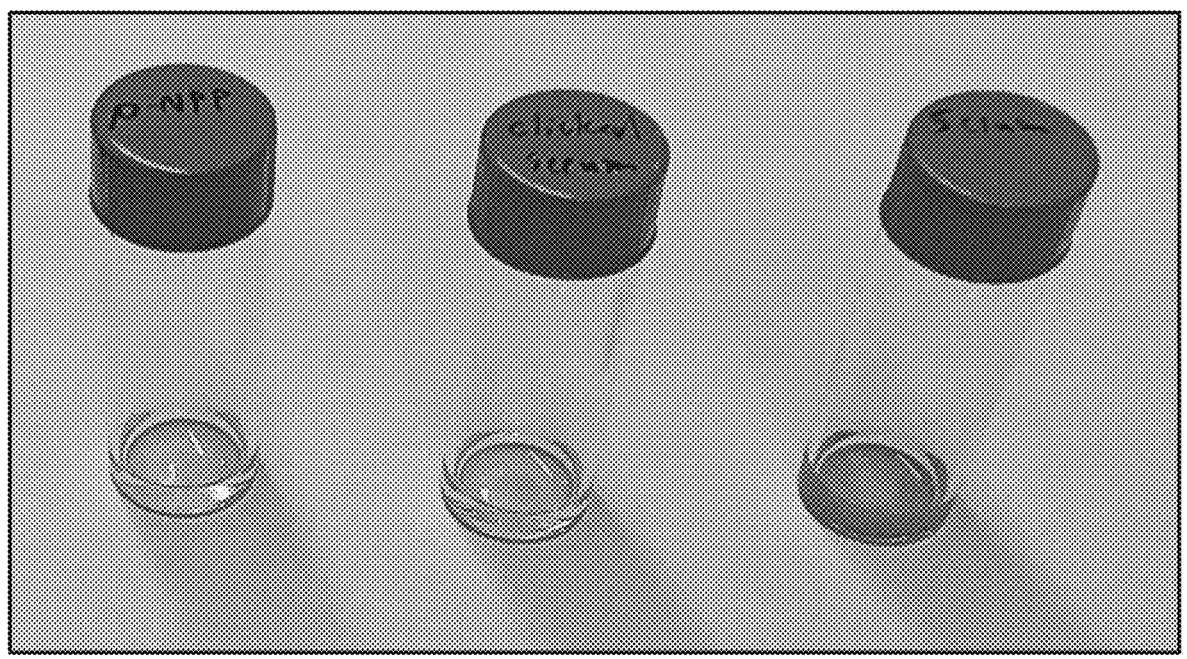
FIG. 7 illustrates certain effect(s) of prolonged exposure to human serum on coatings; 1 mg/mL p-NPP, added for color comparison (left); 1 mg/mL p-NPP incubated for 1 hour in serum-incubated, ALP-grafted vial (middle). 1 mg/mL p-NPP incubated for 1 hour in serum-incubated, DOPA-Tet-coated vial (right).

Two additional vials were prepared, one coated with DOPA-Tet and one coated and grafted with ALP-TCO, that were incubated in human serum and then p-NPP (FIG. 7). Even after incubation for a prolonged period (5 days) with human serum, the vial grafted with ALP-TCO showed ALP activity on the solution of p-NPP. In contrast, the sample coated with DOPA-Tet but not conjugated did not show any visually detectable activity.

It should be noted that L-DOPA-derivative polymers have been observed to be susceptible to hydrolysis in strongly acidic or basic environments. Though these preliminary results suggest good stability in the pH range tested, it may be advisable to avoid strongly acidic or basic environments with DOPA-Tet coated surfaces.

Example 5: Colorimetric Assays with ALP and Combination GOx/HRP

Native and TCO-conjugated enzymes were incubated on a DOPA-Tet coated surface, and tested the activity of those surfaces after washing away the enzymes. This demonstrated that TCO-conjugation is necessary for efficient retention of the enzymes on the surface.

Calorimetric Assay using ALP

Three 0.2 mL microcentrifuge tubes were coated with 10 mM DOPA-Tet and then treated with ALP-TCO, native ALP, or no enzyme, and their activities on a solution of 1 mg/mL p-NPP were assessed (FIGS. 8D-8G). The ALP-TCO grafted surfaces showed significantly more activity (6.65 OD) than either the ALP grafted (1.66 OD, p=0.005) or only DOPA-Tet coated (0.05 OD, p=0.005) surfaces. Native ALP is not able to covalently bond with the tetrazine functionalized surface, and as such it is reasoned that the ALP is removed during washing and exhibit lower activity. Without wishing to be bound by theory, it is reasoned that any activity exhibited by the ALP grafted surface is likely due to ALP which persists through washing via non-specific interactions.

Calorimetric Assay using GOx/HRP

Figure 8A:
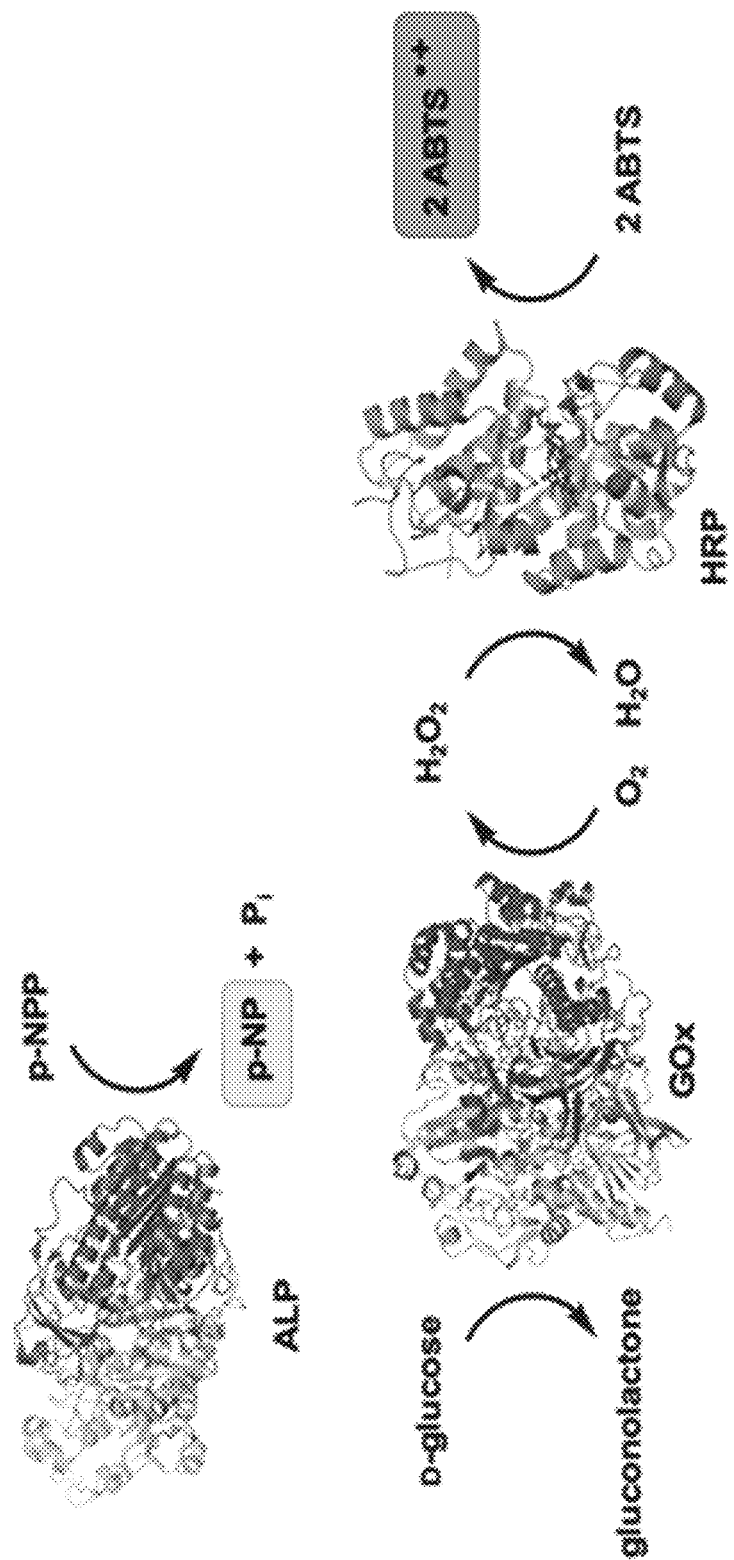
FIG. 8A: Schematic representations of ALP (top) and Glucose Oxidase (GOx)/Horseradish Peroxidase (HRP) (bottom) activities.
Figure 8B:
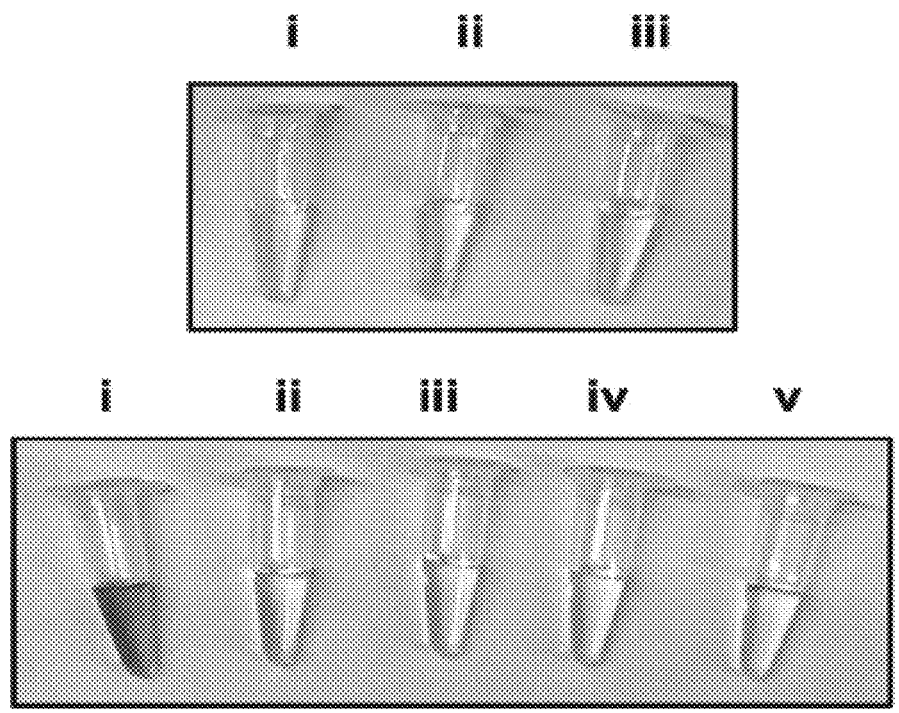
FIG. 8B: Verification of assay components for TCO coated enzymes—(top) (i) ALP-TCO+p-NPP (ii) ALP-TCO, (iii) p-NPP; (bottom) (i) GOx-TCO, HRP-TCO, D-glucose, ABTS, (ii) same as (i) less GOx-TCO, (iii) same as (i) less HRP-TCO, (iv) same as (i) less D-glucose, (v) same as (i) less ABTS.
Figure 8C:
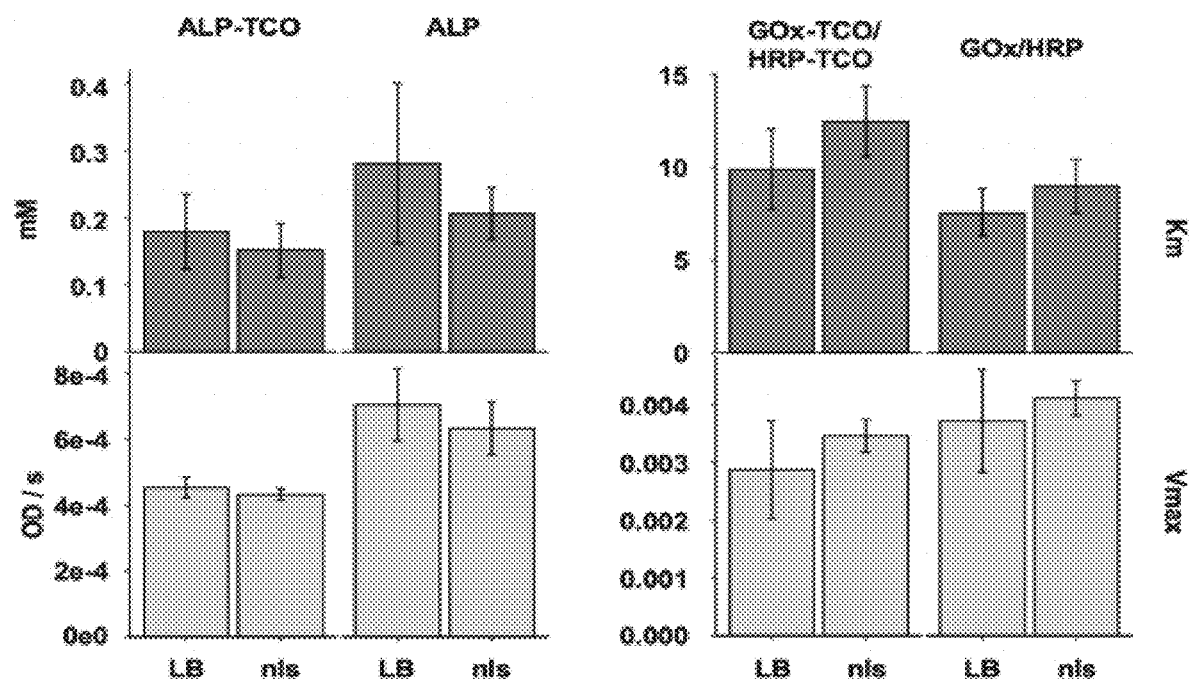
FIG. 8C: Comparison of estimated Michaelis-Menten parameters for native and TCO-conjugated ALP (left) and GOx/HRP (right)— LB denotes Lineweaver Burke method; nls denotes non-linear least squares regression.
Figure 8D:
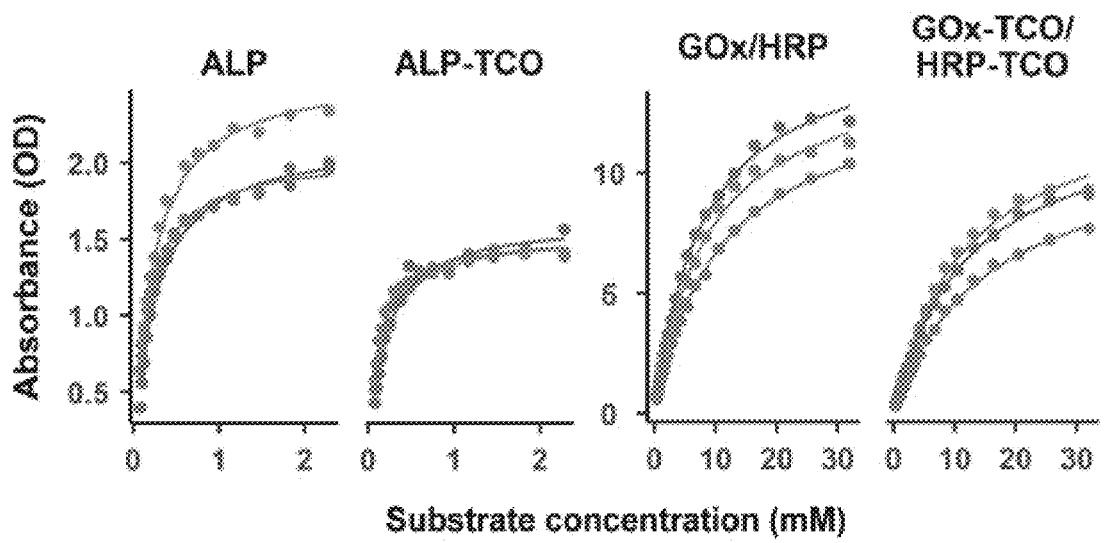
FIG. 8D provides Michaelis-Menten Plots (TOP) and Michaelis-Menten parameters for native and TCO-containing ALP and GOx/HRP.
Figure 8E:
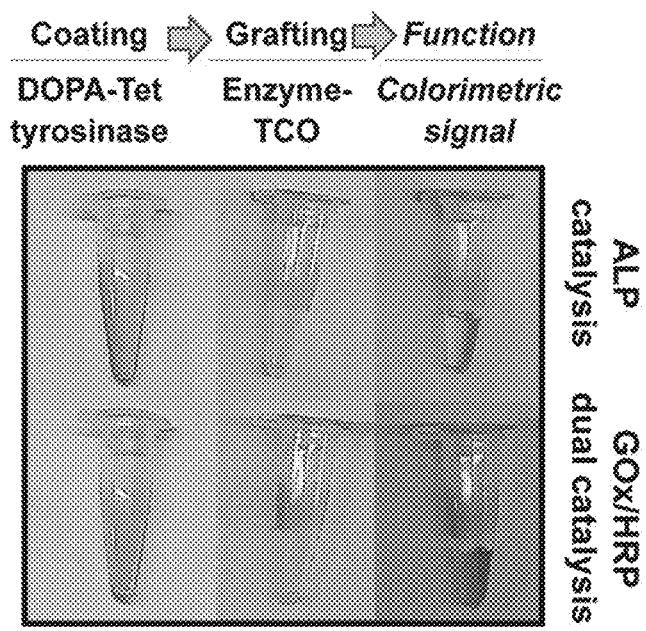
FIG. 8E provides images of visual changes after coating (left), grafting (middle), and incubation (right) with substrate solutions for ALP (top) and GOx/HRP (bottom).
Figure 8F:
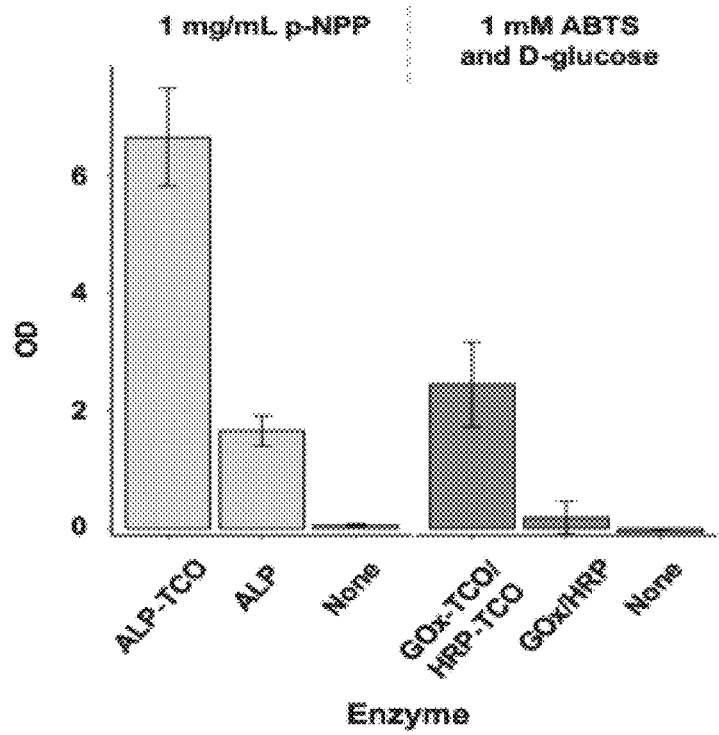
FIG. 8F Absorbance change of substrate solutions in microcentrifuge tubes coated with TCO-conjugated enzymes, native enzymes, or only 10 mM DOPA-Tet.

Three 0.2 mL microcentrifuge tubes were grafted with both GOx-TCO and HRP-TCO, GOx and HRP, or just DOPA-Tet, and their activities on a solution of D-glucose and ABTS were assessed (FIGS. 8D-8E). The GOx-TCO/HRP-TCO grafted surfaces exhibited significantly more activity (2.45 OD) than either the GOx/HRP grafted (0.187 OD, p=0.0003) or only DOPA-Tet coated (−0.07 OD, p=0.004) surfaces. As with ALP, it is expected that the native enzymes are removed during washing, and only some activity is observed due to non-specific enzyme-tube surface interactions.

Greater activity was observed from the native ALP than from the native GOx/HRP samples. Both GOx and HRP must be present to successfully convert the substrate, and the process will be limited if the concentration of either enzyme is reduced. Differences in enzyme size and surface residues could affect the solubility and degree of interaction with the coated surface, and consequently its removal during washing. HRP is significantly smaller than ALP (44 kDa and 160 kDa, respectively), and GOx and HRP also have fewer charged surface residues than ALP.

Click-then-Coat Method

It was found that adding the MOI to a solution of DOPA-Tet first, allowing conjugation, and then polymerizing the sample with tyrosinase, was also an effective method of grafting. It was observed that the samples coated with 2 and 6 µM GOx-TCO/HRP-TCO displayed the typical, red-colored coating and when incubated with a solution of ABTS and glucose showed activity similar to samples produced with the coat-then-click method described elsewhere herein. A coating was not visible on the 20 and 60 µM samples, which also showed a much lower activity on solutions of ABTS and glucose. The higher enzyme concentrations may impede the polymerization of the DOPA-Tet or deposition of supramolecules on the surface. Notably, molecules may be grafted with this method from much lower concentration stock solutions.

Figure 8G:
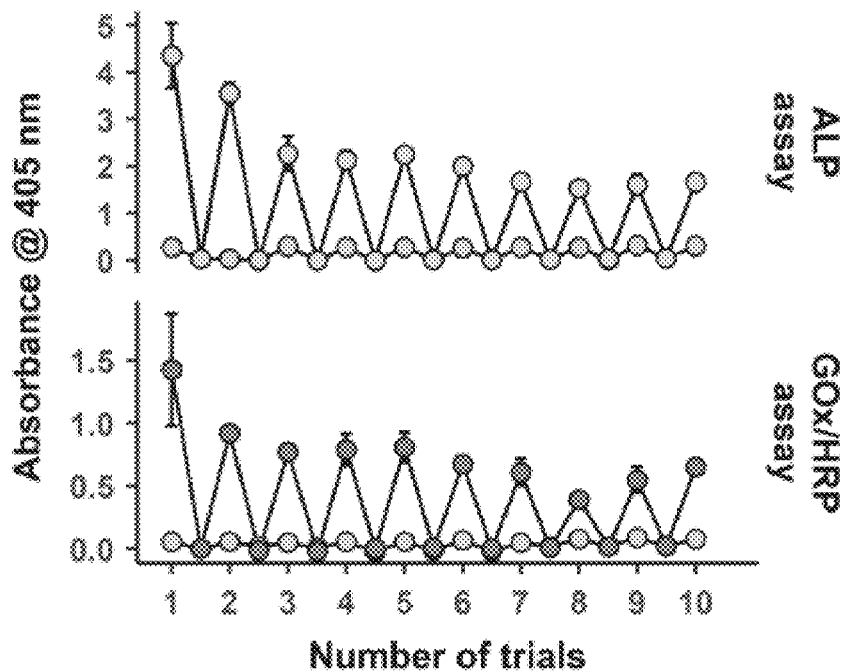
FIG. 8G provides a graph showing absorbance outputs after repeated uses of ALP and GOx/HRP immobilized assays.

Example 6: Grafted Surfaces are Stable in Biological Media After Repeated Use The stability of surface-grafted enzymes were assessed when the surface was subjected to repeated assay and wash conditions (FIG. 8G). Microcentrifuge gubes coated and grafted with either ALP or a combination of GOx and HRP were repeatedl incubated with substrate and buffer solutions with wash steps in between. Absorbance measurements at 405 nm showed that the test tubes showed little loss of activity over 10 cycles.

Figure 9:
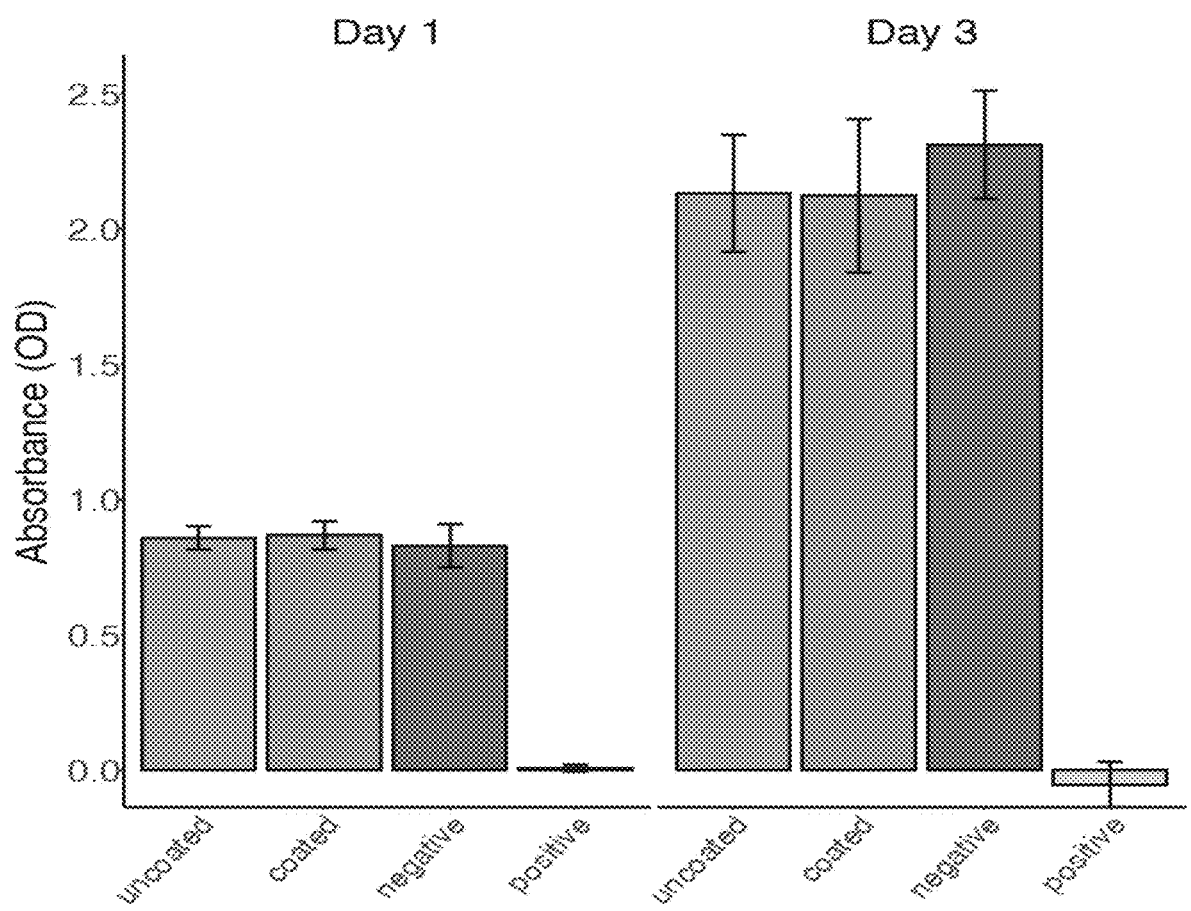
FIG. 9 illustrates MTT Assay of extracts from DOPA-Tet coated and uncoated NanoECM after 1 day and 3 days culture with fibroblasts (NIH3T3).

Example 7: Functionalization of NanoECM with c(RGDfK) Improves Fibroblast Adhesion and Cytoskeletal Organization The cytocompatibility of c(RGDfK)-grafted NanoECM with fibroblasts (NIH3T3) was evaluated using an MTT assay of material extracts. NanoECM samples were either untreated or coated/grafted using DOPA-Tet/c(RGDfK)-TCO. Extracts of the samples were prepared in DMEM and fibroblasts seeded in well plates were cultured in these extracts for 1 or 3 days. The metabolic activity of cells cultured in extracts of coated/grafted NanoECM was comparable to that of cells cultured in extracts of uncoated NanoECM and negative controls (DMEM), with day 3 absorbances being more than double those of day 1 (FIG. 9). Positive controls (10% DMSO-containing DMEM) at both days showed much lower activity than all other groups. These results show that cell proliferation was unaffected by the coating and c(RGDfK) grafting, suggesting that the coating exhibits minimal mammalian cytotoxicity.

Figure 10A:
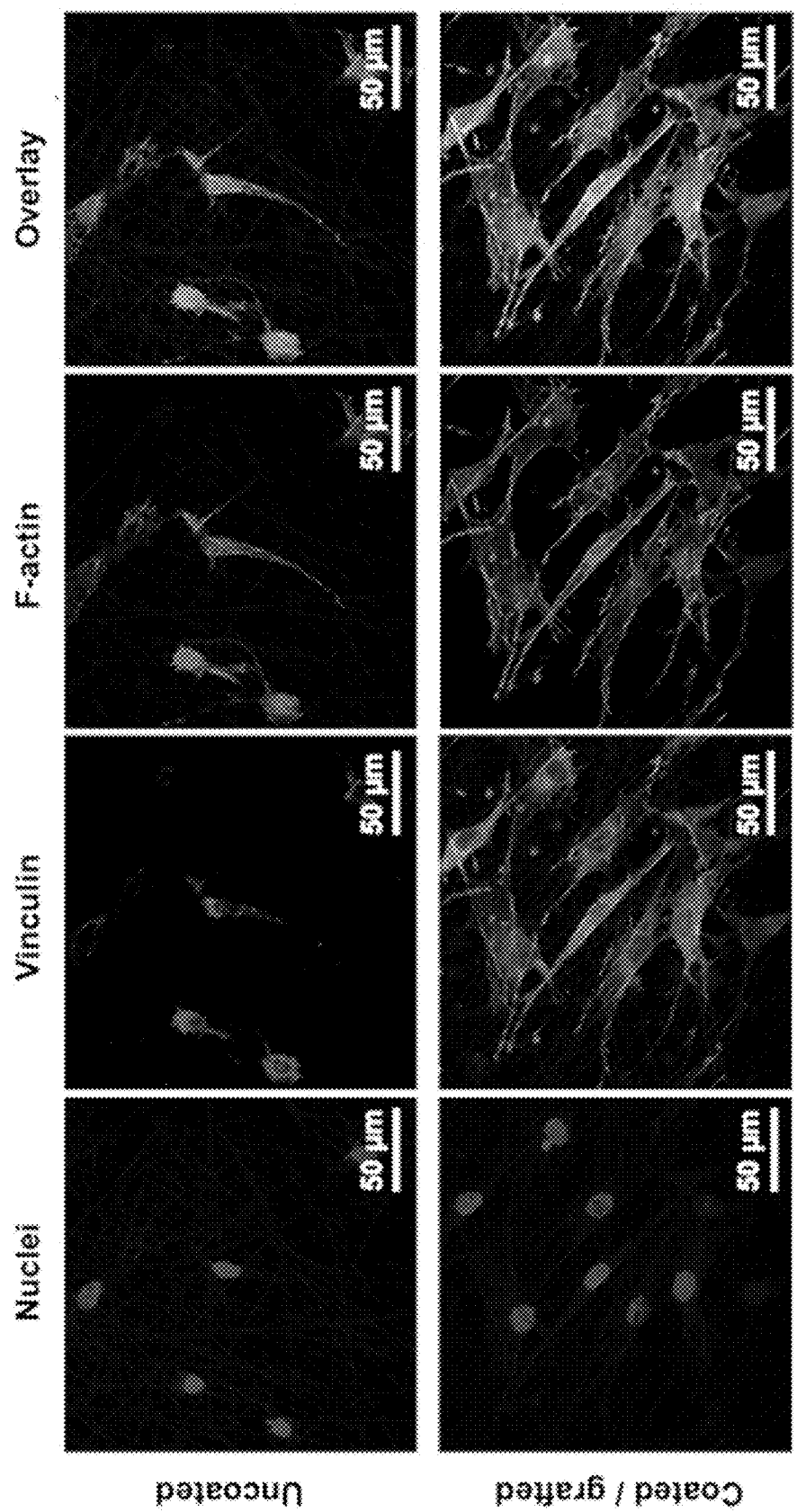
FIGS. 10A-10B illustrate cytocompatibility studies of NIH3T3 fibroblasts.
Figure 10B:
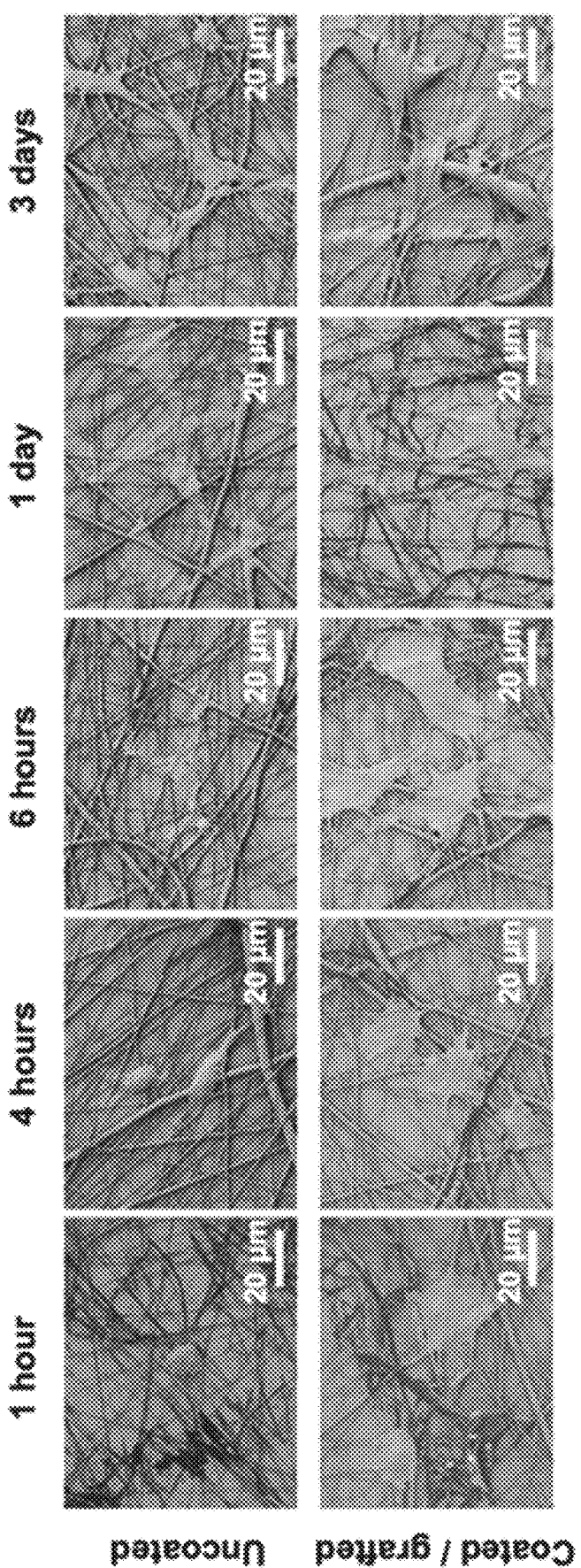
Figure 11A:
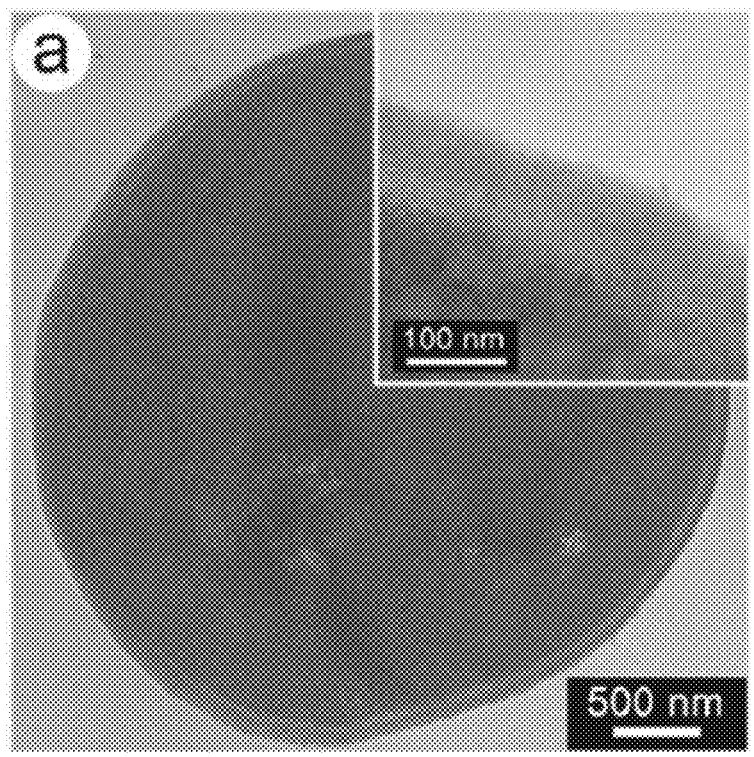
FIGS. 11A-11B illustrate transmission electron microscopy (TEM) images of native yeast (FIG. 11A) and yeast with DOPA-Tet coating on yeast cell surface (FIG. 11B), wherein inserts provide high-magnification images showing explicit cell wall or shell structures.
Figure 11B:
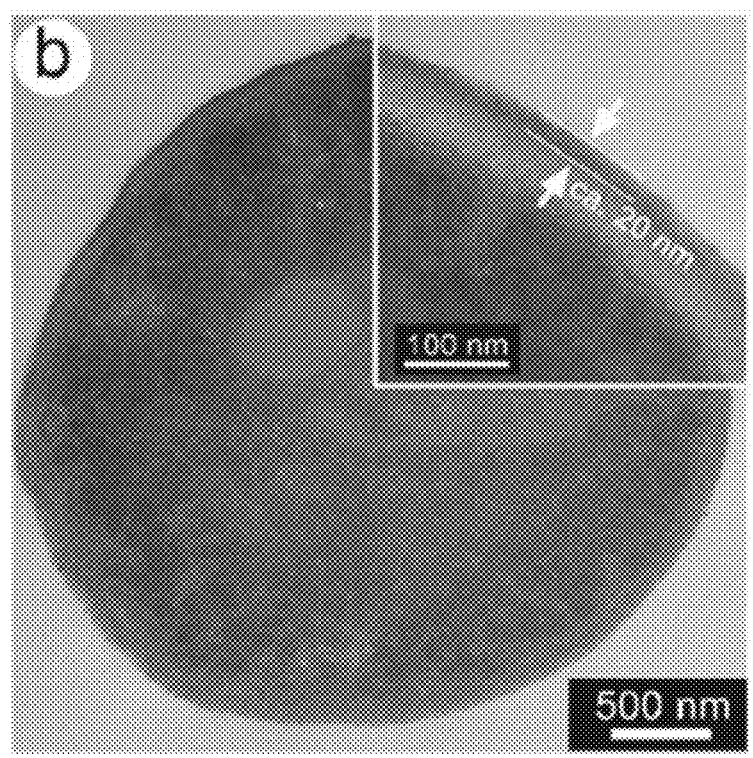

Next, the effect of NanoECM on fibroblast morphology was assessed through CLSM and SEM imaging. Both the untreated and c(RGDfK)-grafted NanoECM samples were seeded and cultured with fibroblasts. For confocal imaging, the cells were fixed after 3 hours and stained with a FAK100 kit. Nuclei (via DAPI), vinculin (via antivinculin), and F-actin (via TRITC-phalloidin) were stained blue, green, and red, respectively (FIG. 10A). The cells on the coated samples showed superior organization of cytoskeletal components vinculin and F-actin. For SEM analyses, the cells were fixed at different time points ranging from 1 hour to 3 days. These samples were gold sputtered prior to SEM imaging (FIG. 10B). Similar to the results of the CLSM study, greater spreading and more extended projections were observed of cells cultured on c(RGDfK)-grafted NanoECM samples compared to those cultured on untreated samples. This effect was more pronounced at short time scales (up to 6 hours), after which both samples showed similar cell morphologies. The observations of these two studies suggest superior fibroblast adhesion to the NanoECM surfaces that had been coated/grafted with DOPA-Tet/c(RGDfK)-TCO.

Figures 12A, 12B:
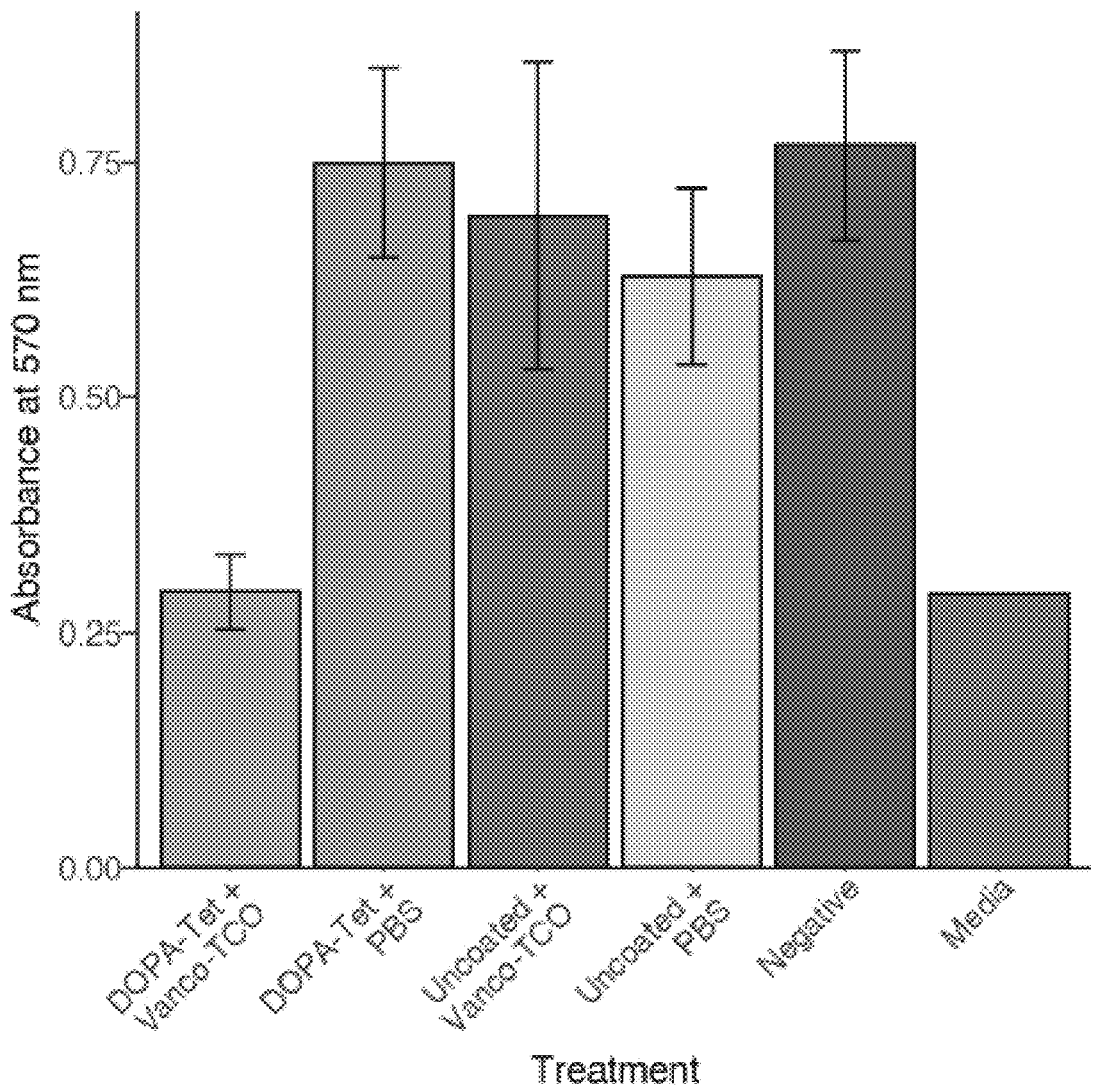
FIGS. 12A-12B show inhibitory effect against *S. aureus* of both in-solution (FIG. 12A) and surface-grafted (FIG. 12B) vancomycin-TCO.

Example 8: Grafted Vancomycin Inhibits S. Aureus Growth and Biofilm Formation The microbial inhibitory effect of surfaces coated/grafted using DOPA-Tet/vancomycin-TCO was investigated. It was first confirmed that vancomycin-TCO, which has a PEG8-TCO attachment at the C-terminal carboxylic acid, retains the biological activity of the parent drug by evaluating its potency against S. aureus. A minimum inhibitory concentration (MIC) assay was performed with both vancomycin and vancomycin-TCO (FIG. 12A). Vancomycin had an MIC of 1 µg/mL, which increased for vancomycin-TCO to 16 µg/mL. This increase is consistent with the limited range of PEG modified vancomycin compounds reported in the literature, albeit more pronounced, possibly due to the longer PEG length. This result indicates that the TCO-PEG8-modified vancomycin retains the antibiotic activity of the parent drug and suggested that it may be effective at inhibiting bacterial growth at the surface, where a high local concentration of drug is found.

For planktonic growth inhibition studies, a 96-well plate was coated using DOPA-Tet and grafted with vancomycin-TCO. Mid-log phase bacteria were added to the wells and incubated overnight, followed by addition of resazurin to quantify cell growth (FIG. 12B). Surfaces that were coated/grafted using DOPA-Tet/vancomycin-TCO inhibited the growth of S. aureus. In contrast, surfaces which were not grafted led to no growth inhibition. This indicated that the antibiotic activity of vancomycin-TCO was retained upon surface immobilization, and that the DOPA-Tet coating by itself was not antimicrobial. This result was corroborated by CLSM studies wherein coated microscopy dishes were similarly incubated with bacteria overnight and examined with PI/SYTO™ 9 staining and (FIGS. 13A-13E and FIG. 14). In this study, the coated/vancomycin-grafted sample clearly showed a much larger population of dead cells, and far fewer live cells, then the other samples.

Figure 13A:
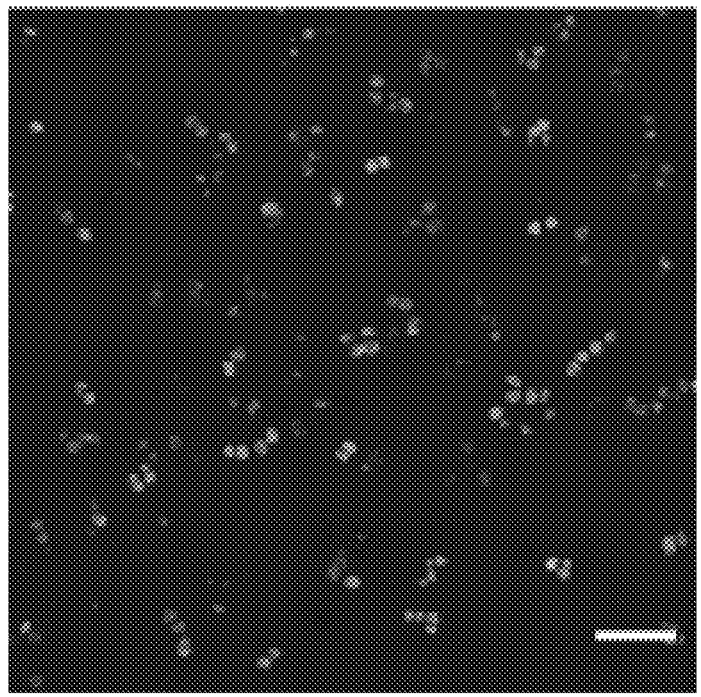
FIGS. 13A-13I provide images of planktonic and biofilm-forming *S. aureus* on functionalized surfaces.
Figure 13B:
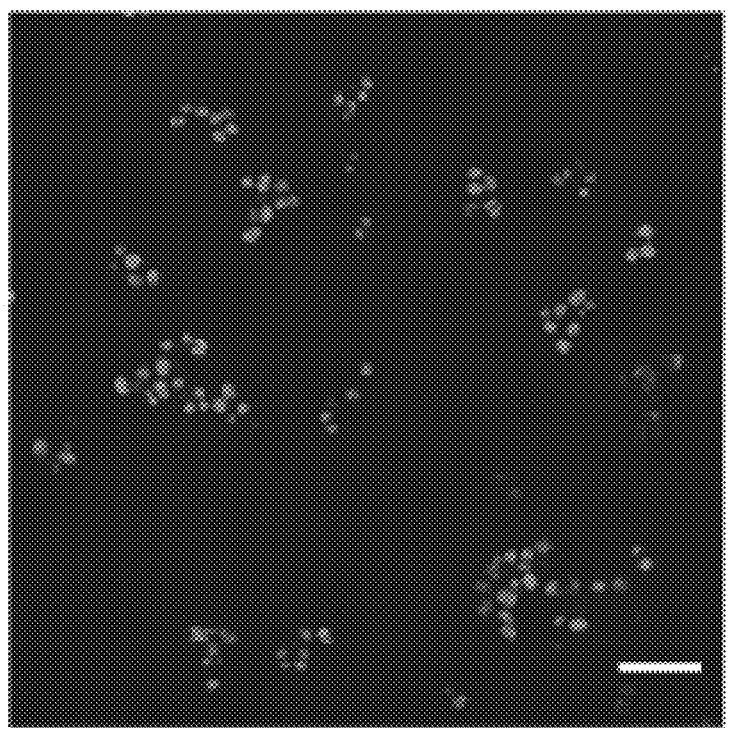
Figure 13C:
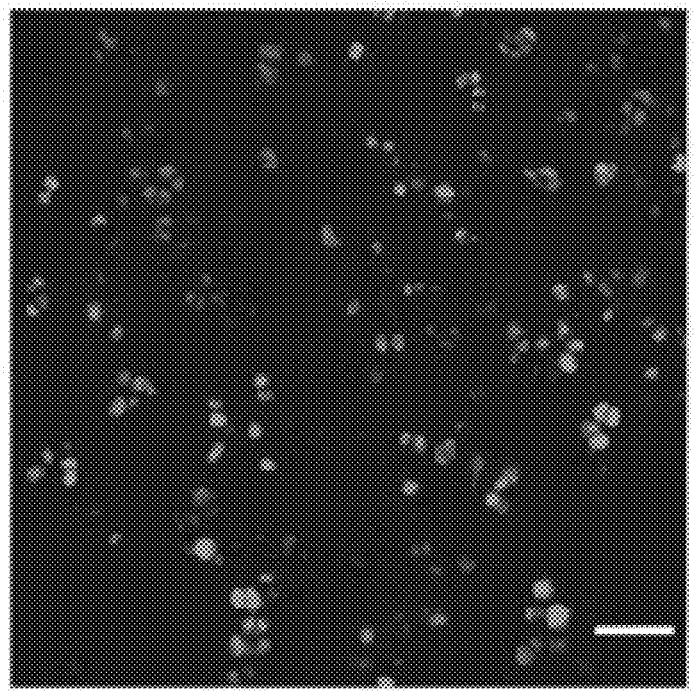
Figure 13D:
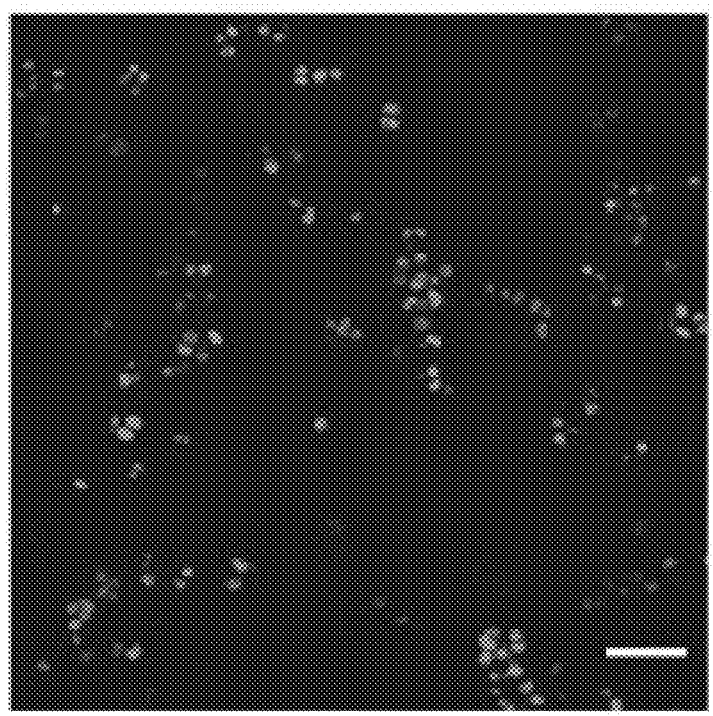
Figure 13E:
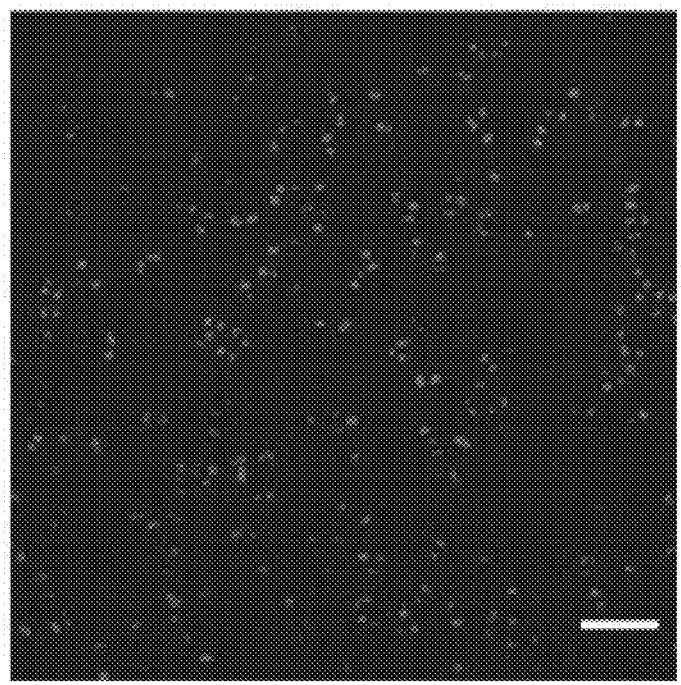
Figure 13F:
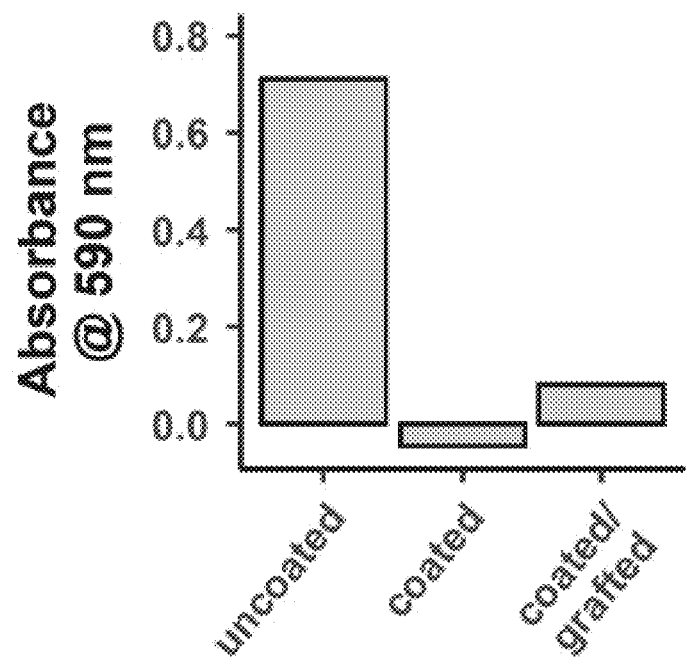
Figure 13G:
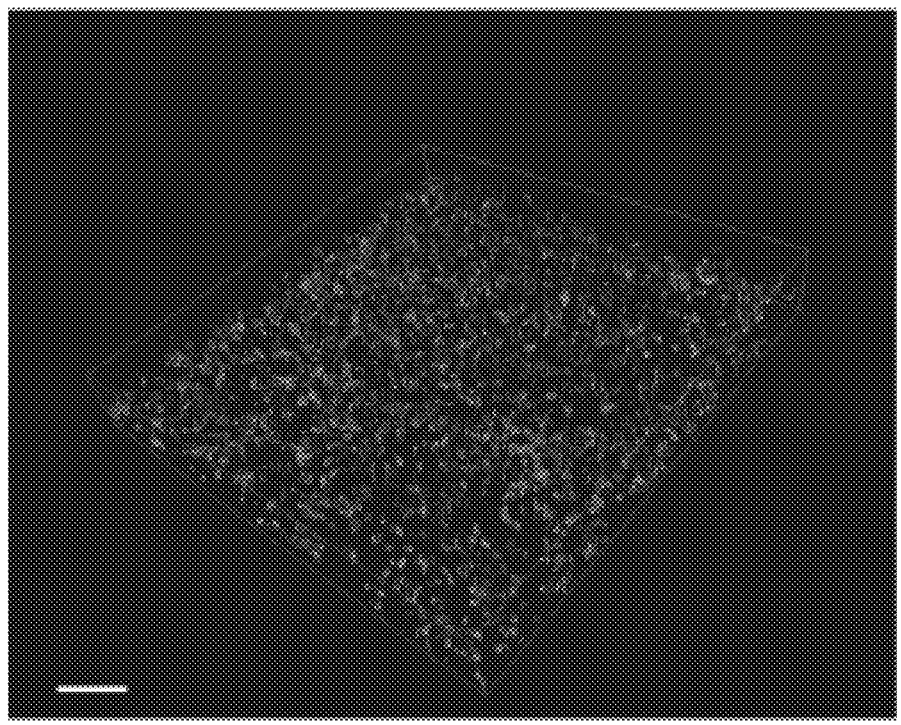
Figure 13H:
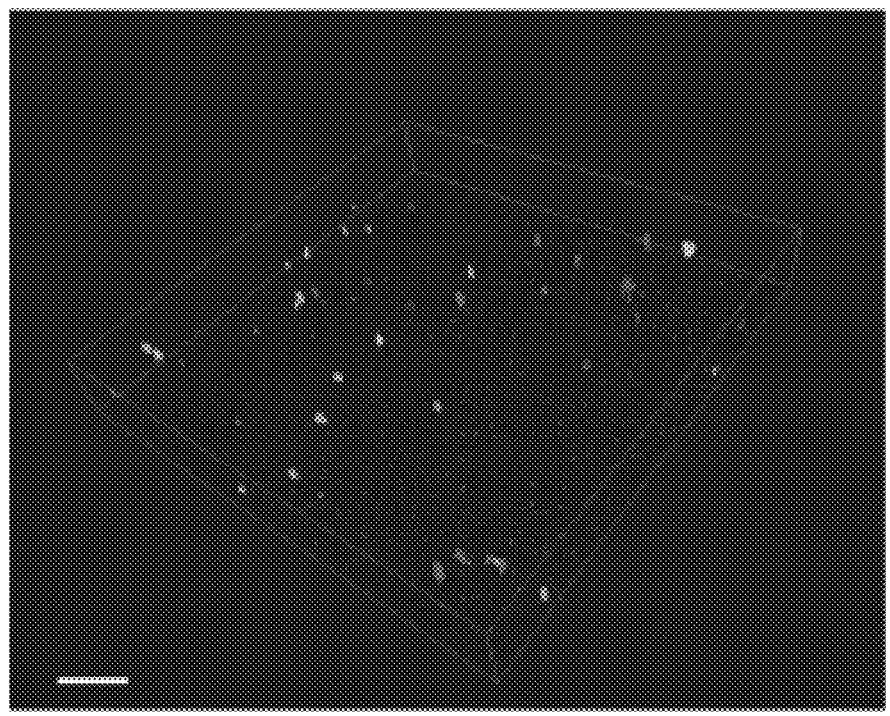
Figure 13I:
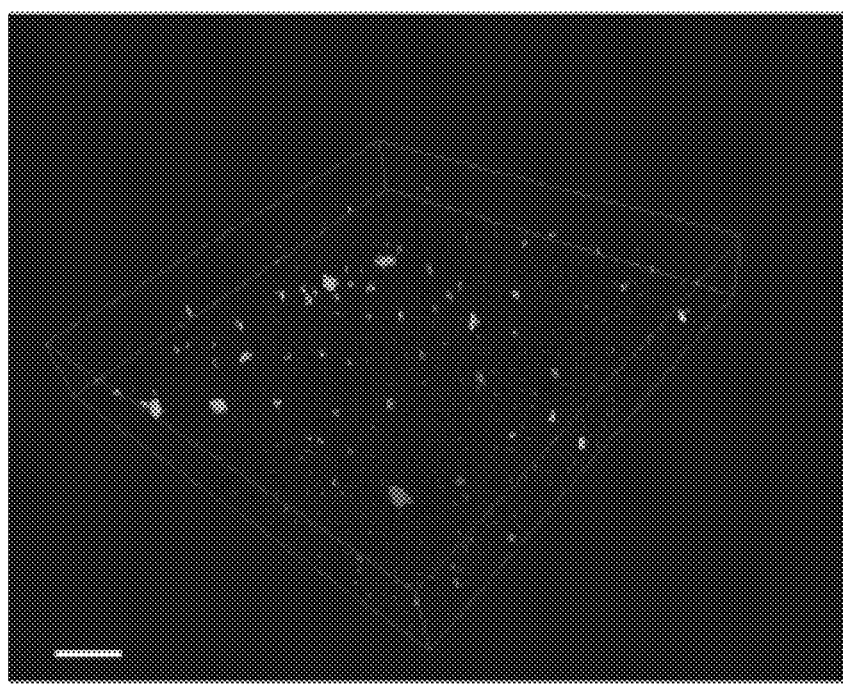
Figure 14:
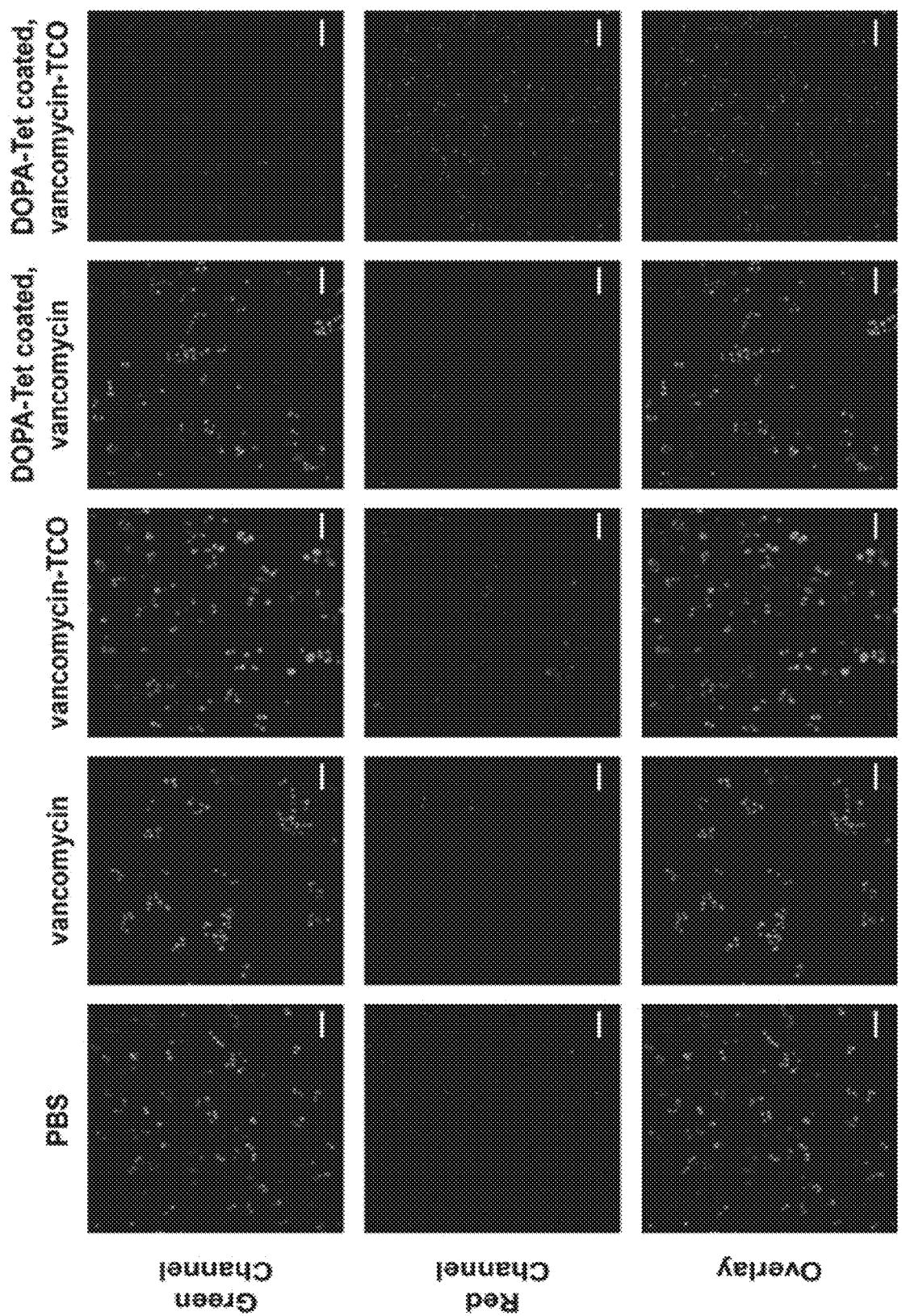
FIG. 14 provides CLSM images of *S. aureus* culture incubated on surfaces grafted with vancomycin-TCO. Green channel: 488 nm; Red channel: 561 nm; overlay: overlay of the images acquired at the green and red channels. Cultures were stained with a combination of PI and SYTO9, which selectively label dead and live cells, respectively. Scale bar is 5 μm.
Figure 15:
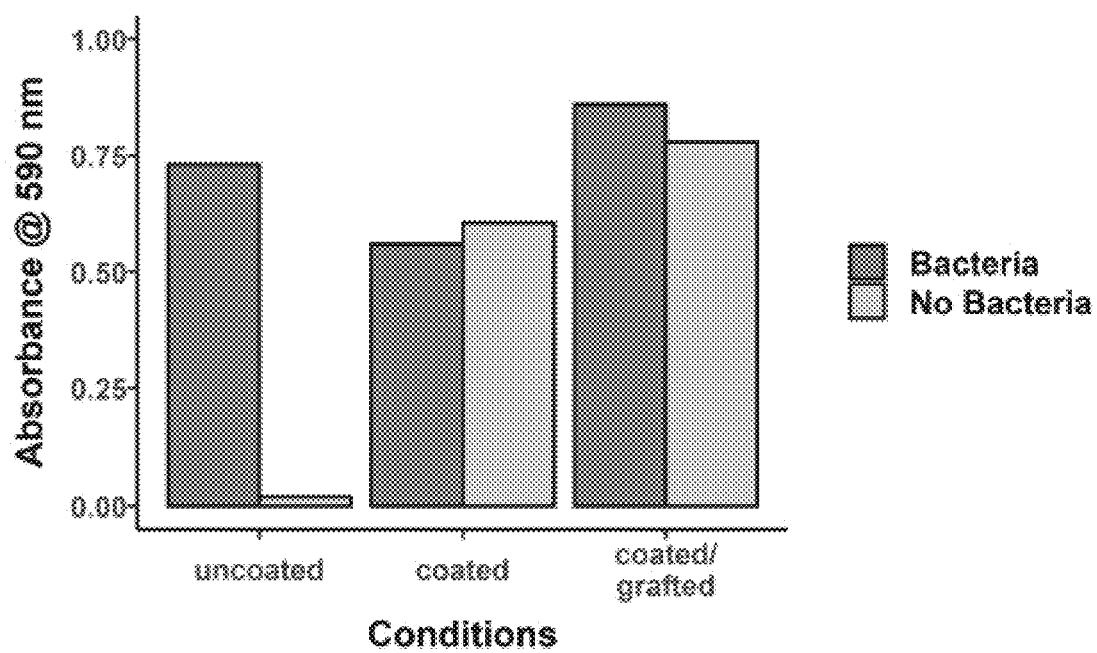
FIG. 15 provides absorbance values for crystal violet assay of uncoated, coated, and coated/vancomycin-grafted culture plates. Values shown are raw values, including the experimental data (i.e., bacteria) and negative controls (i.e., no bacteria). Median values are shown.

To further investigate the microbiological properties of the surfaces, the impact of the surface functionalization on S. aureus biofilm formation was evaluated. Toward this end, coated surfaces were incubated with S. aureus for 72 hours to allow for the formation of biofilms, then a solution of crystal violet, a common dye used as a quantitative indicator for biofilm formation, was introduced to the surfaces. After dissolution and measurement of absorbance at 590 nm, it was found that while a biofilm was formed on the uncoated surface, surfaces that were either coated using DOPA-Tet or coated/grafted using DOPA-Tet/vancomycin-TCO successfully inhibited biofilm formation (FIG. 13F and FIG. 15). To corroborate this result, coated microscopy dishes were similarly incubated with bacteria and examined with PI/SYTO™ 9 staining and CLSM. In this study, no biofilm was observed on the coated or coated and vancomycin-grafted surfaces (FIG. 13G-13I).

Sequence Listing

```
Tyrosinase (SEQ ID NO: 1)
MSRVVITGVSGTIANRLEINDFVKNDKEFSLYIQALQVMSSVPPQENVRSFFQIGGIHGLPYTP
WDGITGDQPFDPNTQWGGYCTHGSVLFPTWHRPYVLLYEQILHKHVQDIAATYTTSDKAAWVQA
AANLRQPYWDWAANAVPPDQVIVSKKVTITGSNGHKVEVDNPLYHYKFHPIDSSFPRPYSEWPT
TLRQPNSSRPNATDNVAKLRNVLRASQENITSNTYSMLTRVHTWKAFSNHTVGDGGSTSNSLEA
IHDGIHVDVGGGGHMGDPAVAAFDPIFFLHHCNVDRLLSLWAAINPGVWVSPGDSEDGTFILPP
EAPVDVSTPLTPFSNTETTFWASGGITDTTKLGYTYPEFNGLDLGNAQAVKAAIGNIVNRLYGA
SVESGEAAATSAIGAGSVASLAADVPLEKAPAPAPEAAAQPPVPAPAHVEPAVRAVSVHAAAAQ
PHAEPPVHVSAGGHPSPHGFYDWTARIEFKKYEFGSSFSVLLFLGPVPEDPEQWLVSPNFVGAH
HAFVNSAAGHCANCRSQGNVVVEGFVHLTKYISEHAGLRSLNPEVVEPYLTNELHWRVLKADGS
VGQLESLEVSVYGTPMNLPVGAMFPVPGNRRHFHGITHGRVGGSRHAIV Alkaline Phosphatase (ALP)(SEQ ID NO: 2)
MKQSTIALALLPLLFTPVTKARTPEMPVLENRAAQGDITAPGGARRLTGDQTAALRDSLSDKPA
KNIILLIGDGMGDSEITAARNYAEGAGGFFKGIDALPLTGQYTHYALNKKTGKPDYVTDSAASA
TAWSTGVKTYNGALGVDIHEKDHPTILEMAKAAGLATGNVSTAELQDATPAALVAHVTSRKCYG
PSATSEKCPGNALEKGGKGSITEQLLNARADVTLGGGAKTFAETATAGEWQGKTLREQAQARGY
QLVSDAASLNSVTEANQQKPLLGLFADGNMPVRWLGPKATYHGNIDKPAVTCTPNPQRNDSVPT
LAQMTDKAIELLSKNEKGFFLQVEGASIDKQDHAANPCGQIGETVDLDEAVQRALEFAKKEGNT
LVIVTADHAHASQIVAPDTKAPGLTQALNTKDGAVMVMSYGNSEEDSQEHTGSQLRIAAYGPHA
ANVVGLTDQTDLFYTMKAALGLK Glucose Oxidase (GOx)(SEQ ID NO: 3)
MQTLLVSSLWSLAAALPHYIRSNGIEASLLTDPKDVSGRTVDYIIAGGGLTGLTTAARLTENP
NISVLVIESGSYESDRGPIIEDLNAYGDIFGSSVDHAYETVELATNNQTALIRSGNGLGGSTLV
NGGTWTRPHKAQVDSWETVFGNEGWNWDNVAAYSLQAERARAPNAKQIAAGHYFNASCHGVNGT
VHAGPRDTGDDYSPIVKALMSAVEDRGVPTKKDFGCGDPHGVSMFPNTLHEDQVRSDAAREWLL
PNYQRPNLQVLTGQYVGKVLLSQNGTTPRAVGVEFGTHKGNTHNVYAKHEVLLAAGSAVSPTIL
EYSGIGMKSILEPLGIDTVVDLPVGLNLQDQTTATVRSRITSAGAGQGQAAWFATFNETFGDYS
EKAHELLNTKLEQWAEEAVARGGFHNTTALLIQYENYRDWIVNHNVAYSELFLDTAGVASFDVW
DLLPFTRGYVHILDKDPYLHHFAYDPQYFLNELDLLGQAAATQLARNISNSGAMQTYFAGETIP
GDNLAYDADLSAWTEYIPYHFRPNYHGVGTCSMMPKEMGGVVDNAARVYGVQGLRVIDGSIPPT
QMSSHVMTVFYAMALKISDAILEDYASMQ Horseradish Peroxidase (HRP) (SEQ ID NO: 4)
MHFSSSSTLFTCITLIPLVCLILHASLSDAQLTPTFYDNSCPNVSNIVRDTIVNELRSDPRIAA
SILRLHFHDCFVNGCDASILLDNTTSFRTEKDAFGNANSARGFPVIDRMKAAVESACPRTVSCA
DLLTIAAQQSVTLAGGPSWRVPLGRRDSLQAFLDLANANLPAPFFTLPQLKDSFRNVGLNRSSD
LVALSGGHTFGKNQCRFIMDRLYNFSNTGLPDPTLNTTYLQTLRGLCPLNGNLSALVDFDLRTP
TIFDNKYYVNLEEQKGLIQSDQELFSSPNATDTIPLVRSFANSTQTFFNAFVEAMDRMGNITPL
TGTQGQIRLNCRWNSNSLLHDMVEWDFVSSM
```

Enumerated Embodiments

The following exemplary embodiments are provided, the numbering of which is not to be construed as designating levels of importance:

Embodiment 1 provides a compound of formula (I), or a salt, solvate, tautomer, isotopologue, stereoisomer, or any mixtures thereof:

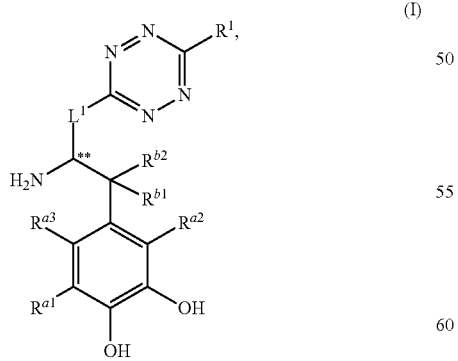

(I)

wherein:

$L^1$ is a linker of formula *—X—(Y)$_m$—Z—, wherein * is the bond between X and the carbon marked as **, wherein:

X is a bond (null), —C(=O)—, —C(=O)NH—, —C(=O)N($C_6$-$C_{10}$ arylene)-, —C(=O)N($C_2$-$C_{10}$ alkenylene)-, or —C(=O)N($C_1$-$C_{10}$ alkylene)-, wherein the $C_6$-$C_{10}$ arylene is optionally substituted by at least one substituent independently selected from the group consisting of halogen, —R', —OR', and —C(=O)OR';

each occurrence of Y is independently selected from the group consisting of —$CH_2CH_2O$—, —$OCH_2CH_2$—, and —$CH_2CH_2$—, wherein each $CH_2$ is independently optionally substituted with 1 or 2 $CH_3$ groups, with the proviso that O—O bonds are not present;

Z is selected from the group consisting of optionally substituted $C_1$-$C_6$ alkylene, optionally substituted $C_6$-$C_{10}$ arylene, and optionally substituted $C_2$-$C_8$ heteroarylene;

each occurrence of R' is independently selected from the group consisting of H, optionally substituted $C_1$-$C_6$ alkyl, optionally substituted $C_2$-$C_6$ alkenyl, optionally substituted $C_6$-$C_{10}$ aryl, and optionally substituted $C_2$-$C_8$ heteroaryl;

m is selected from the group consisting of 0, 1, 2, 3, 4, 5, 6, 7, 8, 9, and 10;

$R^1$ is selected from the group consisting of H and $C_1$-$C_6$ alkyl;

each of $R^{a1}$, $R^{a2}$ and $R^{a3}$ is H;

$R^{b1}$ and $R^{b2}$ are each independently selected from the group consisting of H and optionally substituted $C_1$-$C_6$ alkyl, wherein at least one of $R^{b1}$ and $R^{b2}$ is H.

Embodiment 2 provides the compound of Embodiment 1, wherein at least one of the following applies:
(a) $R^1$ is Me;
(b) $R^{b1}$ and $R^{b2}$ are each independently H;
(c) X is —C(=O)NHCH$_2$CH$_2$—;
(d) Y is —CH$_2$CH$_2$O—; and
(e) m is 4.

Embodiment 3 provides the compound of Embodiment 1, wherein Z is:

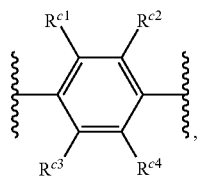

wherein each of $R^{c1}$, $R^{c2}$, $R^{c3}$, and $R^{c4}$ are independently selected from the group consisting of H, $C_1$-$C_6$ alkyl, $C_2$-$C_6$ alkenyl, phenyl, $C_2$-$C_8$ heteroaryl, halogen, NO$_2$, CN, OR', N(R')(R'), and —C(=O)OR'.

Embodiment 4 provides the compound of Embodiment 3, wherein at least one of the following applies:
(a) at least one of $R^{c1}$, $R^{c2}$, $R^{c3}$, and $R^{c4}$ is H;
(b) at least two of $R^{c1}$, $R^{c2}$, $R^{c3}$, and $R^{c4}$ are H;
(c) at least three of $R^{c1}$, $R^{c2}$, $R^{c3}$, and $R^{c4}$ are H; and
(d) each of $R^{c1}$, $R^{c2}$, $R^{c3}$, and $R^{c4}$ are H.

Embodiment 5 provides the compound of Embodiment 1, which is selected from the group consisting of:

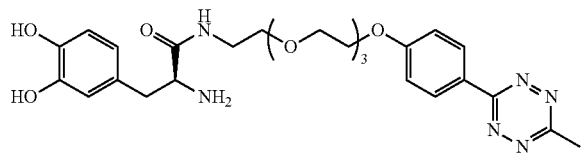

(S)-2-amino-3-(3,4-dihydroxyphenyl)-N-(2-(2-(2-(2-(4-(6-methyl-1,2,4,5-tetrazin-3-yl)phenoxy)ethoxy)ethoxy)ethoxy)ethyl)propenamide;

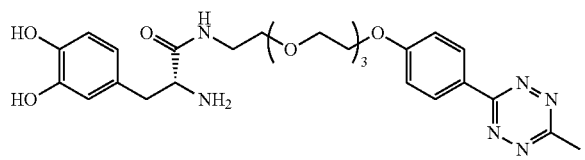

(R)-2-amino-3-(3,4-dihydroxyphenyl)-N-(2-(2-(2-(2-(4-(6-methyl-1,2,4,5-tetrazin-3-yl)phenoxy)ethoxy)ethoxy)ethoxy)ethyl)propenamide; and

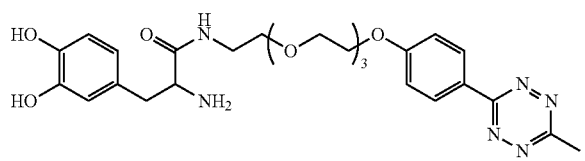

2-amino-3-(3,4-dihydroxyphenyl)-N-(2-(2-(2-(2-(4-(6-methyl-1,2,4,5-tetrazin-3-yl)phenoxy)ethoxy)ethoxy)ethoxy)ethyl)propenamide; or a salt, solvate, tautomer, isotopologue, stereoisomer, or any mixtures thereof.

Embodiment 6 provides a composition comprising the compound of Embodiment 1 and tyrosinase (SEQ ID NO:1), or a biologically active fragment thereof.

Embodiment 7 provides a composition comprising:
(a) the compound of Embodiment 1;
(b) tyrosinase (SEQ ID NO:1) or a biologically active fragment thereof and
(c) a strained alkene-containing compound,
wherein the strained alkene-containing compound comprises a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid.

Embodiment 8 provides the composition of Embodiment 7, wherein the strained alkene-containing compound comprises a compound of Formula (II):

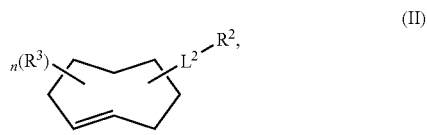

wherein:
$L^2$ is selected from the group consisting of a bond, -$A^1$-(optionally substituted $C_1$-$C_{30}$ alkenylene)-$A^2$-', and -$A^1$-(optionally substituted $C_2$-$C_{30}$ heteroalkylene)-$A^2$-', wherein ' indicates a bond between $L^2$ and $R^2$;
$A^1$ and $A^2$ are each independently selected from the group consisting of a bond, —O—, —NR"—, —C(=O)—, —C(=O)NR"—, —C(=O)O—, C(=O)NR"— —OC(=O)NR"—, and —NR"C(=O)O—;
each occurrence of R" is independently selected from the group consisting of H, optionally substituted $C_1$-$C_6$ alkyl, optionally substituted $C_2$-$C_6$ alkenyl, optionally substituted $C_6$-$C_{10}$ aryl, and optionally substituted $C_2$-$C_8$ heteroaryl;
$R^2$ is selected from the group consisting of a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid;
each occurrence of $R^3$ is independently selected from the group consisting of H, optionally substituted $C_1$-$C_6$ alkyl, optionally substituted $C_2$-$C_6$ alkenyl, optionally substituted $C_6$-$C_{10}$ aryl, and optionally substituted $C_2$-$C_8$ heteroaryl; and
n is an integer selected from the group consisting of 0, 1, 2, 3, 4, 5, 6, 7, 8, 9, 10, 11, 12, and 13.

Embodiment 9 provides the composition of Embodiment 8, wherein $L^2$ is —O(C=O)NH(CH$_2$CH$_2$O)$_8$CH$_2$CH$_2$C(=O)—'.

Embodiment 10 provides the composition of Embodiment 8, wherein one of the following applies:
(a) $R^2$ is an enzyme, optionally wherein the enzyme is selected from the group consisting of alkaline phosphatase (ALP) (SEQ ID NO:2), glucose oxidase (GOx) (SEQ ID NO:3), horseradish peroxidase (HRP) (SEQ ID NO:4), or any biologically active fragment thereof;
(b) $R^2$ is a cyclic peptide, optionally wherein the cyclic peptide is c(RGDfK);

(c) R² is a fluorophore, optionally wherein the fluorophore is Cy5; and
(d) R² is a therapeutic agent, optionally wherein the therapeutic agent is an antibiotic, and optionally wherein the antibiotic is vancomycin.

Embodiment 11 provides the composition of Embodiment 7, wherein the strained alkene-containing compound is selected from the group consisting of ALP-TCO, GOx-TCO, HRP-TCO, Cy5-TCO, c(RGDfK)-TCO, and vancomycin-TCO.

Embodiment 12 provides a composition comprising a reaction product of the compound of Embodiment 1 with a strained alkene-containing compound, wherein the strained alkene-containing compound comprises a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid.

Embodiment 13 provides a method of coating a surface, the method comprising:
  contacting at least a portion of the surface with a composition comprising the compound of Formula (I) of Embodiment 1 and tyrosinase or a biologically active fragment thereof, to provide a first layer; and
  contacting the first layer with a strained alkene-containing compound, wherein the strained alkene-containing compound comprises a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid, to provide a coating composition,
  wherein at least a portion of the surface is coated with the coating composition.

Embodiment 14 provides the method of Embodiment 13, wherein at least one of the following applies:
  (a) the composition is applied to the surface by drop coating or dip coating;
  (b) the strained alkene-containing compound is applied to the first layer by drop coating or dip coating;
  (c) the contacting of the compound of Formula (I) and tyrosinase or a biologically active fragment thereof occurs at room temperature;
  (d) the first layer is washed with a buffered solution before contact with the strained alkene-containing compound;
  (e) the coating composition is washed with a solvent selected from the group consisting of a buffered solution and an alcohol;
  (f) the contacting of the first layer and the strained alkene-containing compound occurs at room temperature;
  (g) each contacting independently occurs for a period of about 1 to about 2 hours;
  (h) the compound of Formula (I) has a concentration of about 0.1 to about 20 mM when contacted with tyrosinase;
  (i) the tyrosinase has a concentration of about 100 to about 3,000 U/mL when contacted with the compound of Formula (I);
  (j) the strained alkene-containing compound has a concentration of about 0.05 to about 2 mM when contacted with the first layer; and
  (k) the strained alkene-containing compound comprises at least one moiety selected from the group consisting of a trans-cyclooctene (TCO), cyclopropene, cyclobutene, and norbornene.

Embodiment 15 provides a method of coating a surface, the method comprising:
  contacting the compound of Formula (I) of Embodiment 1 and a strained alkene-containing compound, wherein the strained alkene-containing compound comprises a chromophore, fluorogenic molecule, oligonucleotide, polynucleotide, nucleic acid, polyethylene glycol, peptide, polypeptide, enzyme, protein, therapeutic agent, nanoparticle, heterocatalyst, organic catalyst, or lipid, to provide a first reaction product; and
  contacting at least a portion of the surface with a composition comprising the first reaction product and tyrosinase or a biologically active fragment thereof to provide a coating composition,
  wherein at least a portion of the surface is coated with the coating composition.

Embodiment 16 provides the method of Embodiment 15, wherein at least one of the following applies:
  (a) the contacting of the compound of Formula (I) and the strained alkene-containing compound occurs at room temperature;
  (b) the contacting of the compound of Formula (I) and the strained alkene-containing compound occurs for a period of about 1 to about 2 hours;
  (c) the contacting of the first reaction product and tyrosinase or a biologically active fragment thereof occurs at room temperature;
  (d) the contacting of the first reaction product and tyrosinase or a biologically active fragment thereof occurs for a period of about 1 to about 2 hours;
  (e) the composition comprising the first reaction product and tyrosinase or a biologically active fragment thereof is applied to the surface by drop coating or dip coating;
  (f) the compound of Formula (I) has a concentration of about 0.1 to about 20 mM when contacted with the strained alkene-containing compound;
  (g) the strained alkene-containing compound has a concentration of about 1 to about 100 µM when contacted with the compound;
  (h) the tyrosinase has a concentration of about 100 to about 3,000 U/mL when contacted with the first reaction product; and
  (i) the strained alkene-containing compound comprises at least one moiety selected from the group consisting of a trans-cyclooctene (TCO), cyclopropene, cyclobutene, and norbornene.

Embodiment 17 provides the method of Embodiment 15, wherein the surface comprises a biological surface, metal, stone, glass, wood, ceramic, semi-conductor, polymer, inorganic material, or combinations thereof.

Embodiment 18 provides the method of Embodiment 15, wherein the surface is selected from the group consisting of polypropylene, titanium, and a cell.

Embodiment 19 provides the method of Embodiment 18, wherein the cell is a eukaryotic cell, optionally wherein the eukaryotic cell is a mammalian cell.

Embodiment 20 provides the method of Embodiment 19, wherein the mammalian cell is a fibroblast, optionally wherein the fibroblast is a mouse embryonic fibroblast (NIH3T3).

The terms and expressions employed herein are used as terms of description and not of limitation, and there is no intention in the use of such terms and expressions of excluding any equivalents of the features shown and described or portions thereof, but it is recognized that various modifications are possible within the scope of the embodiments of the present application. Thus, it should be understood that although the present application describes specific embodiments and optional features, modification and variation of the compositions, methods, and concepts herein disclosed may be resorted to by those of ordinary skill in the art, and that such modifications and variations are considered to be within the scope of embodiments of the present application.

What is claimed is:

1. A compound of formula (I) or a salt thereof:

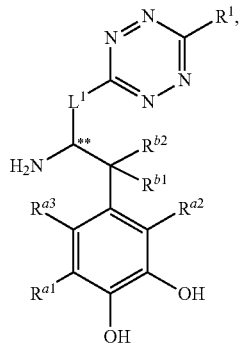

wherein:
L$^1$ is a linker of formula *—X—(Y)$_m$—Z—, wherein * is the bond between X and the carbon marked as **, wherein:
X is a bond (null), —C(=O)—, —C(=O)NH—, —C(=O)NH(C$_6$-C$_{10}$ arylene)-, —C(=O)NH (substituted C$_1$-C$_{10}$ arylene)-, —C(=O)NH(C$_2$-C$_{10}$ alkenylene)-, or —C(=O)NH(C$_1$-C$_{10}$ alkylene)-, wherein the substituted C$_6$-C$_{10}$ arylene comprises at least one substituent independently selected from the group consisting of halogen, —R', —OR', and —C(=O)OR';
each occurrence of Y is independently selected from the group consisting of —CH$_2$CH$_2$O—, —CH(CH$_3$)CH$_2$O—, —CH$_2$CH(CH$_3$)O—, —C(CH$_3$)$_2$CH$_2$O—, —CH$_2$C(CH$_3$)$_2$O—, —C(CH$_3$)$_2$C(CH$_3$)$_2$O—, —OCH$_2$CH$_2$—, —OCH(CH$_3$)CH$_2$—, —OCH$_2$CH(CH$_3$)—, —OC(CH$_3$)$_2$CH$_2$—, —OCH$_2$C(CH$_3$)$_2$—, —OC(CH$_3$)$_2$C(CH$_3$)$_2$—, —CH$_2$CH$_2$—, —CH(CH$_3$)CH$_2$—, —CH$_2$CH(CH$_3$)—, —C(CH$_3$)$_2$CH$_2$—, —CH$_2$C(CH$_3$)$_2$—, —C(CH$_3$)$_2$C(CH$_3$)$_2$—, with the proviso that O—O bonds are not present;
Z is selected from the group consisting of optionally substituted C$_1$-C$_6$ alkylene, optionally substituted C$_6$-C$_{10}$ arylene, and optionally substituted C$_2$-C$_8$ heteroarylene;
each occurrence of R' is independently selected from the group consisting of H, optionally substituted C$_1$-C$_6$ alkyl, optionally substituted C$_2$-C$_6$ alkenyl, optionally substituted C$_6$-C$_{10}$ aryl, and optionally substituted C$_2$-C$_8$ heteroaryl;
m is selected from the group consisting of 0, 1, 2, 3, 4, 5, 6, 7, 8, 9, and 10;
R$^1$ is selected from the group consisting of H and C$_1$-C$_6$ alkyl;
each of R$^{a1}$, R$^{a2}$ and R$^{a3}$ is H;
R$^{b1}$ and R$^{b2}$ are each independently selected from the group consisting of H and optionally substituted C$_1$-C$_6$ alkyl, wherein at least one of R$^{b1}$ and R$^{b2}$ is H;
wherein each optional substituent is independently selected from the group consisting of F, Cl, Br, I, OR, OC(O)N(R)$_2$, CN, NO$_2$, N$_3$, CF$_3$, OCF$_3$, R, N(R)$_2$, SR, S(O)R, SO$_2$R, SO$_2$N(R)$_2$, SO$_3$R, C(O)R, C(O)OR, OC(O)R, C(O)N(R)$_2$, OC(O)N(R)$_2$, N(R)SO$_2$R, N(R)SO$_2$N(R)$_2$, N(R)C(O)OR, N(R)C(O)R, and N(R)C(O)N(R)$_2$; and
each occurrence of R is independently selected from the group consisting of H, C$_1$-C$_8$ alkyl, C$_3$-C$_8$ cycloalkyl, C$_6$-C$_{14}$ aryl, C$_1$-C$_8$ alkyl(C$_6$-C$_{14}$ aryl), 5- to 12-membered ring heteroaryl, and C$_1$-C$_8$(5- to 12-membered ring heteroaryl).

2. The compound of claim 1, wherein at least one of the following applies:
   (a) R$^1$ is Me;
   (b) R$^{b1}$ and R$^{b2}$ are each independently H;
   (c) X is —C(=O)NHCH$_2$CH$_2$—;
   (d) Y is —CH$_2$CH$_2$O—; and
   (e) m is 4.

3. The compound of claim 1, wherein Z is:

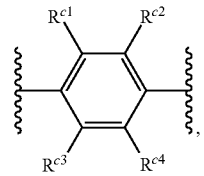

wherein each of R$^{c1}$, R$^{c2}$, R$^{c3}$, and R$^{c4}$ are independently selected from the group consisting of H, C$_1$-C$_6$ alkyl, C$_2$-C$_6$ alkenyl, phenyl, C$_2$-C$_8$ heteroaryl, halogen, NO$_2$, CN, OR', N(R')(R'), and —C(=O)OR'.

4. The compound of claim 3, wherein at least one of the following applies:
   (a) at least one of R$^{c1}$, R$^{c2}$, R$^{c3}$, and R$^{c4}$ is H;
   (b) at least two of R$^{c1}$, R$^{c2}$, R$^{c3}$, and R$^{c4}$ are H;
   (c) at least three of R$^{c1}$, R$^{c2}$, R$^{c3}$, and R$^{c4}$ are H; and
   (d) each of R$^{c1}$, R$^{c2}$, R$^{c3}$, and R$^{c4}$ are H.

5. The compound of claim 1, which is selected from the group consisting of:

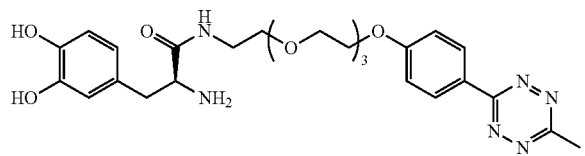

(S)-2-amino-3-(3,4-dihydroxyphenyl)-N-(2-(2-(2-(2-(4-(6-methyl-1,2,4,5-tetrazin-3-yl) phenoxy) ethoxy) ethoxy) ethoxy) ethyl) propenamide;

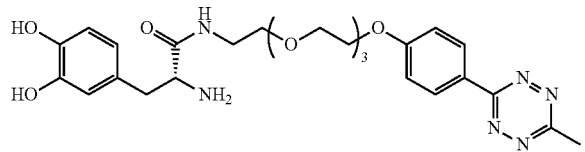

(R)-2-amino-3-(3,4-dihydroxyphenyl)-N-(2-(2-(2-(2-(4-(6-methyl-1,2,4,5-tetrazin-3-yl) phenoxy) ethoxy) ethoxy) ethoxy) ethyl) propenamide; and

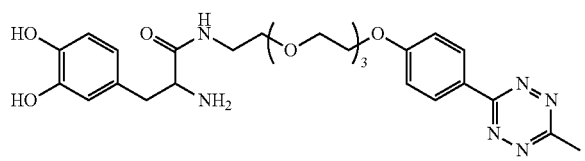

2-amino-3-(3,4-dihydroxyphenyl)-N-(2-(2-(2-(2-(4-(6-methyl-1,2,4,5-tetrazin-3-yl) phenoxy) ethoxy) ethoxy) ethoxy) ethyl) propenamide;

or a salt thereof.

6. A composition comprising the compound of claim 1 and tyrosinase (SEQ ID NO:1), or an enzymatically active fragment thereof.

7. A composition comprising:
(a) the compound of claim 1;
(b) tyrosinase (SEQ ID NO:1) or an enzymatically active fragment thereof, and
(c) a strained alkene-containing compound,
wherein the strained alkene-containing compound comprises a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid.

8. The composition of claim 7, wherein the strained alkene-containing compound comprises a compound of Formula (II):

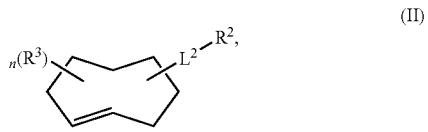

wherein:
$L^2$ is selected from the group consisting of a bond, -$A^1$-(optionally substituted $C_1$-$C_{30}$ alkenylene)-$A^2$-', and -$A^1$-(optionally substituted $C_2$-$C_{30}$ heteroalkylene)-$A^2$-', wherein ' indicates a bond between $L^2$ and $R^2$;

$A^1$ and $A^2$ are each independently selected from the group consisting of a bond, —O—, —NR''—, —C(=O)—, —C(=O)NR''—, —C(=O)O—, C(=O)NR''— —OC(=O)NR''—, and —NR''C(=O)O—;

each occurrence of R'' is independently selected from the group consisting of H, optionally substituted $C_1$-$C_6$ alkyl, optionally substituted $C_2$-$C_6$ alkenyl, optionally substituted $C_6$-$C_{10}$ aryl, and optionally substituted $C_2$-$C_8$ heteroaryl;

$R^2$ is selected from the group consisting of a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid;

each occurrence of $R^3$ is independently selected from the group consisting of H, optionally substituted $C_1$-$C_6$ alkyl, optionally substituted $C_2$-$C_6$ alkenyl, optionally substituted $C_6$-$C_{10}$ aryl, and optionally substituted $C_2$-$C_8$ heteroaryl; and n is an integer selected from the group consisting of 0, 1, 2, 3, 4, 5, 6, 7, 8, 9, 10, 11, 12, and 13.

9. The composition of claim 8, wherein $L^2$ is —O(C=O)NH(CH$_2$CH$_2$O)$_8$CH$_2$CH$_2$C(=O)—'.

10. The composition of claim 8, wherein one of the following applies:
(a) $R^2$ is an enzyme optionally wherein the enzyme is selected from the group consisting of alkaline phosphatase (ALP) (SEQ ID NO:2), glucose oxidase (GOx) (SEQ ID NO:3), horseradish peroxidase (HRP) (SEQ ID NO:4), or an enzymatically active fragment thereof;
(b) $R^2$ is c(RGDfK);
(c) $R^2$ is Cy5; and
(d) $R^2$ is an antibiotic.

11. The composition of claim 7, wherein the strained alkene-containing compound is selected from the group consisting of ALP-TCO, GOx-TCO, HRP-TCO, Cy5-TCO, c(RGDfK)-TCO, and vancomycin-TCO.

12. A composition comprising a reaction product of the compound of claim 1 with a strained alkene-containing compound, wherein the strained alkene-containing compound comprises a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid.

13. A method of coating a surface, the method comprising:
contacting at least a portion of the surface with a composition comprising the compound of Formula (I) of claim 1 and tyrosinase, or an enzymatically active fragment thereof, to provide a first layer; and
contacting the first layer with a strained alkene-containing compound, wherein the strained alkene-containing compound comprises a chromophore, fluorogenic molecule, oligonucleotide, nucleic acid, polyethylene glycol, peptide, polypeptide, enzyme, protein, therapeutic agent, nanoparticle, heterocatalyst, organic catalyst, or lipid, to provide a coating composition,
wherein at least a portion of the surface is coated with the coating composition.

14. The method of claim 13, wherein at least one of the following applies:
(a) the composition is applied to the surface by drop coating or dip coating;
(b) the strained alkene-containing compound is applied to the first layer by drop coating or dip coating;
(c) the contacting of the compound of Formula (I) and tyrosinase or an enzymatically active fragment thereof, occurs at room temperature;
(d) the first layer is washed with a buffered solution before contact with the strained alkene-containing compound;
(e) the coating composition is washed with a solvent selected from the group consisting of a buffered solution and an alcohol;
(f) the contacting of the first layer and the strained alkene-containing compound occurs at room temperature;
(g) each contacting independently occurs for a period of about 1 to about 2 hours;
(h) the compound of Formula (I) has a concentration of about 0.1 to about 20 mM when contacted with tyrosinase;
(i) the tyrosinase has a concentration of about 100 to about 3,000 U/mL when contacted with the compound of Formula (I);
(j) the strained alkene-containing compound has a concentration of about 0.05 to about 2 mM when contacted with the first layer; and (k) the strained alkene-containing compound comprises at least one moiety selected from the group consisting of a trans-cyclooctene (TCO), cyclopropene, cyclobutene, and norbornene.

15. A method of coating a surface, the method comprising:
    contacting the compound of Formula (I) of claim 1 and a strained alkene-containing compound, wherein the strained alkene-containing compound comprises a chromophore, fluorogenic molecule, oligonucleotide, polynucleotide, nucleic acid, polyethylene glycol, peptide, polypeptide, enzyme, protein, therapeutic agent, nanoparticle, heterocatalyst, organic catalyst, or lipid, to provide a first reaction product; and
    contacting at least a portion of the surface with a composition comprising the first reaction product and tyrosinase or an enzymatically active fragment thereof to provide a coating composition,
    wherein at least a portion of the surface is coated with the coating composition.

16. The method of claim 15, wherein at least one of the following applies:
    (a) the contacting of the compound of Formula (I) and the strained alkene-containing compound occurs at room temperature;
    (b) the contacting of the compound of Formula (I) and the strained alkene-containing compound occurs for a period of about 1 to about 2 hours;
    (c) the contacting of the first reaction product and tyrosinase or an enzymatically active fragment thereof occurs at room temperature;
    (d) the contacting of the first reaction product and tyrosinase or an enzymatically active fragment thereof occurs for a period of about 1 to about 2 hours;
    (e) the composition comprising the first reaction product and tyrosinase or an enzymatically active fragment thereof is applied to the surface by drop coating or dip coating;
    (f) the compound of Formula (I) has a concentration of about 0.1 to about 20 mM when contacted with the strained alkene-containing compound;
    (g) the strained alkene-containing compound has a concentration of about 1 to about 100 µM when contacted with the compound;
    (h) the tyrosinase has a concentration of about 100 to about 3,000 U/mL when contacted with the first reaction product; and
    (i) the strained alkene-containing compound comprises at least one moiety selected from the group consisting of a trans-cyclooctene (TCO), cyclopropene, cyclobutene, and norbornene.

17. The method of claim 15, wherein the surface comprises a biological surface, metal, stone, glass, wood, ceramic, semi-conductor, polymer, inorganic material, or combinations thereof.

18. The method of claim 15, wherein the surface is selected from the group consisting of polypropylene, titanium, and a cell.

19. The method of claim 18, wherein the cell is a eukaryotic cell optionally wherein the eukaryotic cell is a mammalian cell.

20. The method of claim 19, wherein the eukaryotic cell is a fibroblast.

* * * * *

```
                           SEQUENCE LISTING

Sequence total quantity: 4
SEQ ID NO: 1            moltype = AA   length = 625
FEATURE                 Location/Qualifiers
source                  1..625
                        mol_type = protein
                        organism = synthetic construct
SEQUENCE: 1
MSRVVITGVS GTIANRLEIN DFVKNDKFFS LYIQALQVMS SVPPQENVRS FFQIGGIHGL    60
PYTPWDGITG DQPFDPNTQW GGYCTHGSVL FPTWHRPYVL LYEQILHKHV QDIAATYTTS   120
DKAAWVQAAA NLRQPYWDWA ANAVPPDQVI VSKKVTITGS NGHKVEVDNP LYHYKFHPID   180
SSFPRPYSEW PTTLRQPNSS RPNATDNVAK LRNVLRASQE NITSNTYSML TRVHTWKAFS   240
NHTVGDGGST SNSLEAIHDG IHVDVGGGGH MGDPAVAAFD PIFFLHHCNV DRLLSLWAAI   300
NPGVWVSPGD SEDGTFILPP EAPVDVSTPL TPFSNTETTF WASGGITDTT KLGYTYPEFN   360
GLDLGNAQAV KAAIGNIVNR LYGASVFSGF AAATSAIGAG SVASLAADVP LEKAPAPAPE   420
AAAQPPVPAP AHVEPAVRAV SVHAAAAQPH AEPPVHVSAG GHPSPHGFYD WTARIEFKKY   480
EFGSSFSVLL FLGPVPEDPE QWLVSPNFVG AHHAFVNSAA GHCANCRSQG NVVVEGFVHL   540
TKYISEHAGL RSLNPEVVEP YLTNELHWRV LKADGSVGQL ESLEVSVYGT PMNLPVGAMF   600
PVPGNRRHFH GITHGRVGGS RHAIV                                        625

SEQ ID NO: 2            moltype = AA   length = 471
FEATURE                 Location/Qualifiers
source                  1..471
                        mol_type = protein
                        organism = synthetic construct
SEQUENCE: 2
MKQSTIALAL LPLLFTPVTK ARTPEMPVLE NRAAQGDITA PGGARRLTGD QTAALRDSLS    60
DKPAKNIILL IGDGMGDSEI TAARNYAEGA GGFFKGIDAL PLTGQYTHYA LNKKTGKPDY   120
VTDSAASATA WSTGVKTYNG ALGVDIHEKD HPTILEMAKA AGLATGNVST AELQDATPAA   180
LVAHVTSRKC YGPSATSEKC PGNALEKGGK GSITEQLLNA RADVTLGGGA KTFAETATAG   240
EWQGKTLREQ AQARGYQLVS DAASLNSVTE ANQQKPLLGL FADGNMPVRW LGPKATYHGN   300
IDKPAVTCTP NPQRNDSVPT LAQMTDKAIE LLSKNEKGFF LQVEGASIDK QDHAANPCGQ   360
IGETVDLDEA VQRALEFAKK EGNTLVIVTA DHAHASQIVA PDTKAPGLTQ ALNTKDGAVM   420
VMSYGNSEED SQEHTGSQLR IAAYGPHAAN VVGLTDQTDL FYTMKAALGL K            471

SEQ ID NO: 3            moltype = AA   length = 605
FEATURE                 Location/Qualifiers
source                  1..605
                        mol_type = protein
                        organism = synthetic construct
SEQUENCE: 3
MQTLLVSSLV VSLAAALPHY IRSNGIEASL LTDPKDVSGR TVDYIIAGGG LTGLTTAARL    60
TENPNISVLV IESGSYESDR GPIIEDLNAY GDIFGSSVDH AYETVELATN NQTALIRSGN   120
GLGGSTLVNG GTWTRPHKAQ VDSWETVFGN EGWNWDNVAA YSLQAERARA PNAKQIAAGH   180
YFNASCHGVN GTVHAGPRDT GDDYSPIVKA LMSAVEDRGV PTKKDFGCGD PHGVSMFPNT   240
LHEDQVRSDA AREWLLPNYQ RPNLQVLTGQ YVGKVLLSQN GTTPRAVGVE FGTHKGNTHN   300
VYAKHEVLLA AGSAVSPTIL EYSGIGMKSI LEPLGIDTVV DLPVGLNLQD QTTATVRSRI   360
TSAGAGQGQA AWFATFNETF GDYSEKAHEL LNTKLEQWAE EAVARGGFHN TTALLIQYEN   420
YRDWIVNHNV AYSELFLDTA GVASFDVWDL LPFTRGYVHI LDKDPYLHHF AYDPQYFLNE   480
LDLLGQAAAT QLARNISNSG AMQTYFAGET IPGDNLAYDA DLSAWTEYIP YHFRPNYHGV   540
GTCSMMPKEM GGVVDNAARV YGVQGLRVID GSIPPTQMSS HVMTVFYAMA LKISDAILED   600
YASMQ                                                               605

SEQ ID NO: 4            moltype = AA   length = 353
FEATURE                 Location/Qualifiers
source                  1..353
                        mol_type = protein
                        organism = synthetic construct
SEQUENCE: 4
MHFSSSSTLF TCITLIPLVC LILHASLSDA QLTPTFYDNS CPNVSNIVRD TIVNELRSDP    60
RIAASILRLH FHDCFVNGCD ASILLDNTTS FRTEKDAFGN ANSARGFPVI DRMKAAVESA   120
CPRTVSCADL LTIAAQQSVT LAGGPSWRVP LGRRDSLQAF LDLANANLPA PFFTLPQLKD   180
SFRNVGLNRS SDLVALSGGH TFGKNQCRFI MDRLYNFSNT GLPDPTLNTT YLQTLRGLCP   240
LNGNLSALVD FDLRTPTIFD NKYYVNLEEQ KGLIQSDQEL FSSPNATDTI PLVRSFANST   300
QTFFNAFVEA MDRMGNITPL TGTQGQIRLN CRVVNSNSLL HDMVEVVDFV SSM          353
```